(12) United States Patent
Patsiokas et al.

(10) Patent No.: US 11,195,195 B2
(45) Date of Patent: Dec. 7, 2021

(54) SYSTEMS, METHODS AND APPLICATIONS FOR USING AND ENHANCING VEHICLE TO VEHICLE COMMUNICATIONS, INCLUDING SYNERGIES AND INTEROPERATION WITH SATELLITE RADIO

(71) Applicant: Sirius XM Radio Inc., New York, NY (US)

(72) Inventors: Stelios Patsiokas, Coral Springs, FL (US); Paul Marko, Pembroke Pines, FL (US); Craig Wadin, Sunrise, FL (US); Joan DeLuca, Boca Raton, FL (US); Jeffrey David Hayes, Lake Worth, FL (US); Stuart Cox, Boca Raton, FL (US); Richard Andrew Michalski, Coral Springs, FL (US); Mark Rindsberg, Boca Raton, FL (US); George David Mantel, Boynton Beach, FL (US); Joseph Michael Smallcomb, Lake Worth, FL (US); Anh Xuan Nguyen, Boynton Beach, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 16/513,131

(22) Filed: Jul. 16, 2019

(65) Prior Publication Data

US 2019/0378150 A1 Dec. 12, 2019

Related U.S. Application Data

(63) Continuation of application No. 15/303,876, filed as application No. PCT/US2015/025830 on Apr. 14, 2015, now Pat. No. 10,354,265.

(Continued)

(51) Int. Cl.
*B60Q 1/00* (2006.01)
*G06Q 30/02* (2012.01)

(52) U.S. Cl.
CPC ..... *G06Q 30/0207* (2013.01); *G06Q 30/0261* (2013.01); *G06Q 30/0266* (2013.01)

(58) Field of Classification Search
CPC . G06Q 30/02; G06Q 30/0261; G06Q 30/0266
See application file for complete search history.

(56) References Cited

U.S. PATENT DOCUMENTS 9,495,870 B2 * 11/2016 Jana ................. G08G 1/096716
2008/0030370 A1 * 2/2008 Doyle .................. G08G 1/0962
340/905

(Continued)

*Primary Examiner* — Phung Nguyen
(74) *Attorney, Agent, or Firm* — Kramer Levin Naftalis & Frankel LLP

(57) ABSTRACT

Various applications, systems and methods for using, and enhancing V2V communications for various purposes are described. These systems and methods leverage various aspects of satellite radio broadcasts in combination with V2V communications. In some embodiments, V2V-enabled vehicles can receive advertisements or offers from RSEs, or even other V2V enabled vehicles, in a defined Target Region, which may then be played to a user in-vehicle once a given Trigger Region has been entered. By logging all advertisements or offers played to a user and sending the log to an RSE, for example, and from there to a content provider (e.g., an SDARS service operator), verified delivery of advertisements is achieved, which allows the content provider to obtain significant revenues from advertisers. In return for uploading the playback record from the vehicle to the RSE, a variety of incentives may be offered, such as (i) free or discounted satellite radio subscription; (ii) download credits for music or videos from an online store; (iii) reduced or free tolls on toll roads (e.g., RSE embedded in a toll collection plaza); (iv) premium audio or video content, (v)

(Continued)

V2V Will Help Mitigate Crashes On Busy Urban Streets credit at an online store; and (vi) a special coupon code redeemable for merchandise.

12 Claims, 21 Drawing Sheets

Related U.S. Application Data

(60) Provisional application No. 61/988,304, filed on May 4, 2014, provisional application No. 61/979,369, filed on Apr. 14, 2014.

(56) References Cited

U.S. PATENT DOCUMENTS

| | | | |
|---|---|---|---|
| 2010/0250346 A1* | 9/2010 | Bai | G08G 1/0962 705/14.1 |
| 2010/0250369 A1* | 9/2010 | Peterson | G06F 16/29 705/14.58 |
| 2013/0141576 A1* | 6/2013 | Lord | G08G 1/096791 348/148 |
| 2013/0325940 A1* | 12/2013 | Foti | H04W 84/005 709/204 |
| 2014/0306814 A1* | 10/2014 | Ricci | B60R 25/25 340/425.5 |

* cited by examiner

FIG. 1 - V2V Will Help Mitigate Crashes On Busy Urban Streets

FIG. 2 - Many Connected Vehicles Will Contain Aftermarket Devices To Warn Against Potential Crashes FIG. 3 - VIIC Vehicle Software Architecture (2005)

Transmitted List

| Channel Number or Frequency | "Band indication" | % time spent listening |
|---|---|---|
| 20 | XM | 35% |
| 6 | XM | 25% |
| 16 | XM | 15% |
| 300 | XM | 7% |
| 19 | XM | 5% |

Received List A

| Channel Number or Frequency | "Band indication" | % time spent listening |
|---|---|---|
| 20 | XM | 25% |
| 6 | XM | 20% |
| (7) | XM | 20% |
| 16 | XM | 15% |
| 19 | XM | 5% |

Received List C

| Channel Number or Frequency | "Band indication" | % time spent listening |
|---|---|---|
| 11 | XM | 35% |
| 9 | XM | 20% |
| 20 | XM | 15% |
| 50 | SIRI | 10% |
| 7 | XM | 10% |

Channels which are *different* on a list that is otherwise similar become "suggestion"...especially if these channels are not on the complete internal list (never tried)

N of M channels in Received List A (4 of 5) are also in internal top M list

Various ranking criteria are possible in addition to time spent listening to channel: explicit user ranking or rating, % songs liked on channel, or combination of multiple factors Various filtering criteria for reducing the size of the transmitted messages (top N channels, only channels with at least X% listening time, etc.)

Internal channel list ranked by % time spent listening

| Channel Number or Frequency | "Band indication" | % time spent listening |
|---|---|---|
| 20 | XM | 35% |
| 6 | XM | 25% |
| 16 | XM | 15% |
| 300 | XM | 7% |
| 19 | XM | 5% |
| 22 | XM | 5% |
| 50 | SIRI | 4% |
| 104.9 | FM | 1% |
| 920 | AM | 1% |

Top N channels (e.g. N=5)

All Channels with M% or more listening time (e.g. 1%)

FIG. 17

| Received List B | | |
|---|---|---|
| Channel Number or Frequency | "Band indication" | % time spent listening |
| 11 | XM | 45% |
| 7 | XM | 20% |
| 9 | XM | 15% |
| 22 | XM | 5% |
| 50 | SIRI | 4% |

| Received List D | | |
|---|---|---|
| Channel Number or Frequency | "Band indication" | % time spent listening |
| 11 | XM | 40% |
| 50 | XM | 10% |
| 7 | XM | 10% |
| 19 | XM | 5% |
| 22 | XM | 5% |

| Channel Number | Band | internal % time | RCV % time A | RCV % time B | RCV % time C | RCV % time D | "Popular" |
|---|---|---|---|---|---|---|---|
| 11 | XM | 1% | 0% | 45% | 35% | 40% | 24% |
| 20 | XM | 35% | 25% | 0% | 15% | 0% | 15% |
| 7 | XM | 0% | 20% | 25% | 10% | 10% | 13% |
| 6 | XM | 25% | 20% | 0% | 0% | 0% | 9% |
| 9 | XM | 0% | 0% | 15% | 20% | 0% | 7% |
| 50 | SIRI | 5% | 3% | 4% | 10% | 10% | 6% |
| 16 | XM | 15% | 15% | 0% | 0% | 0% | 6% |
| 19 | XM | 5% | 5% | 5% | 0% | 5% | 3% |
| 22 | XM | 5% | 0% | 0% | 0% | 5% | 3% |
| 300 | XM | 7% | 0% | 0% | 0% | 0% | 1% |
| 104.9 | FM | 1% | 0% | 0% | 0% | 0% | 0% |
| 920 | AM | 1% | 0% | 0% | 0% | 0% | 0% |
| 14 | XM | 0% | 0% | 0% | 0% | 0% | 0% |

"Popular" channels determined by averaging the percentage listening time received from all V2V enabled vehicles

FIG. 17 (Cont.)

SYSTEMS, METHODS AND APPLICATIONS FOR USING AND ENHANCING VEHICLE TO VEHICLE COMMUNICATIONS, INCLUDING SYNERGIES AND INTEROPERATION WITH SATELLITE RADIO

CROSS-REFERENCE TO RELATED APPLICATIONS

This application is a continuation of U.S. patent application Ser. No. 14/868,659, filed on Sep. 29, 2015, which issued as U.S. Pat. No. 10,277,342 on Apr. 30, 2019, which is a continuation of U.S. patent application Ser. No. 13/982,949, filed on Jul. 31, 2013, which issued as U.S. Pat. No. 9,154,248 on Oct. 6, 2015, which is a U.S. national phase of PCT/US2012/025091, filed on Feb. 14, 2012, which claims the benefit of U.S. Provisional Application No. 61/442,468, filed on Feb. 14, 2011, the entire contents of each of these applications are hereby incorporated by reference. Related subject matter is disclosed and claimed in U.S. Pat. Nos. 6,145,452, 6,229,824, and 7,809,326, the entire contents of which are hereby incorporated by reference. Reference is also made to commonly owned U.S. Patent Application Publication No. 2009/0320075, the entire contents of which are also incorporated herein by reference.

TECHNICAL FIELD

The present invention relates to communications between vehicles, between vehicles and infrastructure, and between satellites and vehicles, and more particularly to, several scenarios, applications, systems and methods for using, and enhancing V2V communications by leveraging satellite radio technology.

BACKGROUND OF THE INVENTION

With the recent announcement by the USDOT's National Highway Traffic and Safety Administration that it intends to work on a regulatory proposal requiring vehicle to vehicle ("V2V") communications systems in all light vehicles in some future year, the groundwork has been laid for an unprecedented government-mandated technology that has yet to be introduced into the market.

V2V communications for safety leverages Dedicated Short Range Communications ("DSRC") transceivers operating at 5.9 GHz to enable the dynamic wireless exchange of data between nearby vehicles. Such communications offer the opportunity for significant safety improvements. By exchanging anonymous, vehicle-based data regarding (at a minimum) position, speed, and location. V2V communications enables a given vehicle to, for example, (i) sense threats and hazards with a 360 degree awareness of the position of other vehicles, and the threat or hazard they present; (ii) calculate risk; issue driver advisories or warnings; and/or (iii) take pre-emptive actions to avoid and mitigate crashes. At the heart of V2V communications is a basic application known as the Here I Am data message. It is noted that this message is defined by the SAE J2735 standard. This SAE standard specifies a message set, as well as data frames and data elements specifically for use by applications intended to utilize the 5.9 GHz Dedicated Short Range Communications for Wireless Access in Vehicular Environments (DSRC/WAVE, referenced in this document simply as "DSRC") communications systems. Although the scope of this standard is focused on DSRC, the message set, as well as its data frames and data elements, have been designed, to the extent possible, to also be of potential use for applications that may be deployed in conjunction with other wireless communications technologies. This standard therefore specifies the definitive message structure and provides sufficient background information to allow readers to properly interpret the message definitions from the point of view of an application developer implementing messages according to DSRC Standards.

It is noted that the Here I Am is message can be derived using non-vehicle-based technologies, such as GPS, for example, to identify the location and speed of a vehicle, or may, for example, use vehicle-based sensor data, derive location and speed data from the vehicle's computer and then be combined with other data such as latitude, longitude, or angle to produce a richer, more detailed situational awareness of the position of other vehicles.

Because the Here I Am data message can be derived from ubiquitous non-vehicle-based technologies (e.g., aftermarket devices), the Intelligent Transportation System (ITS) Program may, by implementing applications on, or using, aftermarket devices, leverage an opportunity to accelerate V2V capability and deployment in the near-term and produce safety benefits through reduced crashes sooner than through Original Equipment Manufacturer (OEM) embedded systems only.

The V2V vision is that eventually, each vehicle on the roadway (inclusive of automobiles, trucks, buses, motor coaches, and motorcycles) will be able to communicate with all other vehicles, and that this rich set of data and inter-vehicle communications will support a new generation of active safety applications and safety systems. This is illustrated, for example, in FIG. 1. According to the DOT, based on present vehicle crash statistics, fully penetrated V2V communications can enable active safety systems that can assist drivers in preventing 80 percent of the crashes currently occurring on the roadway, thereby reducing fatalities and injuries that occur each year. V2V preventable crashes obviously exclude single car crashes, and the effectiveness of the system to prevent crashes is directly related to the level of V2V deployment. For example, when V2V technology reaches 50% penetration of the vehicles on the road, the system could assist drivers equipped with the technology in preventing 40% (0.5×80%) of crashes overall. An exemplary in-vehicle warning display screen is shown in FIG. 2. As noted below, as V2V is implemented, many connected vehicles may contain aftermarket devices to warn against potential crashes Connected Vehicle Safety Pilot The USDOT's ITS Program defined the Connected Vehicle Safety Pilot, a significant test and evaluation effort for V2V technology. The Safety Pilot is designed to determine (i) the effectiveness of various safety applications in reducing crashes, and (ii) how real-world drivers will respond to such safety applications, as a model for a national deployment of V2V technology. In addition, the Safety Pilot is intended to evaluate the feasibility, scalability, security and interoperability of DSRC technology. The Safety Pilot, with locations in Ann Arbor, Mich. and 5 other cities across the US, has been in operation since 2011 and now includes more than 3000 cars, commercial trucks and transit vehicles, with 73 lane miles of roadway, 27 roadside equipment installations and a variety of devices including integrated safety systems, aftermarket safety systems and roadside equipment.

While V2V for safety is the key component of the USDOT's Vehicle to Vehicle communications program, vehicles equipped with a V2V DSRC transceiver may also benefit from Vehicle to Infrastructure ("V2I") communications. While most of the Safety Pilot applications focus on V2V for safety, other V2I applications focus on mobility and environmental applications. Table 1 below captures various V2V and V2I applications which provided input to drivers in the model deployment.

can utilize to test and demonstrate traveler services through applications which interface within the Test Bed framework.

Test Bed applications may include, for example, (i) safety applications, which may provide advisories such as school zone, sharp ramp curve or slippery patch of roadway ahead, (ii) mobility applications, which may help transportation managers monitor and manage transportation system performance, and (iii) environment applications, which may provide travelers with real-time information about conges-

TABLE 1

Applications Providing Input To Drivers In The Safety Pilot Model

| Safety Application | Type | Description |
| --- | --- | --- |
| Forward Collision Warning (FCW) | V2V | A V2V application where alerts are presented to the driver in order to help avoid or mitigate the severity of crashes into the rear end of other vehicles on the road. Forward crash warning responds to a direct and imminent threat ahead of the host vehicle. |
| Emergency Electronic Brake Light (EEBL) | V2V | A V2V application where the driver is alerted to hard braking in the traffic stream ahead. This provides the driver with additional time to look for, and assess, situations developing ahead. |
| Intersection Movement Assist (IMA) | V2V | A V2V application where alerts are given to drivers as they begin to accelerate from rest into, or across, another road, to help the driver avoid crashes with crossing traffic. |
| Blind Spot Warning (BSW)/Lane Change Warning (LCW) | V2V | A V2V application where alerts are displayed to the driver that indicate the presence of same-direction traffic in an adjacent lane (Blind Spot Warning), or alerts given to drivers during host vehicle lane changes (Lane Change Warning) to help the driver avoid crashes associated with potentially unsafe |
| Do Not Pass Warning | V2V | A V2V application where alerts are given to drivers to help avoid a head-on crash resulting from passing maneuvers. |
| Right Turn in Front | V2V | A V2V application that alerts the driver of a transit vehicle if another vehicle intends to make a right turn in front of it while the transit vehicle is stopped at a bus stop near an intersection. |
| Left Turn Across Path/ Opposite Direction (LTAP) | V2V | A V2V application where alerts are given to the driver as they attempt an unprotected left turn across traffic, to help them avoid crashes with opposite direction traffic. |
| Signal Phase and Timing (SPaT) | V2I | A set of V2I applications where intersection traffic signals broadcast the current state of signal phasing (red, yellow, or green) and time remaining in that phase. The SPaT data would be used by the vehicle to achieve safety, mobility and environmental benefits. |
| Curve Speed Warning (CSW) | V2I | A V2I application where alerts are provided to the driver who is approaching a curve at a speed that may be too high for comfortable or safe travel through that curve. |
| Railroad Crossing Warning | V2I | A V2I application that alerts the driver of approaching trains at railroad crossings without warning signals or gates. |
| Pedestrian Detection | V2I | A V2I application that alerts the driver of turning transit vehicles if a pedestrian has pushed the crosswalk button at an upcoming intersection, or a remote sensor system detects a pedestrian in the crosswalk at the intersection. |

In January 2014, the Intelligent Transportation System's (ITS) Joint Program Office reported that data collection from the Safety Pilot has exceeded expectations, and regular drivers have experienced benefits from proven technology. Connectivity across various types and modes has been demonstrated and additional data collection is planned.

Data from the Safety Pilot has been used to support the USDOT decision to approve V2V communications.

V2V and V2I Technology Test Bed

The USDOT's Research and Innovative Technology Administration's Joint Program Office is fostering the development and future deployment of new connectivity applications by making available a V2V and V2I Technology Test Bed which is available for device and application development. The Test Bed with Roadside Equipment (RSE) is centered in the Michigan cities of Novi, Farmington, Farmington Hills, and Livonia with expansion into Southfield. Expansion Test Beds in California, Florida and New York are also being made available to entities planning demonstrations at ITS World Congress. The current Test Bed provides a V2V and V2I communications system that others tion, optimum flow speed for timing traffic signals and other information to help make trips more fuel-efficient and eco-friendly.

Other support features provided by the V2V and V2I Technology Test Bed include Probe Data Services, Signal Phase and Timing Services, Tolling Transaction Services, Onboard Electronics (OBE) applications and Roadside Equipment (RSE) applications. The next generation test bed will emphasize a common design architecture, interoperable components and shared back office services, working security processes and implementation of a revised system architecture.

V2V Interoperability

Currently, nearly every automaker is developing some form of V2V technology. To insure system interoperability, the USDOT has sponsored the ITS Connected Vehicle Workshop focused on V2V interoperability. The project addresses 5.9 GHz DSRC technical issues related to interoperability, scalability, security and data integrity/reliability. The project provides inputs into the relevant standards development to ensure a deployable standards-based system.

The USDOT has contracted the development of the vehicle onboard electronics to the Vehicle Infrastructure Integration Consortium (VIIC), which was formed in early 2005 to engage in the design, testing and evaluation of a deployable VII system and is now primarily focused on the deployment of the V2V system based on 5.9 GHz DSRC. The VIIC is comprised of the nine automakers Chrysler, Toyota, BMW, Mercedes-Benz, GM, Nissan, Honda, Ford and VW.

The VIIC has proposed the software architecture shown in FIG. 3 for V2V applications. OEMs can develop a stand-alone V2V module which includes the DSRC transceiver and V2V processor system as shown in FIG. 3, or limit module the V2V module to the physical DSRC transceiver and leverage the applications processor contained in another system component, such as the SAT Radio Module (SRM), In-Vehicle Infotainment (IVI) Unit or Telematics Control Unit (TCU) to support the full V2V applications environment. Incorporating the V2V applications substantially increases the scope of the V2V integration effort for the SRM, IVI or TCU while providing the maximum cost benefit.

Aftermarket Devices and Solutions

Since the effectiveness of the V2V system to prevent crashes is directly related to the percentage of vehicles equipped with the technology, a strong interest exists to increase penetration of V2V vehicles at a rate faster than new car deployments can provide. This can be done through aftermarket devices. Aftermarket V2V equipment can, for example, enable owners of older vehicles to benefit from V2V safety technology while increasing the effectiveness of the overall system.

New Technologies—Leverage Satellite Radio

The V2V System allows for the integration of a wider array of technologies, and thus enables private industry to develop innovative technologies that may offer new or additional features. Thus, new connected services applications may be created which can leverage V2V and V2I connectivity.

There is thus a great opportunity, and a great need, for the use of existing satellite technologies in various aspects of V2V and V2I communications, for the integration of V2V and V2I communications capabilities in various SXM in-vehicle apparatuses, and for the implementation of various functionalities and applications related to such use. The present invention addresses such synergies.

Figures Relating to Coupon or Advertisement Distribution

Figure 1:
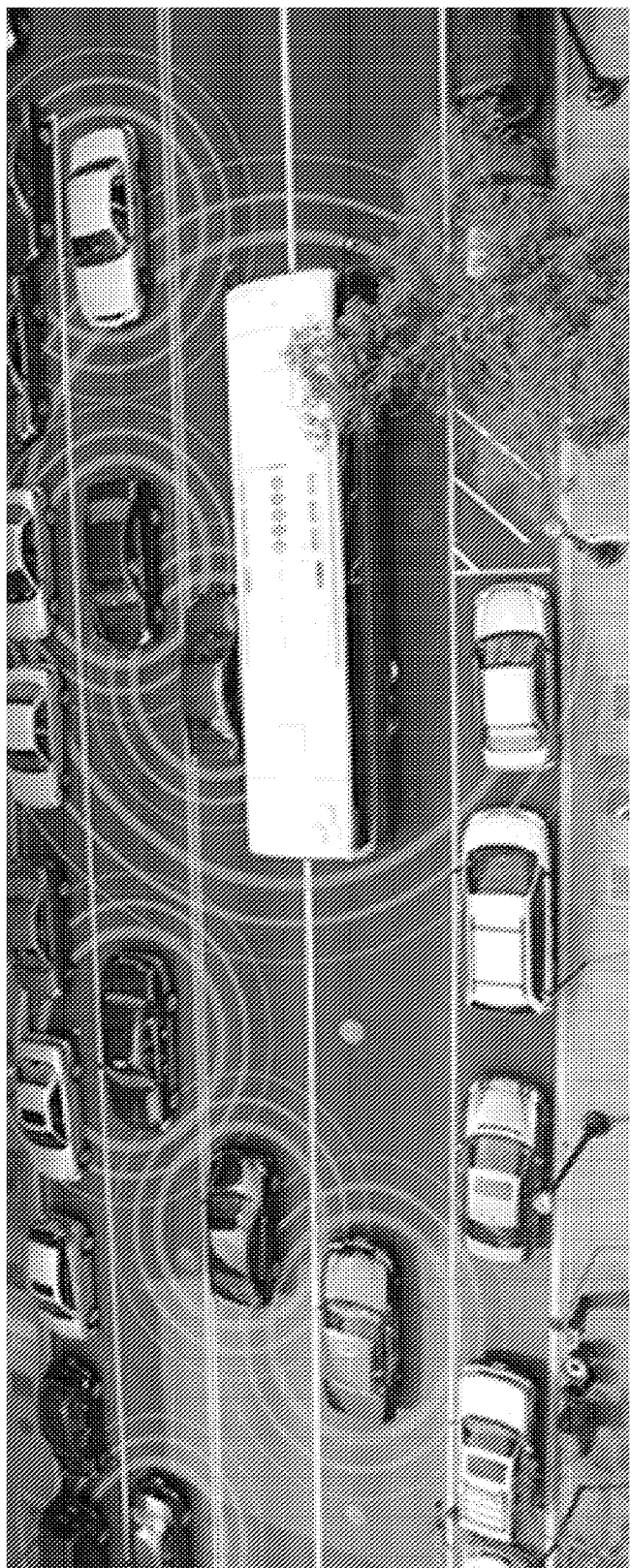
FIG. 1 illustrates exemplary V2V communications on busy urban streets.
Figure 2:
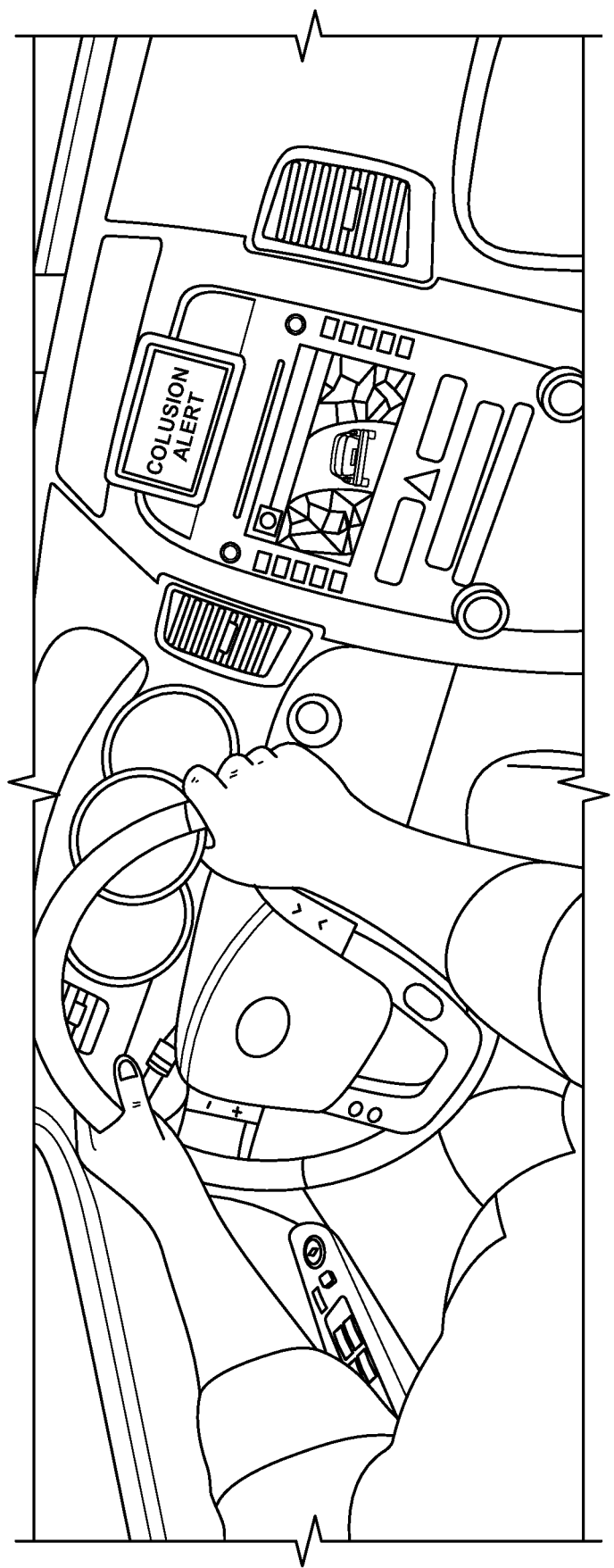
FIG. 2 illustrates an exemplary aftermarket device used to display warnings or other messages received via V2V communications.
Figure 3:
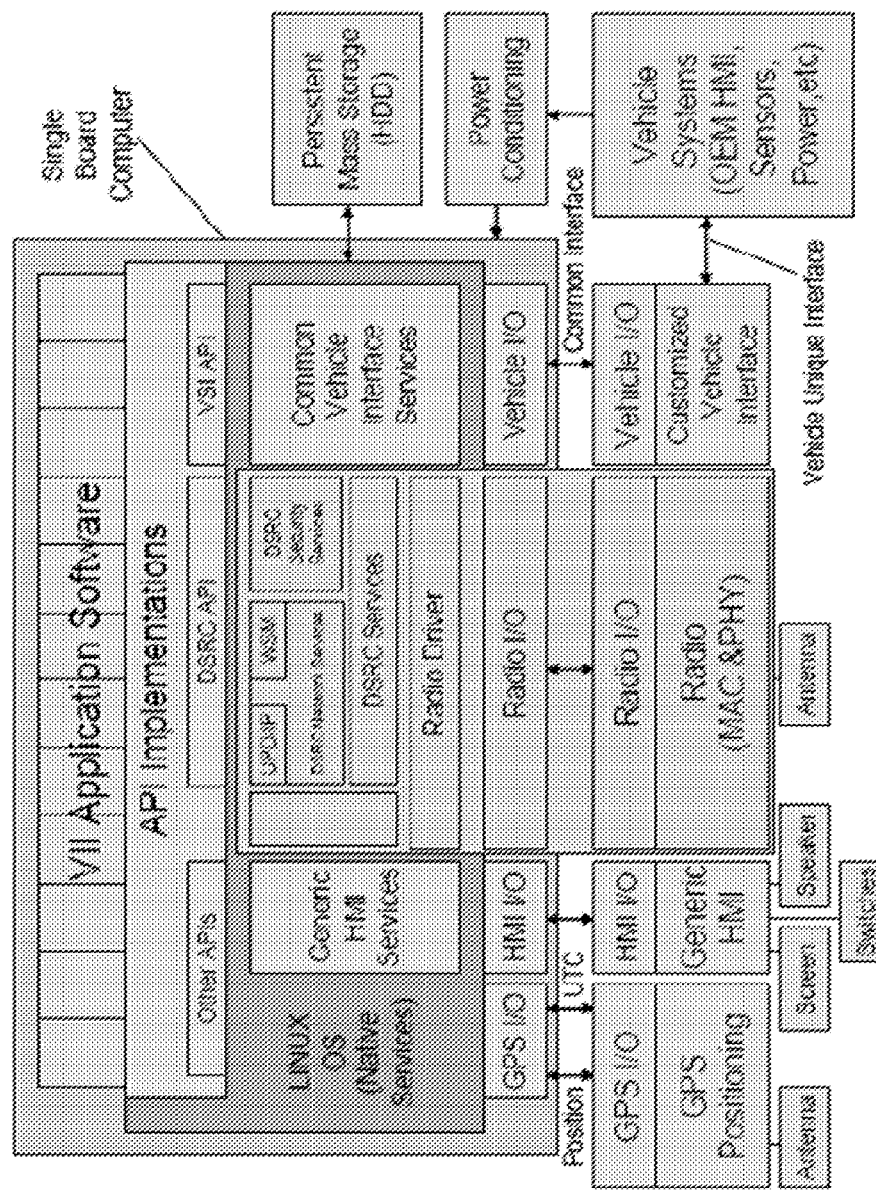
FIG. 3 illustrates an exemplary VIIC vehicle software architecture.
Figure 4:
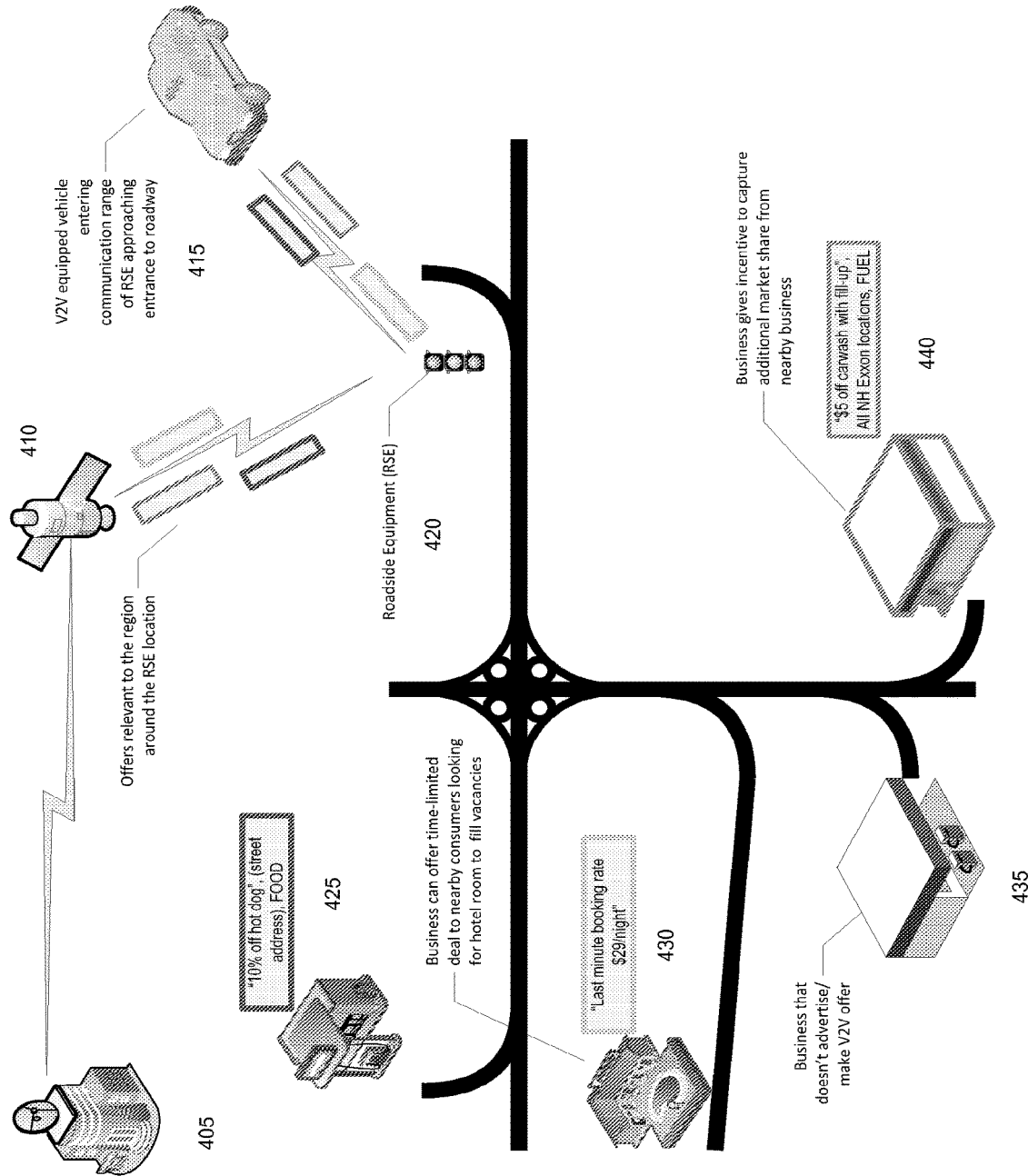
Figure 5:
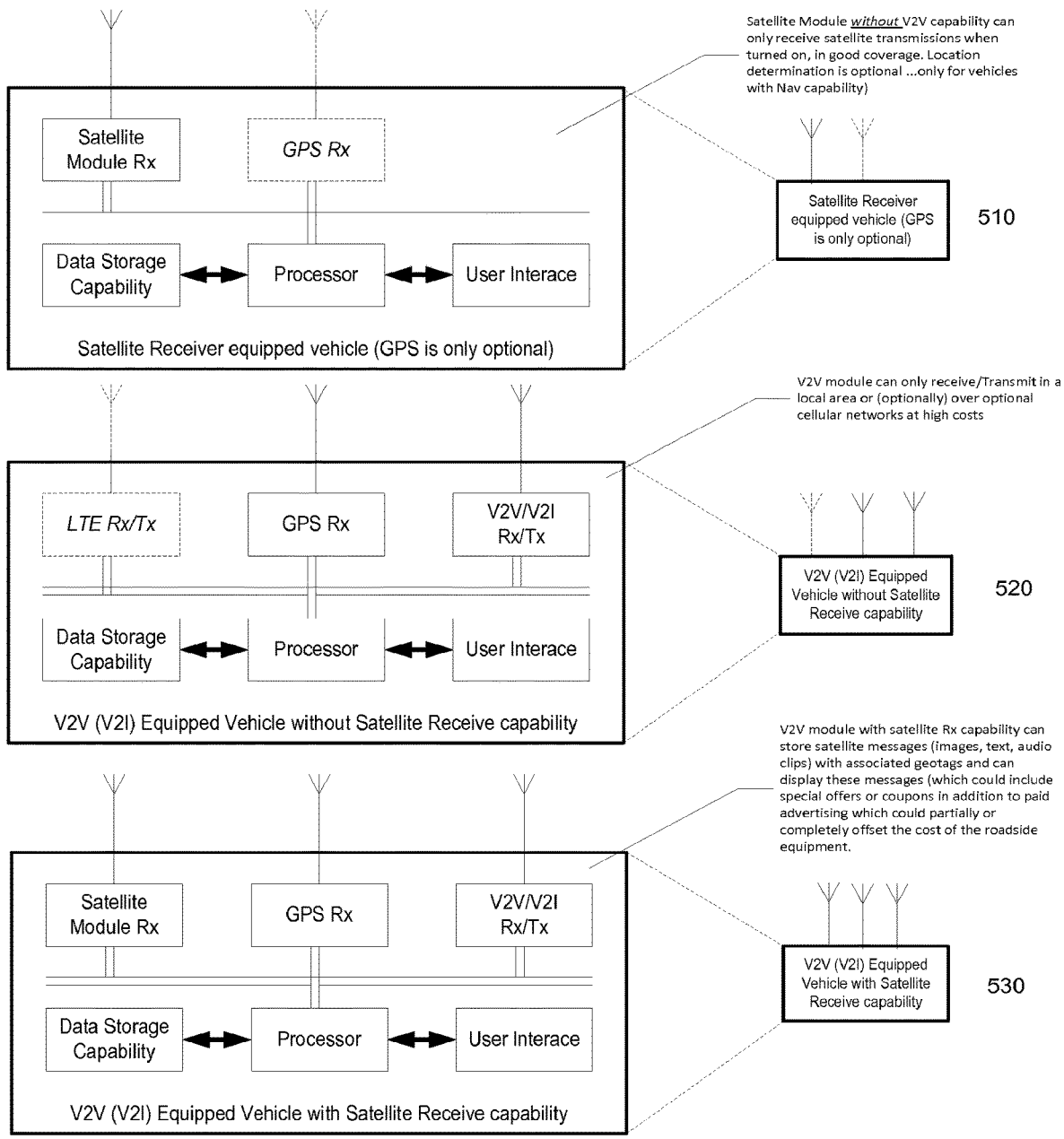
Figure 6:
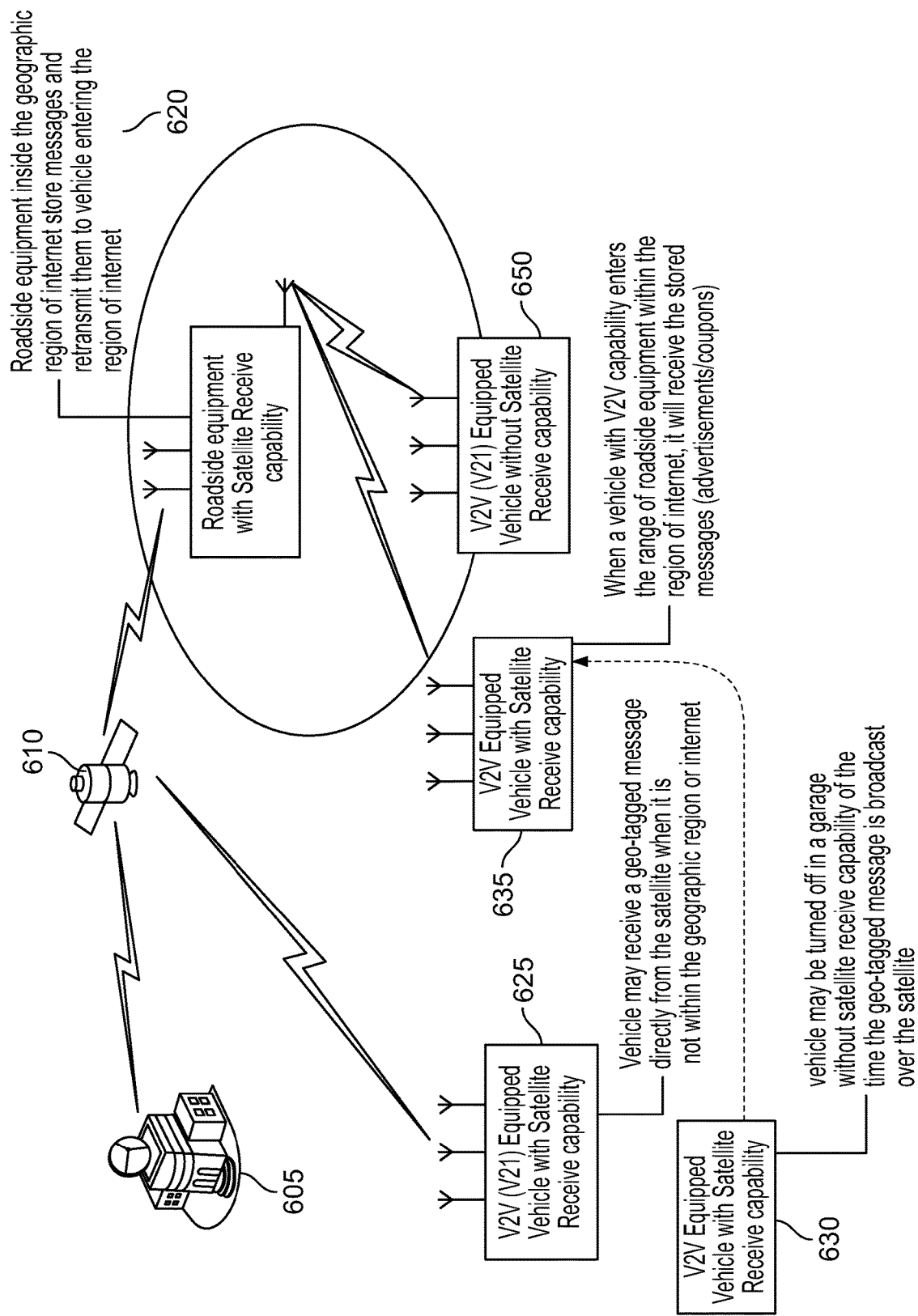
Figure 7:
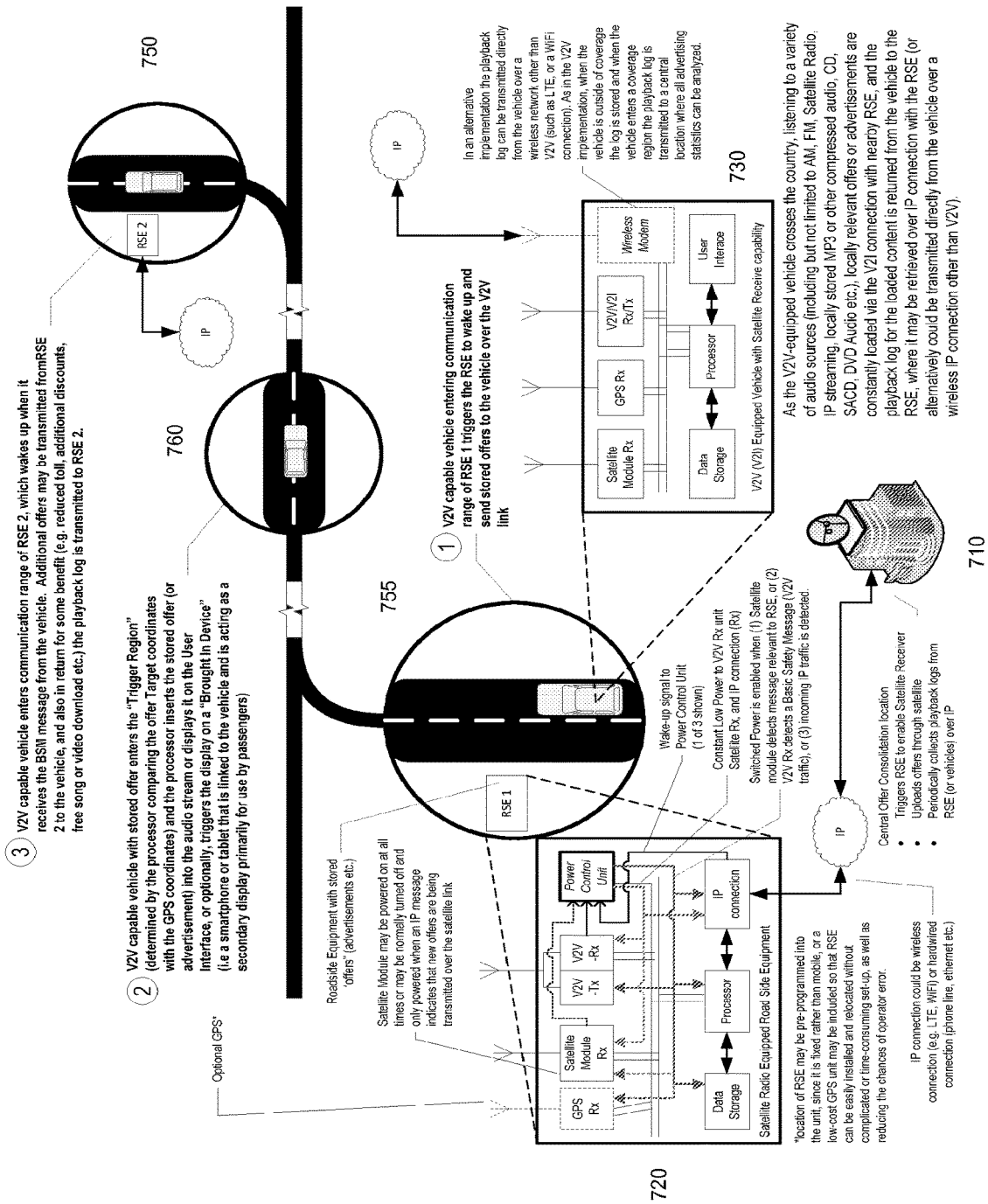
Figure 8:
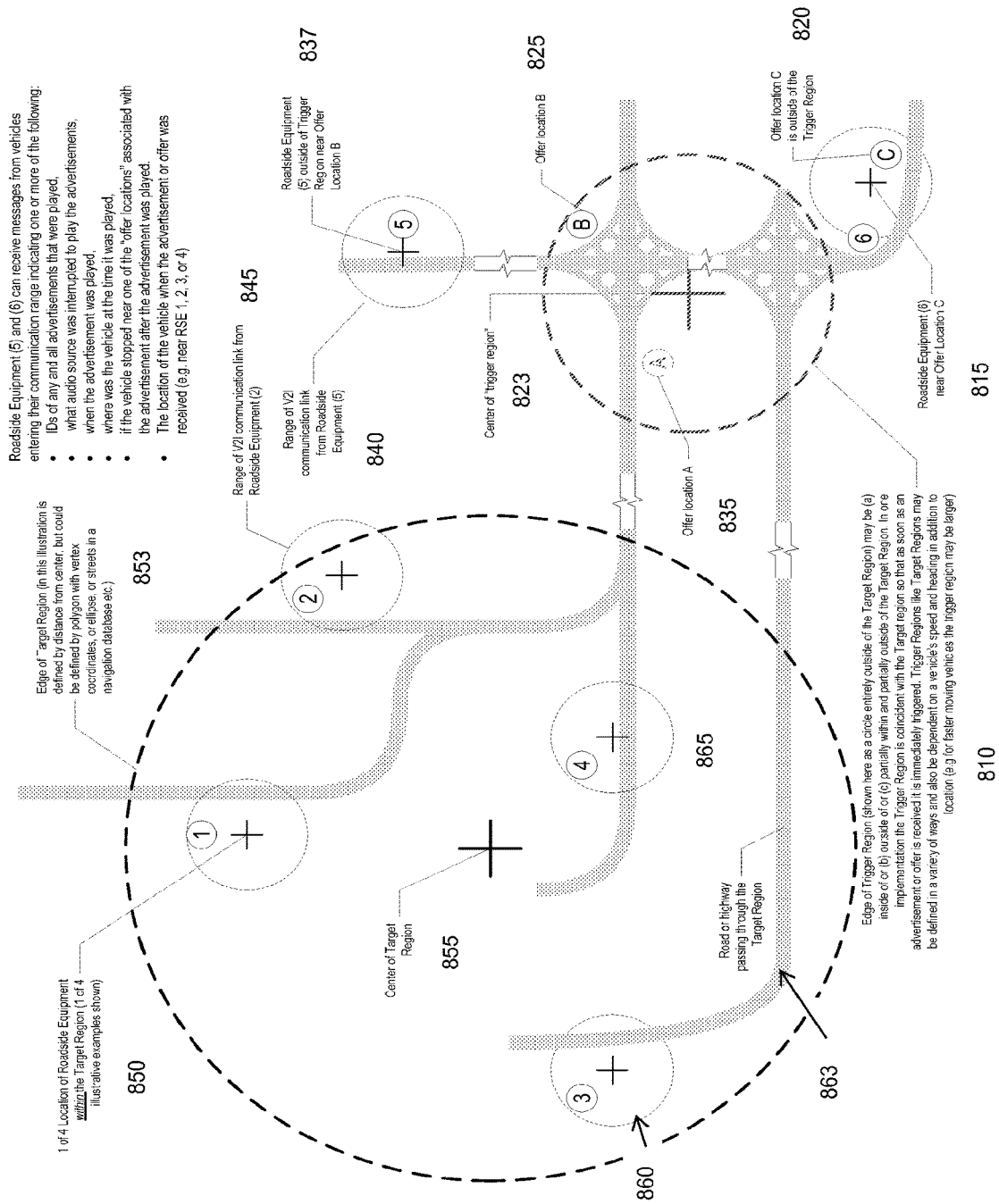
Figure 9:
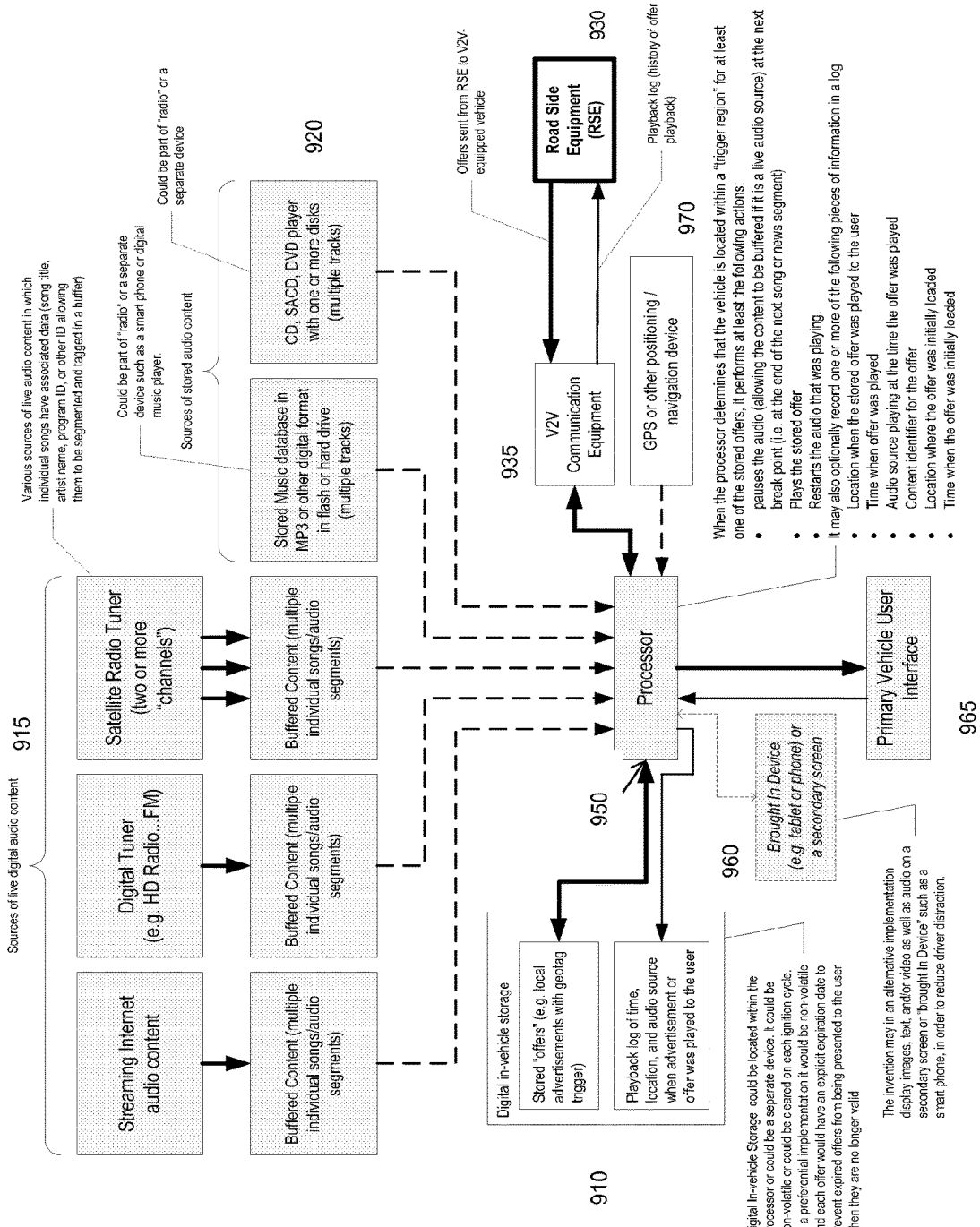
Figure 10:
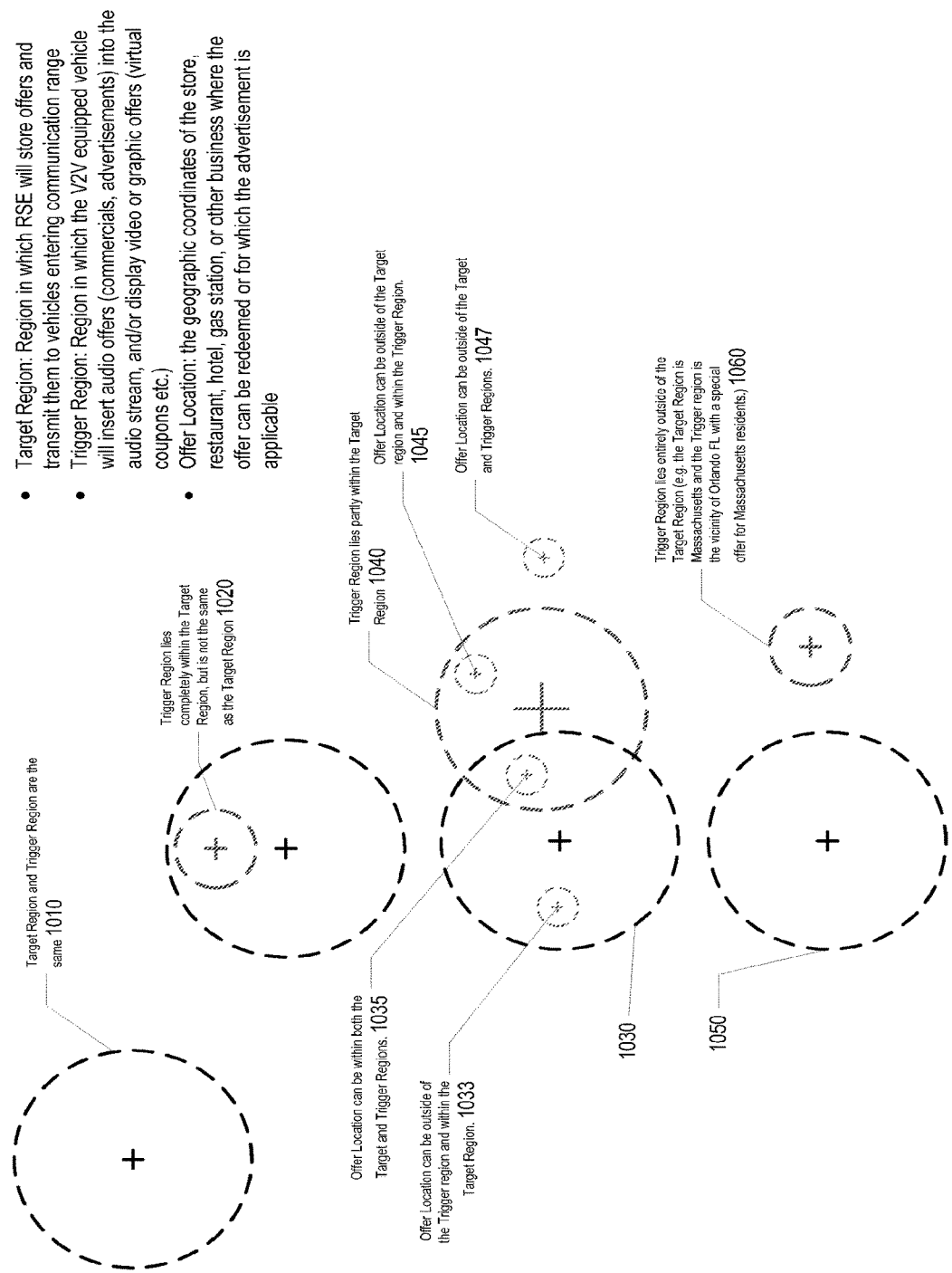
Figure 11:
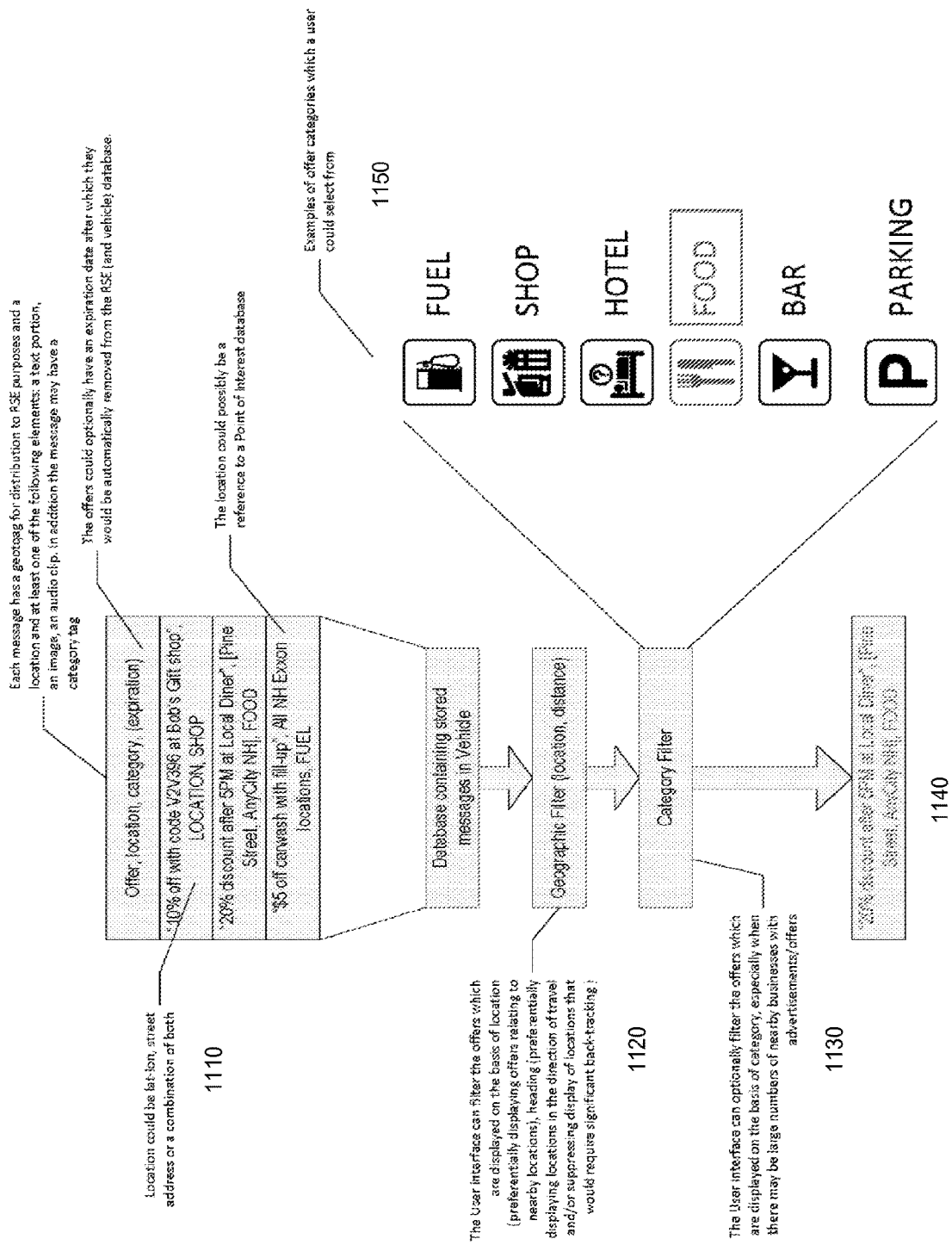

FIG. 4 illustrates an exemplary vehicle approaching a roadway in the vicinity of various vendors and businesses according to an exemplary geographically appropriate advertisement embodiment of the present invention;

FIG. 5 illustrates various types of in-vehicle equipment and the corresponding ability to received geotagged messages according to an exemplary embodiment of the present invention;

FIG. 6 illustrates a high level view of an exemplary satellite/V2V geo-tagged message system according to an exemplary embodiment of the present invention;

FIG. 7 illustrates an example of a V2V capable vehicle interacting with two sets of Roadside Equipment according to an exemplary embodiment of the present invention;

FIG. 8 illustrates details of an exemplary system of Roadside Equipment and associated target areas and trigger regions according to an exemplary embodiment of the present invention;

FIG. 9 illustrates an example of an in-vehicle processor managing stored offers sent over V2V to a vehicle from Roadside Equipment according to an exemplary embodiment of the present invention;

FIG. 10 illustrates further details of interactions between target regions, trigger regions and offer locations according to an exemplary embodiment of the present invention;

FIG. 11 illustrates an exemplary geotagged message database, with exemplary message format, according to an exemplary embodiment of the present invention;

Figures Relating to Satellite/V2V Geotagged Messaging

Figure 12:
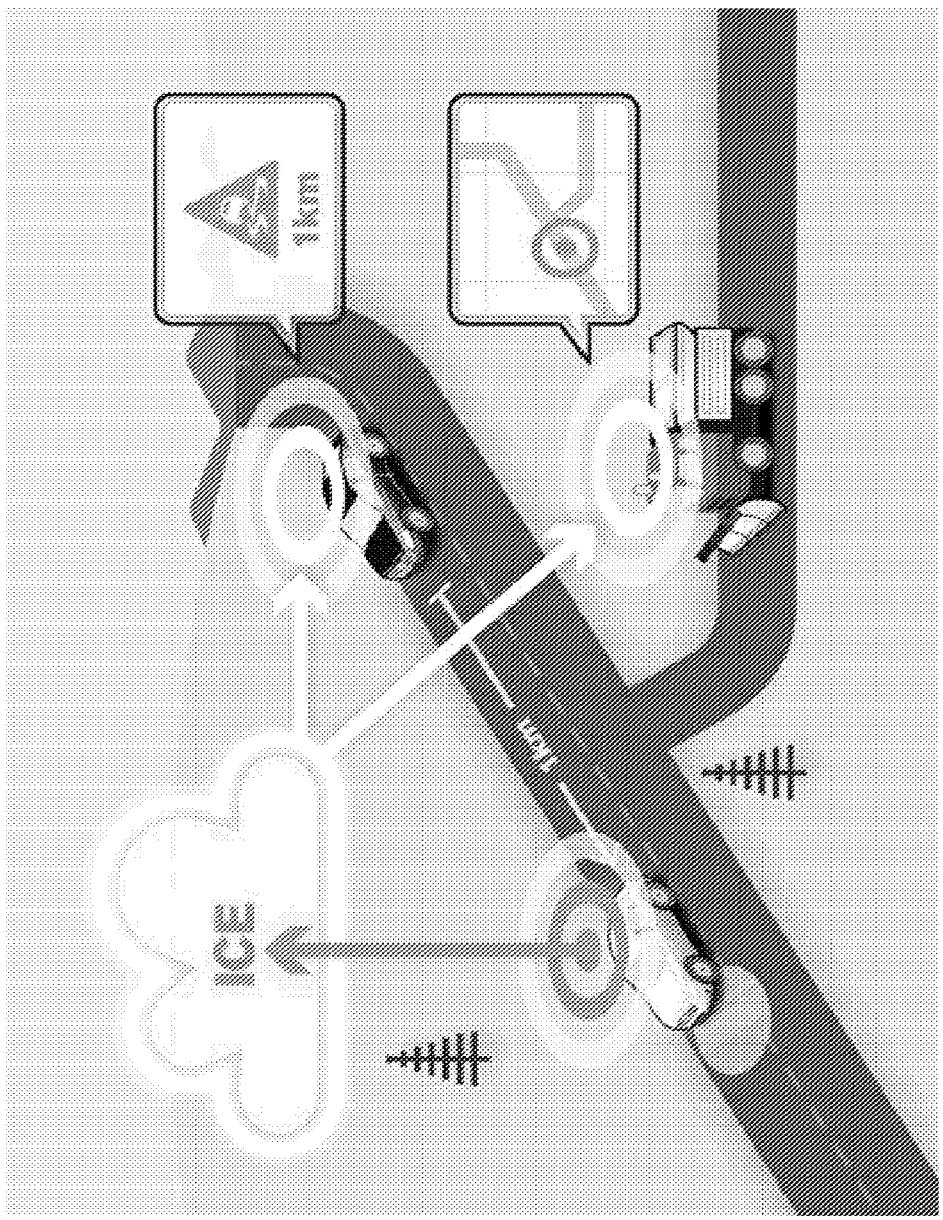
Figure 13:
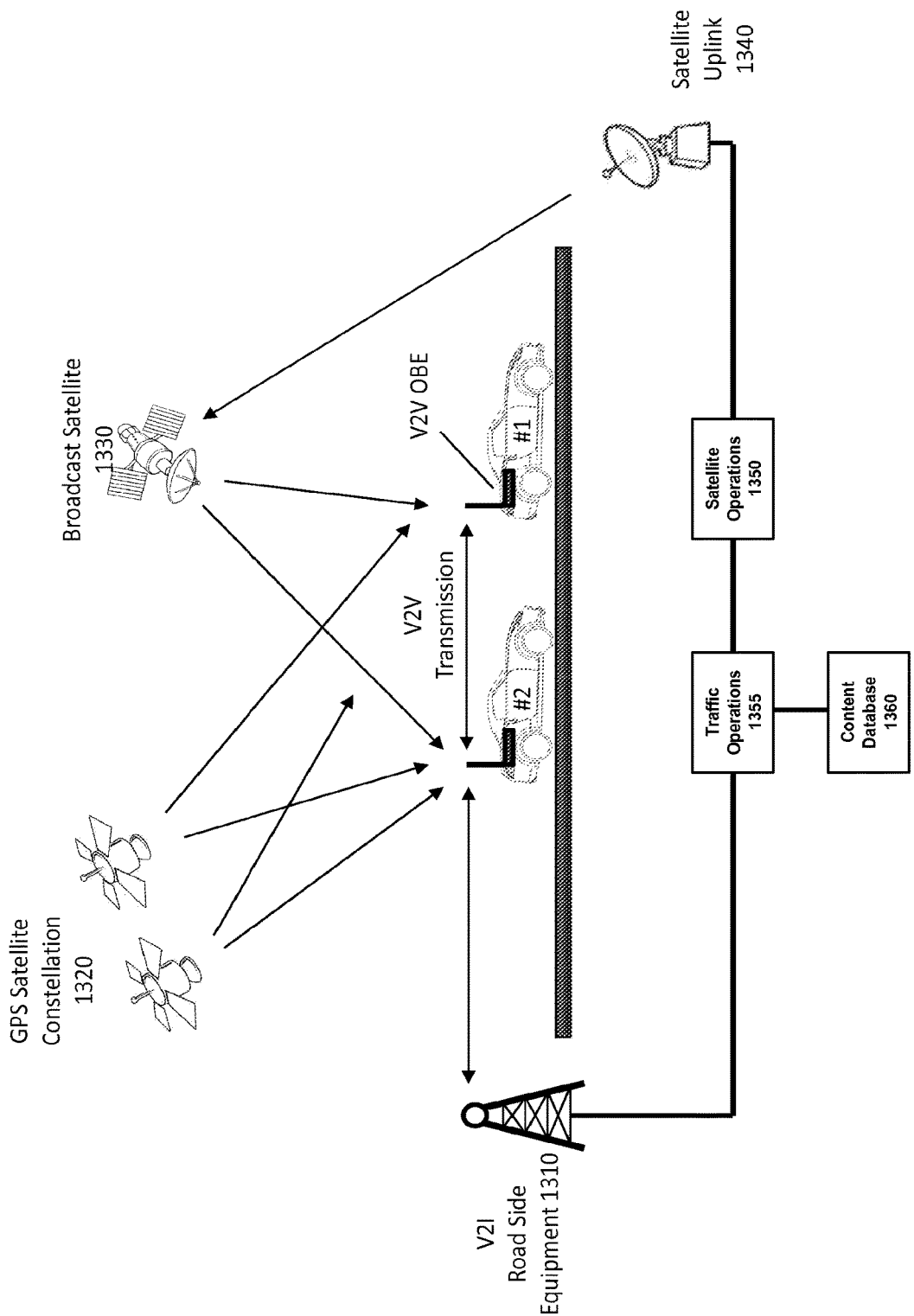
Figure 14:
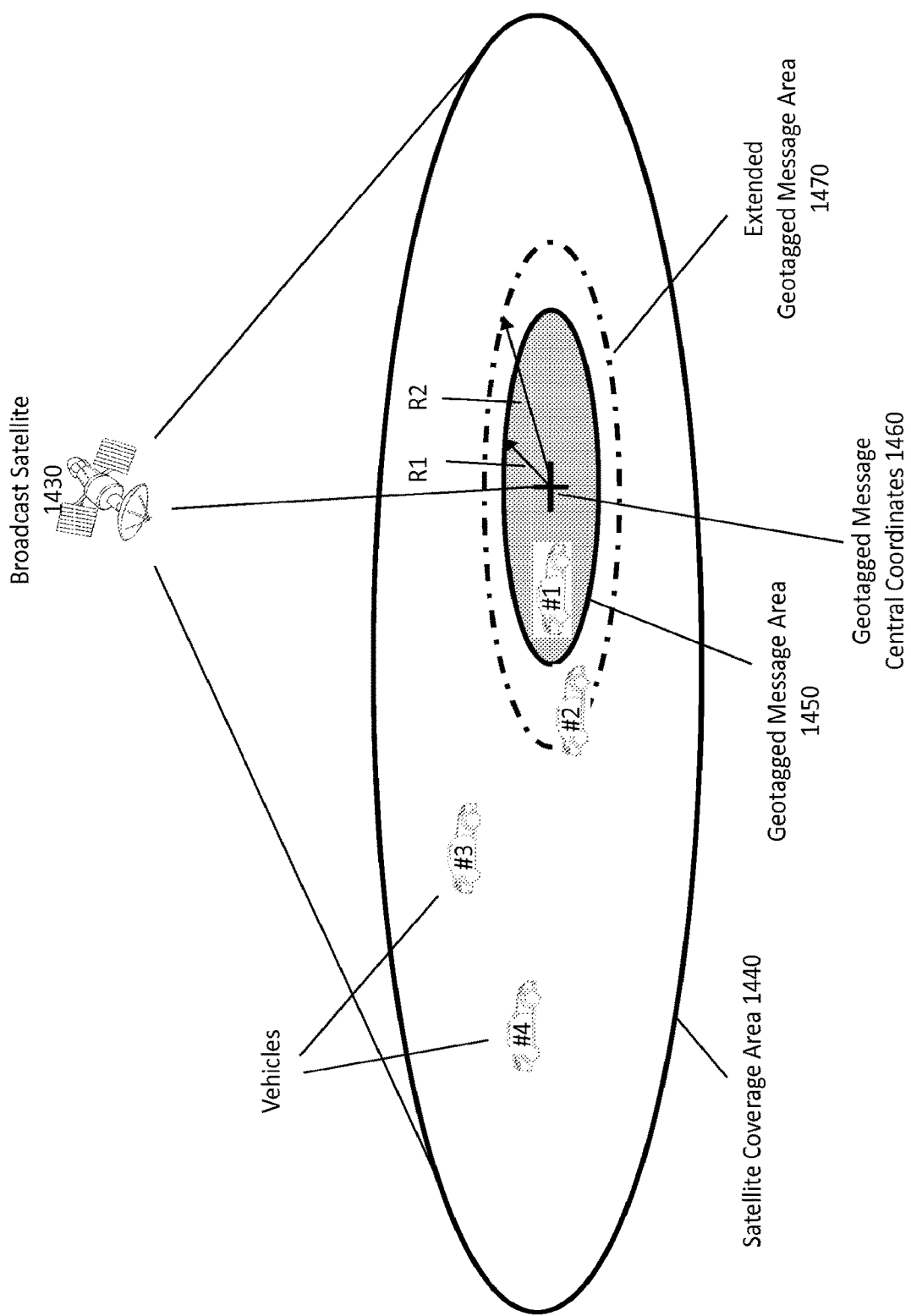
Figure 15:
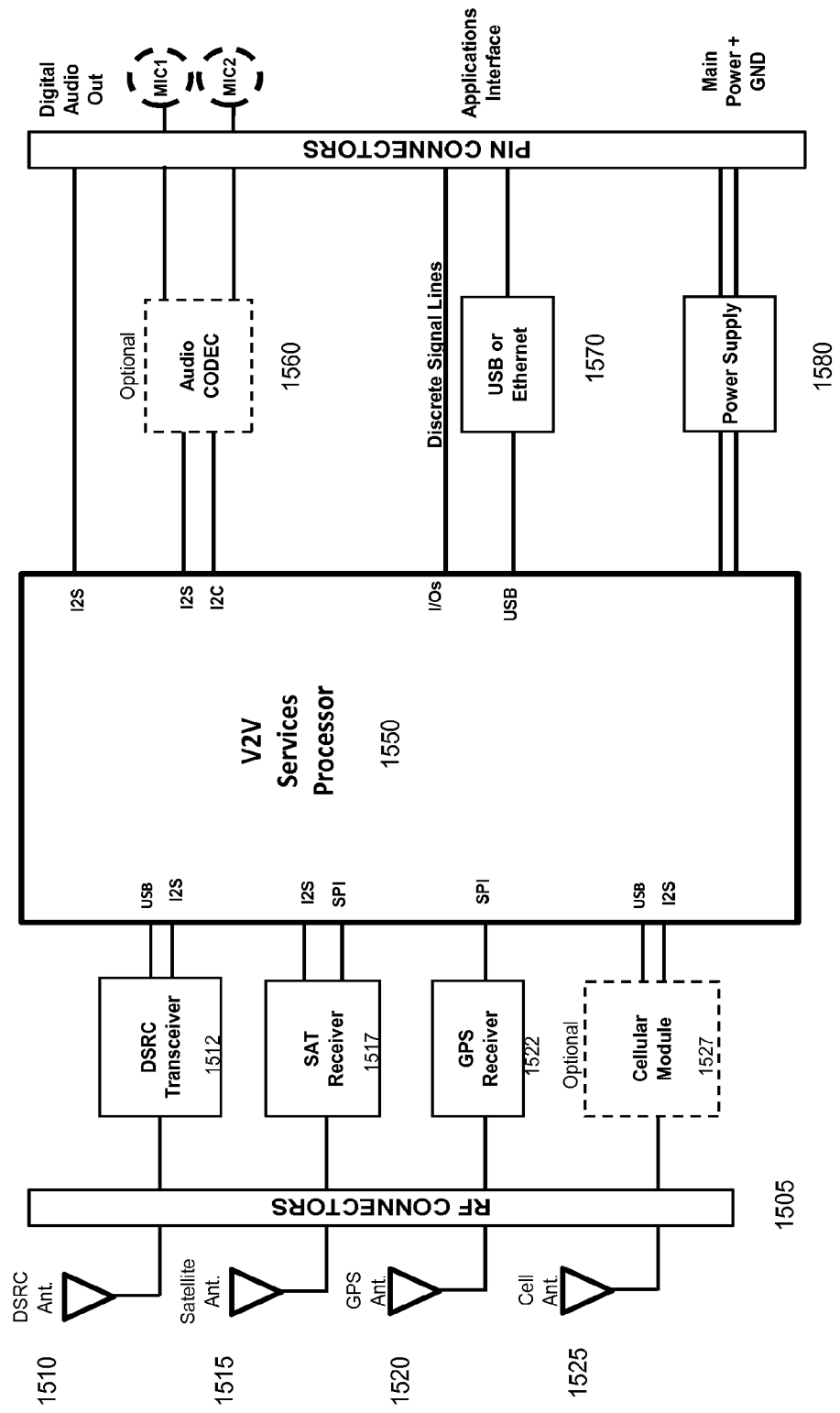

FIG. 12 depicts an illustrative exemplary V2V pilot program initiated by Volvo;

FIG. 13 illustrates depicts a block diagram of an exemplary V2V satellite broadcast system according to an exemplary embodiment of the present invention;

FIG. 14 illustrates an exemplary geotagged message delivery system according to an exemplary embodiment of the present invention;

FIG. 15 illustrates an exemplary on-board electronics system for use in the exemplary system of either FIG. 13 or 14;

Figures Relating to Active and Passive Channel Voting and Preference Processing

Figure 16:
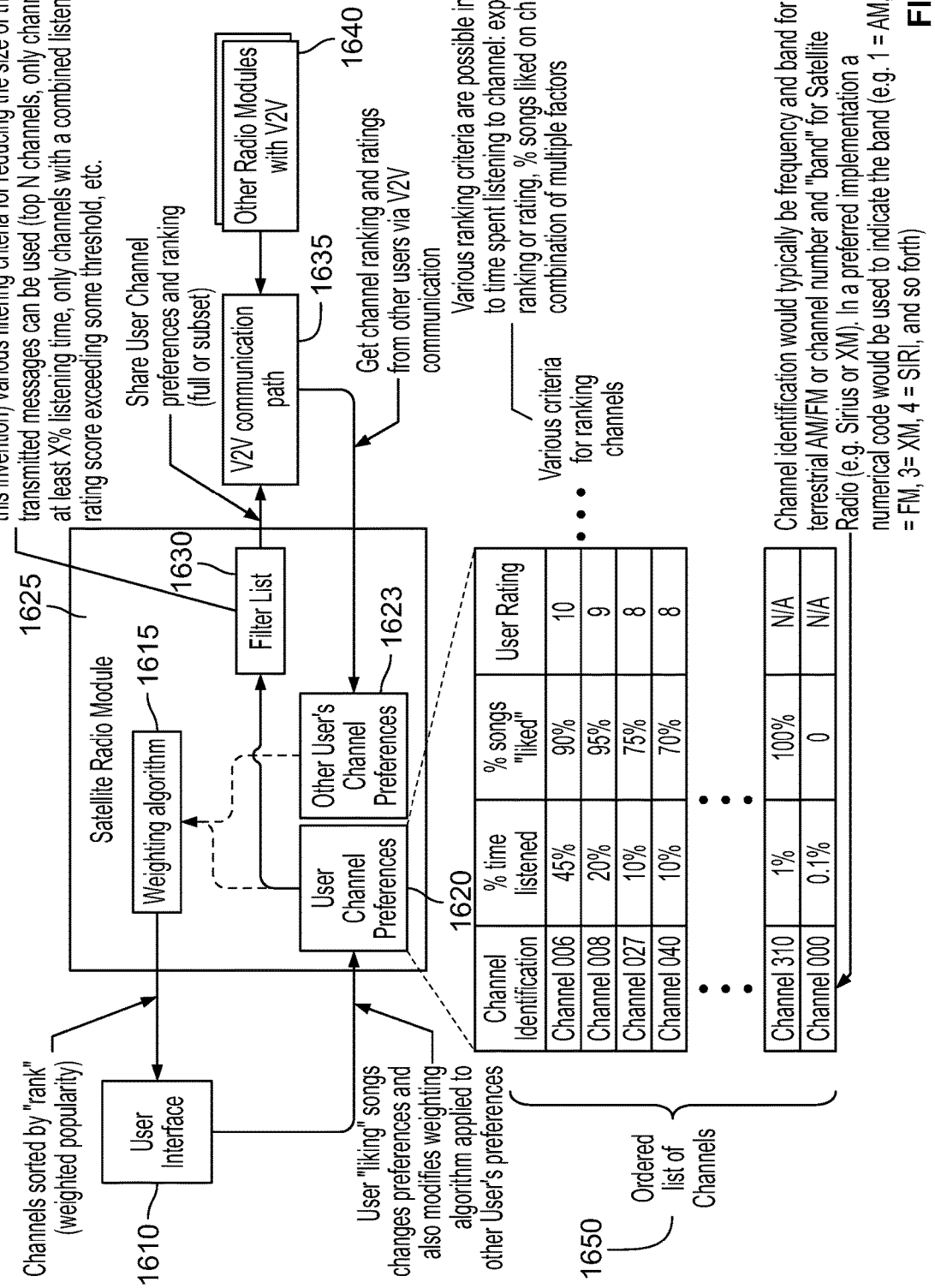

FIG. 16 illustrates an exemplary process for providing an Ordered List of Channels, acquiring User Channel Preferences, Other Users' Channel Preferences, generating a ranked list and sharing the processed User Channel Preferences over a V2V communications path;

FIG. 17 illustrates a specific example of the process depicted in FIG. 16, for a 5 channel list;

Figures Relating to A V2V Emergency Channel System

Figure 18:
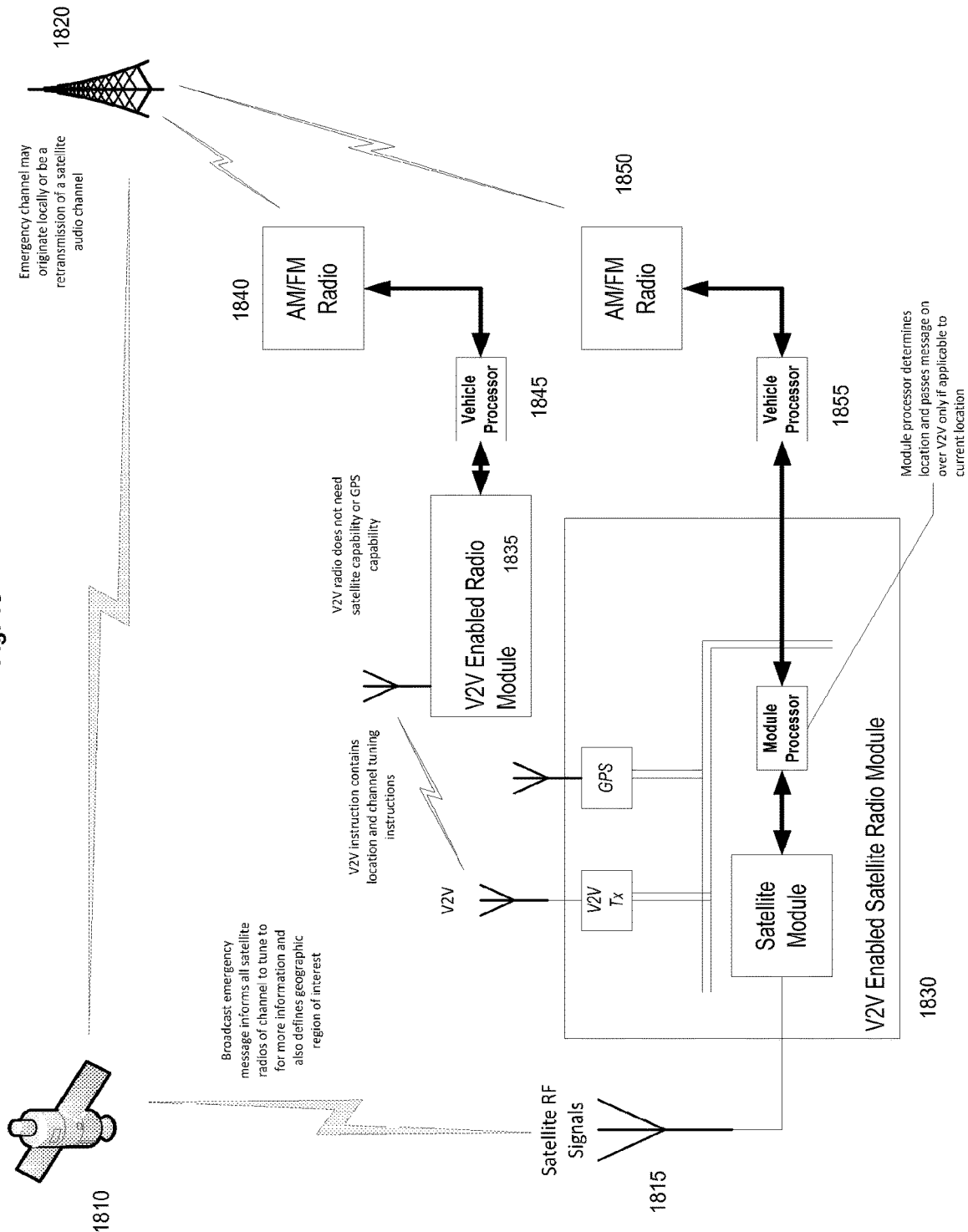

FIG. 18 illustrates an exemplary V2V Emergency Channel System according to an exemplary embodiment of the present invention;

Figures Relating to an Integrated Satellite Radio and V2V Antenna

Figure 19A:
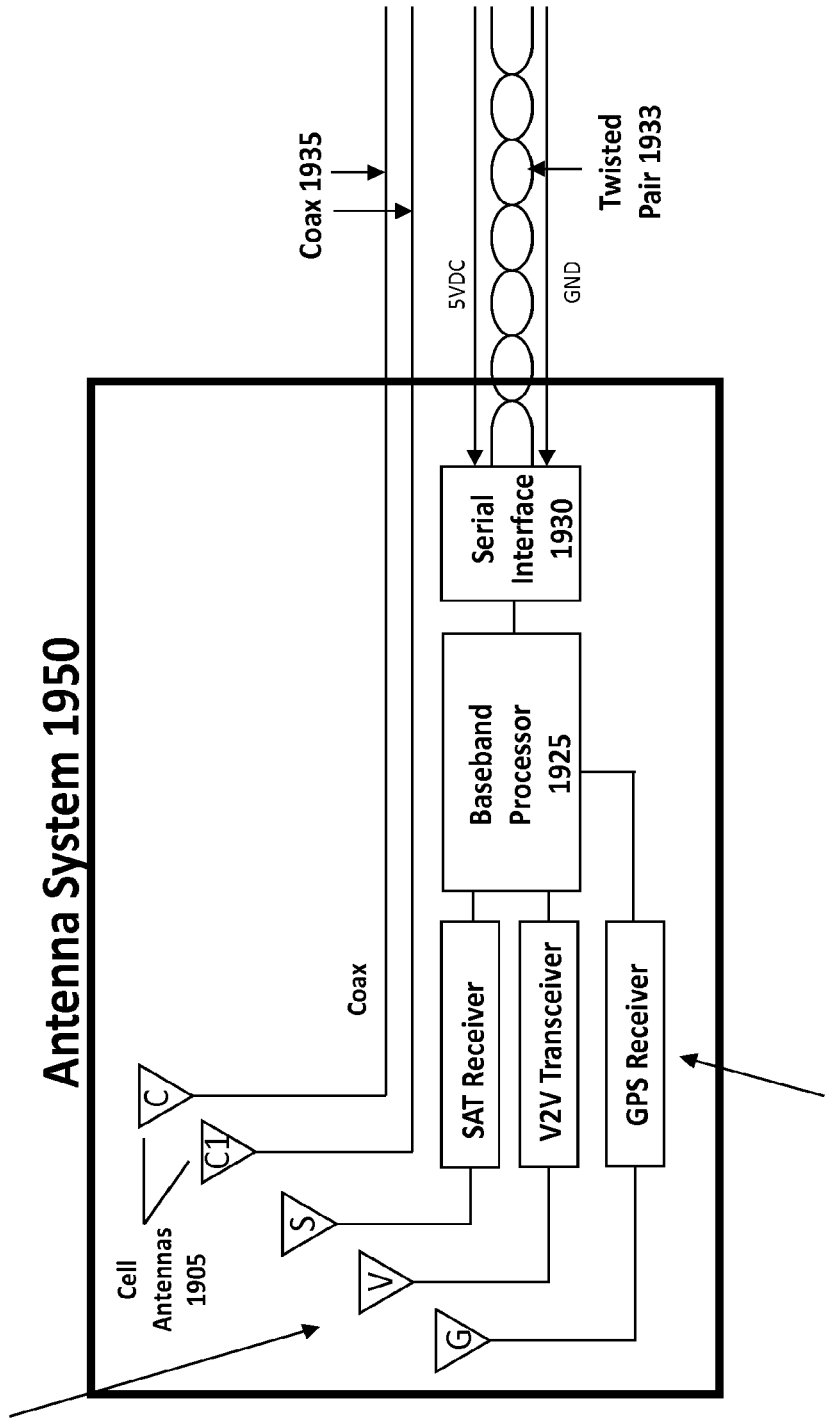
Figure 19B:
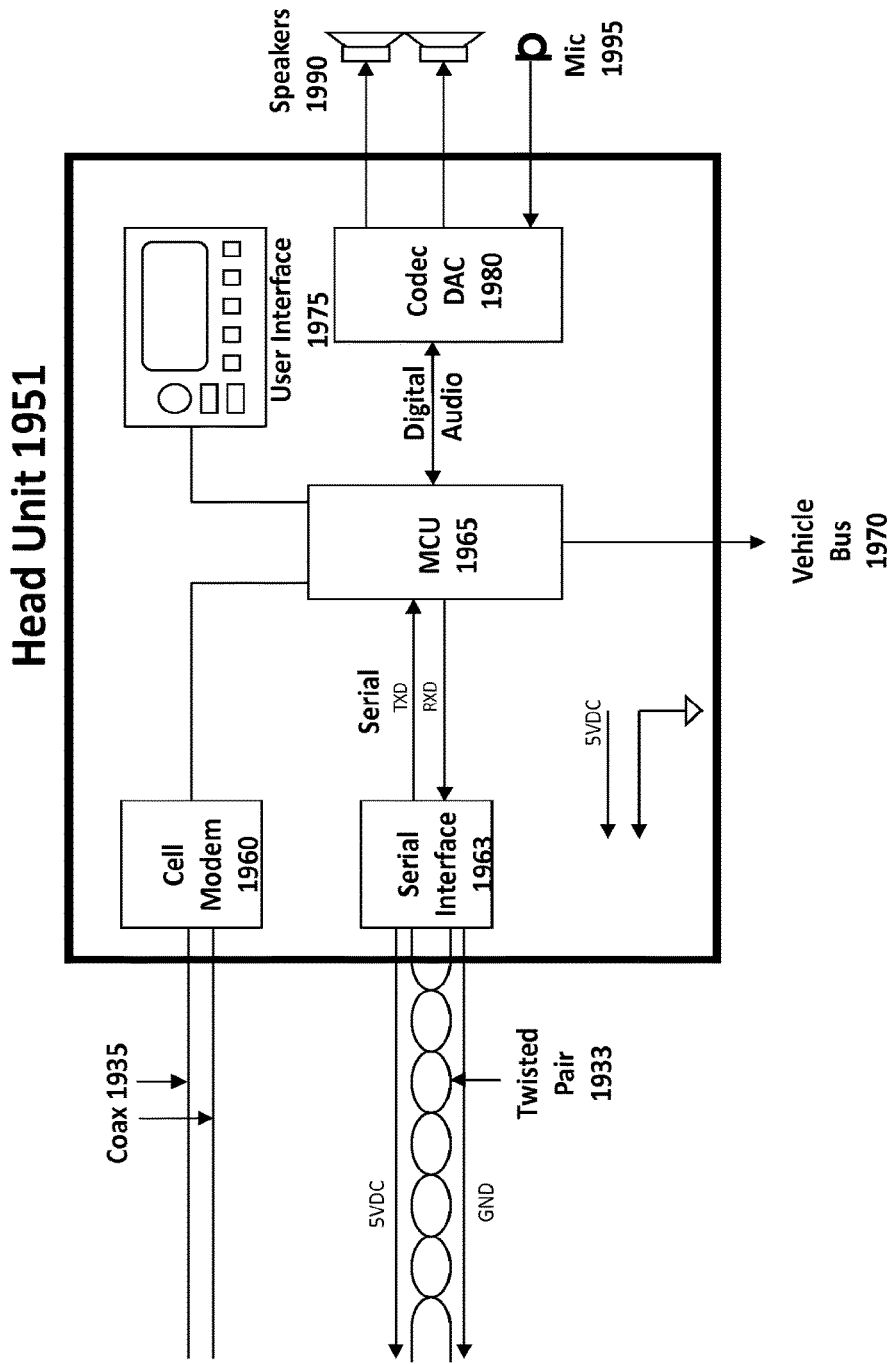

FIG. 19A illustrates an exemplary integrated SAT Radio and V2V antenna system, according to exemplary embodiments of the present invention; and FIG. 19B illustrates an exemplary Head Unit, designed to receive signals from the exemplary antenna system of FIG. 19A, according to exemplary embodiments of the present invention.

SUMMARY OF THE INVENTION

Various applications, systems and methods for using, and enhancing V2V communications for various purposes are described. These systems and methods may leverage, augment or enhance, or involve synergies with, SDARS functionality and services in combination with V2V and/or V2I communications.

One such synergistic use involves coupon and advertisement distribution. Accordingly, systems and methods are presented where V2V-enabled vehicles can receive advertisements or offers from RSEs, or even other V2V enabled vehicles, in a defined Target Region, which may then be played to a user in-vehicle once a given Trigger Region has been entered. By logging all advertisements or offers played to a user and sending the log to an RSE, for example, and from there to a content provider (e.g., an SDARS service operator), verified delivery of advertisements is achieved, which allows the content provider to obtain significant revenues from advertisers. In return for uploading the playback record from the vehicle to the RSE, a variety of incentives may be offered, such as (i) free or discounted satellite radio subscription; (ii) download credits for music or videos from an online store; (iii) reduced or free tolls on toll roads (e.g., RSE embedded in a toll collection plaza); (iv) premium audio or video content, (v) credit at an online store; and (vi) a special coupon code redeemable for merchandise.

In some exemplary embodiments, a wide area satellite broadcast system may be integrated with V2V and/or V2I communications to disseminate information to vehicles operating in a specified region. In other embodiments, RSEs may be positioned in areas so as to repetitively rebroadcast over the V2V channel either static or slowly changing messages to vehicles passing by the RSE in a given direction, such as "reduce speed, blind curve ahead". Such RSEs may, for example, be equipped with a satellite receiver, and may or may not have backhaul capability. In still other exemplary embodiments, V2V enabled vehicles with embedded sensors can be used to share sensory information which can then be processed to determine the location of "events of interest." These events can then be avoided by drivers with V2V technology and targeted for appropriate action by emergency responders such as police, fire departments, etc. For example, V2V-enabled vehicles that include acoustic sensors (i.e. microphones) can be used to create a low-cost acoustic sensor network for the purposes of locating the source of gunfire and using that information to enhance public safety. Finally, V2V-enabled vehicles can receive, advertisements/offers from RSEs or even other V2V enabled vehicles in a defined Target Region, which may then be played to a user in-vehicle once a given Trigger region has been entered. By logging all advertisements/offers played to user and sending the log to an RSE, for example, and from there to the content provider (e.g., SDARS service operator), verified delivery of advertisements is achieved, which allows the content provider to obtain significant revenues from advertisers. Various other applications and uses are detailed.

In other exemplary embodiments, systems and methods are presented for active and passive channel voting on received broadcast content, such as, but not limited to, a satellite digital radio broadcast or the like. In such embodiments, a vehicle radio may be provided with the ability to passively vote on channels (e.g., by measuring listening time), or have a user/listener actively rate songs and channels through a UI, share those ratings, and then use the collective votes of a crowd or set of listeners to guide selection of channels and songs based on their relative popularity with people having similar musical tastes. In some embodiments, a radio or receiver with at least (a) a method of receiving and playing a plurality of uniquely identifiable stations or channels (such as, for example, one or more SDARS channels) and (b) a processor which can keep track of the channels that a user selects, may be used to implement (i) methods for transmitting the listening history, or a summarized listening history, to similarly equipped radios or receivers, (ii) the ability to receive and store the listening history and/or ratings from other radios or receivers, and (iii) summing or averaging the listening history of all (or some relevant defined fraction of) other radios or receivers and presenting the resulting weighted list to a user. Methods for maintaining anonymity in V2V communications are also presented.

In yet other embodiments of the present invention, systems and methods to take advantage of the space diversity of neighboring SDARS vehicles to cooperatively improve the effective SDARS signal reception and Quality of Service ("QoS") of all vehicles within neighboring groups of vehicles are presented. The transmission of particular SDARS audio packets by V2V from one SDARS-V2V vehicle to another neighboring SDARS-V2V vehicle that reported the audio packets as lost (e.g. due to undetected packets or unrecoverable packets due to detected bit errors) can thus be accomplished. The receiving SDARS-V2V vehicle can request the audio packets sufficiently ahead of the time the audio packet is to be decoded and played to the user as part of an overall stream of packets that could represent a radio channel or particular track of a radio channel. Each requested and received "replacement" audio packet can be substituted for the missing audio packet. An overall stream of audio packets then consists of (i) some packets successfully received through the same vehicle's SDARS antenna and receiver, and (ii) other audio packets received by way of V2V from the SDARS antenna and receiver of other neighboring vehicles. The end result is the play of error free and dropout free audio to the end user by including the audio packets requested and received from neighboring SDARS-V2V vehicles. In addition, a method of combining SDARS and V2V communication systems to also provide gains from time diversity (gains relative to an SDARS-only system) is presented.

Additionally, embodiments directed to methods of warning a driver of a vehicle of an emergency or public safety vehicle approaching its vicinity are presented. Such methods include receiving an alert message communicated over the V2V network indicating that another vehicle has initiated that alert, processing the message to identify the location and relative direction of the initiating vehicle; and producing a virtual audio alert sound within the vehicle that is suggestive of a physical alert sound such as a siren, horn, railroad crossing alert, or police action announcement. The virtual audio alert may be a siren sound in a receiving vehicle corresponding to an alert generated by an emergency vehicle, a train horn sound in a receiving vehicle corresponding to an alert generated by a train, or a car horn sound in a receiving vehicle corresponding to an alert generated by a car, for example. In some embodiments the pitch of the virtual alert can, for example, mimic the Doppler effect produced by a real siren or horn—approaching or receding at the actual relative velocities of the receiving vehicle and the vehicle producing the alert.

Other exemplary embodiments of the present invention are described where V2V enabled vehicles with embedded sensors can be used to share sensory information which can then be processed to determine the location of "events of interest." These events can then be avoided by drivers with V2V technology and targeted for appropriate action by emergency responders such as police, fire departments, etc. For example, V2V-enabled vehicles that include acoustic sensors (i.e. microphones) can be used to create a low-cost acoustic sensor network for the purposes of locating the source of gunfire and using that information to enhance public safety.

Finally, a satellite radio and V2V antenna system may be integrated. An example of such an integrated SAT Radio and V2V antenna system is thus presented. Such an integrated antenna may be used in connection with any of the above described embodiments. Such an exemplary antenna system may include multiple passive antenna elements to support frequency bands used by the antenna system. For example, an antenna element can be tuned to receive satellite radio transmissions in the 2.3 GHz frequency band and may thus be connected to a satellite receiver. The satellite receiver can process RF signals received from the antenna and output baseband digital signals to a baseband processor. Similarly, another antenna element may be tuned to the 5.9 GHz frequency band to transmit and receive V2V signals and may be connected to a V2V Transceiver. The V2V transceiver may contain both a receiver portion to process the V2V signals received from the antenna element and a transmitter portion coupled to the same antenna element for transmitting V2V signals. The V2V Transceiver may also be connected to the baseband processor, which receives baseband digital signals from the receiver portion of V2V Transceiver and sends baseband digital signals to the transmitter portion.

DETAILED DESCRIPTION OF THE INVENTION

In what follows, several scenarios, applications, systems and methods for using, and enhancing V2V communications (including V2I communications) for various purposes are described. These applications, systems and methods leverage various aspects of the satellite radio technology in various synergies and interoperations.

I. Exemplary Systems and Methods for Anonymously Distributing Coupons or Advertisements to Geographically Targeted Customers Using a Hybrid Satellite/2V Network A. Background:

The success of social media sites such, for example, as Groupon, LivingSocial, Yipit, ScoutMob, Facebook and others indicates that consumers are willing to share some information about themselves (such as, for example, an email address), as well as accept targeted advertising, in exchange for offers of discounted goods and services, or other opportunities, provided by such sites. For advertisers, these sites thus represent an opportunity to reach nearby consumers with time, volume-limited or otherwise restricted offers in a more cost-effective manner than using web or newspaper advertising.

For many people, however, the loss of privacy involved in giving up their email address, and perhaps their name and address as well, outweighs the benefits of the available discounts.

One possible solution is a satellite broadcast of "offers" to users of satellite radio devices in which the offers contain text messages, images, and/or audio clips, which may stand alone (e.g, an advertisement) or be sent along with a coupon code. Since the broadcast would reach all satellite radio users, it would not require the users to provide any personal information. However, this approach has several significant drawbacks, such as:

1. The broadcast offers would need to be repeated multiple times to ensure that all users had received them and had not missed them because their satellite radios were turned off or in a no-signal condition;
2. Because of the wide distribution of satellite radio signals, offers relating to local establishments would be distributed to radios all across the country, including radios that would have no reasonable opportunity to take advantage of them; and
3. Not all satellite radios have location awareness; therefore users would need to sort through hundreds or thousands of offers to find ones that applied to geographically nearby establishments.

Another possible solution involves the use of a set of locally-stored offers in a V2I capable piece of Road Side Equipment (RSE). As vehicles enter communication range of the RSE, in addition to required safety information, the RSE could transmit any offers for goods or services for establishments in some defined surrounding area (or in the direction of travel). Vehicles could then (at the driver's option) display available offers for various categories of goods and services (such as food, hotels, gasoline, shopping, etc.) without divulging any personal information.

However, a major drawback of this approach is the cost of distributing and updating the database of locally-tailored offers to each piece or installation of roadside equipment.

Accordingly, in exemplary embodiments of the present invention, the problems of satellite-only and V2V-only solutions, as well as existing social networking coupon distribution systems that rely on email, can be solved by making use of a hybrid V2V-Satellite broadcast solution.

In a preferred embodiment, a central location collects offers from merchants and advertisers. The offers include at least one location where the offer is valid, and at least one of the following additional elements: text, an image, and an audio clip, along with a desired target geographic region of interest in which the advertiser or merchant wishes to distribute the offer. For large attractions (e.g., theme parks or vacation resorts) the geographic distribution region can be quite large or even national. For other establishments (such as, for example, hair salons or neighborhood flower shops) the geographic distribution could be a region within walking distance. In exemplary embodiments of the present invention, the central location transmits the offers over a satellite to V2I connected Road Side Equipment within the target geographic region of interest. The offers are then stored and then retransmitted to V2V-capable vehicles that enter the communication range of the RSE. For large regions of interest many RSE's may receive, store and retransmit the offers, while, for extremely local offers, only a single RSE may receive and retransmit the offers to vehicles passing through their communication range. A central "offer collection agency", or any entity set up to manage this form of advertising, can collect fees for distributing the offers or advertising. It is noted that The location in which the offer is valid may be different than the targeted region of interest. For example, a Florida theme park or resort could target inhabitants only of a northern state or city (=region of interest) with an advertisement or a special offer redeemable at the Florida location (=offer validity region). This may be particularly successful right after a snowstorm or cold spell. Such a technique can be extended to distributing geographically targeted advertisements without coupons or special offers.

FIGS. 4-6 illustrate various aspects of this technology. With reference thereto, FIG. 4 illustrates an exemplary V2V equipped vehicle 415 approaching a roadway in the vicinity of various vendors and businesses according to an exemplary embodiment of the present invention. These can include a food vendor 425, a motel 430, a gas station 435 (that does not advertise or make a V2V offer), and another gas station 440 (that does provide incentives over V2V). The roadway is within a communication range of RSE 420. RSE 420, for example a traffic light, communicates with vehicle 415, as well as satellite 410. Satellite 410 can receive offers from uplink station 405, such as, for example, an SDARS studio/programming facility, and send offers relevant to a particular region around one or more RSEs 420. As shown in FIG. 4, businesses can offer time-limited deals to nearby consumers, such as hotel/motel 430 looking to fill vacancies offering, for example, "Last minute booking rate of $29 per night." Similarly, restaurant 425 can offer "10% off hot dog" and include its address. Finally, as shown, gas station 440 can use V2V delivered incentives to capture additional market share from nearby business 435, which does not advertise.

FIG. 5 illustrates various types of in-vehicle equipment and their corresponding abilities to received geo-tagged messages according to exemplary embodiments of the present invention. These include, for example, a satellite receiver equipped vehicle without V2V capability 510, a V2V equipped vehicle (without satellite receive capability) 520, and a V2V equipped vehicle with satellite receiver capability 530. Satellite module without V2V capability 510 can only receive satellite transmissions when turned on, in good coverage. Location determination is here optional, only for vehicles with NAV capability. V2V module 520 can only receive/transmit in a local area or (optionally) over cellular networks at high costs. V2V module with satellite receive capability 530 can store satellite messages (images, text, audio clips) with associated geo-tags, and can display these messages (which may include special offers of coupons in addition to paid advertising, which could partially or completely offset the cost of the roadside equipment). FIG. 5 provides block diagrams of each of the three exemplary vehicle modules, as shown. Thus, module 510 is missing the V2V/V2I Rx/Tx sub-module, and also shows GPS Rx ghosted, as in 510 it is only optional, as noted. As to all other sub-modules, (Satellite Module Rx, Data Storage Capability, Processor, and User Interface) the three examples are identical.

FIG. 6 illustrates an exemplary satellite/V2V geo-tagged message system according to an exemplary embodiment of the present invention, and how various vehicle types as shown in FIG. 5 interact with it. With reference to FIG. 6, there is seen satellite uplink facility 605; satellite 610 and roadside equipment 620 which is inside a geographic reason of interest. RSE 620 has satellite receive capability, and can thus receive, store messages, and retransmit them to vehicles entering the region of interest. Continuing with reference to FIG. 6, the region of interest is here drawn as a ellipse surrounding RSE 620. FIG. 6 also depicts a number of vehicles equipped with V2V communications capability, and with or without satellite transmission receiver capability, approaching and interacting with satellite 610 and RSE 620, such as vehicles 625, 630 and 650. With reference thereto, at 625 there is shown a V2V equipped vehicle with satellite receiver capability. The vehicle may, for example, thus receive a geotagged message directly from satellite 610 when the vehicle is not within the geographic region of interest surrounding RSE 620. At 630 is shown (in red) another vehicle, here a V2V equipped vehicle with satellite receiver capability that travels to position 635 (dotted red line indicates the path traveled). It is noted that at position 630, the V2V equipped vehicle with satellite receive capability may have its radio turned off, or the vehicle may be stored in a garage—and thus not have satellite receiver capability—at the time a geotagged message is broadcast from satellite 610. However, as noted, because vehicle 630 then moves to position 635 where it is within the range of RSE 620 and its region of interest, it can receive the stored messages (e.g., advertisements or coupons) from RSE 620 that were broadcast from satellite 610, but which it did not receive when it was at position 630. Thus, with both satellite and V2V technology, a vehicle has a backup, or redundant signal, system to insure reception of ads.

Also shown at 650 is a V2V equipped vehicle without satellite receive capability. This vehicle is just within the region of interest surrounding roadside equipment 620 and therefore can directly receive the stored messages that satellite 610 had transmitted to roadside equipment 620. Thus, as shown in FIG. 6 both V2V equipped vehicles with and without satellite receive capability can receive messages sent over a satellite either directly, as in the case of vehicle 625, or indirectly, as in the case of vehicles 635 and 650, from roadside equipment that has also received the message. Thus, by utilizing a hybrid satellite V2V system, the reach of satellite radio can extend far beyond its set of subscribers.

It is noted that, for example, audio coupons or other audio advertisements delivered to an exemplary vehicle can be played over the radio to a driver in a seamless manner by leveraging existing advertisement insertion techniques, such as, for example, those described in U.S. Pat. No. 8,544,038, entitled "System for insertion of locally cached information into a received broadcast stream", or, for example, U.S. Pat. No. 7,822,381 entitled "System for audio broadcast channel remapping and rebranding using content insertion", both of which are incorporated herein by reference. In exemplary embodiments of the present invention, audio advertisements may be assigned to broad categories, such as, for example, "Restaurants", "Merchandise", "Entertainment", "Automotive", etc., and/or to narrow categories such as "Tire Specials", "Dog Services", "Landscaping Services", etc. to enable satellite radio premium users—for whom advertisements are normally blocked—to selectively enable specific types of advertisements. In such embodiments, non-premium users would not have this option and the system would determine which ads are played out to them. The system for inserting the audio advertisements could be applied to all sources of audio played in the vehicle, including satellite broadcasts, AM/FM broadcasts, IP audio streaming from either an embedded modem or a tethered modem, content from a CD or content from an MP3 player, for example. This is thus another example where satellite originated ads extend to areas far beyond just the satellite radio programing.

In exemplary embodiments of the present invention, delivery of coupons or audio advertisements can, for example, use the V2V communication system to confirm delivery of the content to the vehicle and/or to confirm that the content has been played out or otherwise communicated to the driver. For example, once a local or national audio advertisement has been received by a vehicle radio system and is stored in the radio buffer, the radio system could then transmit to a RSE a "confirmation of reception" message which may include an identifier for the associated advertisement. Once the audio advertisement has been played out, the radio system may, for example, transmit a confirmation message to a RSE indicating that the advertisement has been delivered. Additional information could be contained within the confirmation message, such as, for example, whether (i) the advertisement was played in full, or whether (ii) the driver changed the channel, or (iii) turned off the radio before completion. A central location can then collect the confirmation data from various RSEs and provide the delivery data to advertisers. An exemplary hybrid V2V-Satellite broadcast system could then set rates for advertising based on the delivery statistics captured from the V2V system, which would provide much greater accuracy and feedback to advertisers.

B. Additional Description; Alternate Approaches:

In exemplary embodiments of the present invention, an offer or advertisement may be preferentially broadcast over a satellite link to Road Side Equipment so as to avoid the bandwidth cost of transmitting the offer/advertisement to each individual RSE over an IP communications channel (which could get costly). In an alternative implementation the offers could be transmitted over an IP link from the central location to each RSE in the Target Region, or in still further embodiments, in some managed combination of both satellite and IP channels.

For example, in an alternate implementation intended to save both (i) power at the RSE as well as (ii) IP bandwidth, a short message can be sent over an IP connection or a wireless connection (e.g. Short Message Service or SMS) instructing the RSE to power up a satellite receiver, and then the advertisement/offer can, for example, be broadcast over the satellite link and received and stored by the RSE within the Target Region.

C. Target Region Definition Methods

In one implementation, for example, a Target Region may be explicitly defined and associated with an advertisement/offer. The RSE would then determine if it is located within the Target Region by comparing its known location to the explicitly defined Target Region (as described below). In another implementation, for example, the central location can define the Target Region implicitly by listing specific RSEs which are to receive the offer/advertisement. In such an implicit implementation there can be at least two methods of defining the list of RSEs. These include: (i) a list of RSE identifiers can be attached to the offer/advertisement and RSEs can store the offer/advertisements that have their identification attached to the offer/advertisement, or (ii) the central location may send each RSE in the implicit Target Region a unique advertisement or offer identification (the "Offer ID") in a short message (e.g. over SMS or IP connection) and the RSEs that received the Offer ID would store that particular offer when it was transmitted over the satellite.

D. Exemplary Tags Included with or Associated with the Advertisement/Offer

In exemplary embodiments of the present invention, an offer/advertisement can include one or more of the following exemplary tags to narrow or widen the audience and to limit (or not) the times, channels, locations etc. at which the offer is presented to the user.

1. Target Region

This tag specifies a geographic region within which an RSE will store the advertisement for transmission over V2V to passing vehicles. The Target Region may be a single continuous geographic region, and may, for example, be defined by a center coordinate and a radius, or multiple centers and radii, thus defining a circular, or elliptical, Target Region. Or, for example, the Target Region may be defined as a polygon with defined coordinates for vertices and the edges between those vertices defining the boundary of the Target Region, such as a square, rectangle, etc.

In exemplary embodiments of the present invention, the Target Region may be defined with reference to a navigation or other similar database stored in the RSE. In such exemplary embodiments, using the database, the Target Region may be defined using street names, city names, neighborhoods, state, county, congressional district or country boundaries, or other database indices.

Alternatively, the Target Region may be a compound region made up of two or more Regions defined using any of the methods described above. Finally, the Target Region may be defined implicitly by a central location by creating a list of specific RSEs which have the offer/advertisement loaded.

2. Trigger Region:

This tag specifies a geographic region within which any stored advertisements will be played or displayed to the user (i.e., the driver, or in an alternative implementation, to passengers within the vehicle).

In exemplary embodiments of the present invention, a specific advertisement or offer may be triggered within a single trigger region, or, for example, a specific advertisement or offer may be triggered in several distinct, overlapping or non-overlapping, trigger regions. For example, the trigger region could be defined as "within 0.5 miles of every business location belonging to a particular chain (or other affiliation) within the Target Region".

In some embodiments, the Trigger Region may be identical to the Target Region, or one or more Trigger Regions may be contained within the Target Region. Or, for example, the Trigger Region or Regions may be partially within the Target Region and partially outside of the Target Region, or even fully outside of the Target Region. Various combinations are all possible, and all are understood as being within the scope of the invention.

In exemplary embodiments of the present invention, the Trigger Region, or any portion of the Trigger region, may be direction-specific, such as, for example, dependent on the direction of vehicle travel. Thus, for example, vehicles travelling North on ABC Street between $5^{th}$ avenue and $9^{th}$ Avenue could be targeted, while vehicles travelling South in the same region, on the same street, could be ignored or targeted with a different advertisement/offer. This can be particularly useful when a main street has a divide, or greenbelt, making only one side of the street accessible to a particular direction of travel.

In exemplary embodiments of the present invention, Trigger Region(s) may be defined in the same or similar manner to Target Regions, as described above, with the exception of implicit definition by set of RSEs having the offer or advertisement.

3. Unique Advertisement or Offer Identification Number (Offer ID)

This tag can be used to prevent the same piece of content from being loaded and stored from more than one RSE operating in the same geographic region (Target Region). Thus, in exemplary embodiments of the present invention, a vehicle can examine the Offer ID ("OID") before deciding whether or not to store the offer transmitted by the RSE. If the OID matches the OID of an offer that is already stored, the message can be ignored.

4. Validity Period:

This tag specifies a time period during which the RSE may transmit the stored advertisement or offer to passing vehicles. For example, a validity period may be a date, or a range of dates, (start and stop), or an explicit set of dates, or for example, a specific time of day (e.g. from 10 AM to 2 PM). In exemplary embodiments of the present invention, a validity period may have an associated recurrence (e.g. every day from 4 PM to 6 PM, or every Saturday).

In a preferred implementation, the central location can update the Validity Period of a given advertisement/offer using a short message transmitted over IP wireless, or satellite link, without retransmitting the entire offer.

5. Playback Audio Source Target:

This tag specifies the audio source or sources which may have offers/advertisements inserted. For example, the audio source may be "all audio content" so that the message is played back regardless of the audio source. It is noted that this may be suited for emergency and safety alerts such as amber alerts, etc. Or, for example, the audio source may be one or more specific satellite radio channels, or genres, so that advertisers can target listeners of a specific channel or set of channels where the set of channels may: (i) all be in the same category or genre, (ii) may be a set of the most popular channels regardless of genre, (iii) may be an arbitrary set of channels chosen from several different genres, or (iv) may be during playback of specific content whether stored or live (e.g only during the Howard Stern show, only during St. Louis Cardinals games, etc.).

In some embodiments, the audio source may be "all satellite radio channels", or may be terrestrial radio such as AM or FM (e.g. carrying a message that says: "why not try satellite radio"). Finally, the audio source may be restricted to locally stored content or CDs, or various combinations of the above.

6. Playback Validity Period:

This tag defines the date, or date range during which the offer/advertisement may be played or displayed to users.

7. Maximum Playback Count:

This denotes the maximum number of times that a single offer/advertisement may be played or displayed before being deleted. This may be, for example, one time, many times, or unlimited times, or, for example, a function of user listening, geographical location, or other trigger variables.

8. Playback Frequency:

This refers to the target time between subsequent playback for a particular offer/advertisement. This could be, for example, "daily", "hourly", every N minutes, weekly, or never (i.e., play only once and never play again). Moreover, there could be some fixed maximum default frequency (e.g. once every 10 minutes) to prevent the same offer being repeated too frequently if a vehicle stays within the trigger region for a long time, such as, for example, if the trigger region is large.

9. Playback Time:

This tag indicates the period of time during which the advertisement/offer should be played or displayed. In exemplary embodiments of the present invention, playback time may be "any time", in which case the offer playback or display would be triggered whenever the vehicle enters the Trigger zone. Alternatively, for example, playback time could be limited to one time of day (e.g. 5 PM to 8 PM), or to several distinct time periods. Examples include (i) food offers that may be targeted at 6:00 to 9:00 AM, 11:30 AM to 1:30 PM, and 6:00 PM to 8:00 PM under the assumption that playing an ad for a food offer may not produce results at, say, 3:00 PM or 2:00 AM, or (ii) special ads/offers for 24 hour establishments, which, on the other hand, may be targeted at odd hours such as 11 PM to 4 AM when drivers may be interested in finding a nearby place that is still open.

10. Target Vehicle Size:

Additional conditions can be applied to vehicles so that offer/advertisements are not downloaded to vehicles unless they fall within certain vehicle size limits Offers/advertisements could be aimed at vehicles above a certain size (e.g. trucks) or below a certain size (e.g. compact vehicles or motorcycles) or for example, at all vehicle sizes.

11. Target Vehicle Speed:

Depending on the speed of the vehicle and the bandwidth available for downloading the offer/advertisement, it may not be possible to download certain advertisements/offers while the vehicle is within communication range. In exemplary embodiments of the present invention, it may be possible to have both a shorter and a longer version of an advertisement, with the shorter version transmitted to vehicles that are moving faster. As one example, if one uses 300 meters as the distance over which communication between the V2V-capable vehicle and the RSE takes place, at a speed of 65 mph ("high way speed") the vehicle will remain in contact for about 10.3 seconds, while at a speed of 20 mph there would be over 33 seconds of contact time. This concept can be similarly extended to various vehicle and download speeds.

12. Target Vehicle Direction:

In exemplary embodiments of the present invention, certain advertisements/offers may be transmitted only for vehicles heading in specific directions (for example entering the on-ramp of a high-way rather than leaving the highway, or vice versa). Rather than restrict the Trigger Region to a single region, as noted above, in exemplary embodiments of the present invention, a tag can instruct the RSE to download the offer to vehicles only if they are heading in a particular direction, or for example, combine the two restrictions in various ways.

13. Target Vehicle Playback Devices:

In exemplary embodiments of the present invention, certain offers/advertisements could be restricted for display and/or playback only via devices within targeted vehicles not normally operated by the driver while driving, such as, for example, mobile devices locally connected to the vehicle's infotainment/connectivity system that are used by vehicle passengers (e.g. paired, Bluetooth connected, or docked smartphones). Such restrictions can be imposed by the receiving vehicle system, e.g., imposed by the vehicle manufacturer or by a user preference settings, and/or imposed by metadata accompanying the offer/advertisement or any combination of these.

E. Alternative Forms of Compensation for Listening to (or Displaying) Advertisements Delivered Via Satellite/V2V Synergies In exemplary embodiments of the present invention, in return for uploading the playback record from the vehicle to the RSE, a variety of incentives may be offered, such as, for example, one or more of: (i) free or discounted satellite radio subscription; (ii) download credits for music or videos from an online store; (iii) reduced or free tolls on toll roads (particularly where the roadside equipment is embedded in a toll collection plaza); (iv) premium audio or video content, such as, for example, bonus songs, or television programs; (v) credit at an online store; and (vi) a special code (coupon code) redeemable for merchandise.

In exemplary embodiments of the present invention, larger rewards could be offered in return for more personal information, such as, for example, the automobile's VIN, user's email address, or other information that would tie listening preferences to a particular individual or at least a shared vehicle.

In a preferred implementation, the value of the incentive or reward may be tied to the number and duration of advertisements that were listened to (e.g. the size of the playback history). In such an implementation, for example, upon successful transmission of the playback record to RSE, the playback log would be cleared to prevent receiving multiple rewards for listening to the same advertisement or offer.

F. Exemplary Scenarios

FIGS. 7-11 illustrate further details of this technology, and various exemplary scenarios of vehicles interacting with RSEs. With reference thereto, FIG. 7 depicts an exemplary V2V capable vehicle interacting with two roadside equipment installations, RSE1 755 and RSE2 750. The exemplary vehicle is shown as it travels from RSE1 755, along a roadway, and then to RSE2 750. At Step 1 (labelled "1" in FIG. 7), the V2V capable vehicle entering the communication range of RSE 1 755 triggers RSE1 755 to wake up and send stored offers to the vehicle over the V2V link. The V2V capable vehicle is provided with satellite receiver capability, as shown at 730. As the V2V-equipped vehicle crosses the country, for example, listening to a variety of audio sources (including, but not limited to, AM, FM, Satellite Radio, IP streaming, locally stored MP3 or other compressed audio, CD, SACD, DVD Audio, etc.), locally relevant offers or advertisements can be constantly loaded via an V2I connection with a nearby RSE, and the playback log for the loaded content can be returned from the vehicle to the RSE, where it may be retrieved, for example, over an IP connection from the RSE. In an alternative implementation the playback log can be transmitted directly from the vehicle over a wireless network other than V2V (such as LTE, or a WiFi connection, etc.). As in the V2V implementation, when the vehicle is outside of coverage range, the log is stored and when the vehicle enters a coverage region the playback log is transmitted to the RSE, and from there to a central location— Central Offer Consolidation Location 710—where all advertising statistics can be analyzed. (Central Location 710 is an example of the general "central location" used in this technology, referred to and described above.) The capturing of such a playback log is critical to obtaining premium advertisement rates, as it proves actual number of times an advertisement was played to an actual user, and also in which program, channel, etc., it was played, and whether a user listened all the way through.

It is noted that Roadside Equipment RSE1 has stored "offers" (advertisements etc.). A logical diagram of its component elements is provided at 720. It has a Satellite Module that may be powered on at all times, or that may be normally turned off and only powered when an IP message indicates that new offers are being transmitted over the satellite link. Thus, a wake-up signal may be sent to a Power Control Unit (1 of 3 being shown), and there may also be provided a Constant Low Power to V2V Rx Unit, Satellite Rx, and an IP connection (Rx). As shown in FIG. 7, Switched Power can be, for example, enabled when (1) the Satellite module detects a message relevant to RSE, or when (2) the V2V Receiver V2V Rx detects a Basic Safety Message (V2V traffic), or when (3) incoming IP traffic is detected.

In exemplary embodiments of the present invention, the location of an RSE may be pre-programmed into the RSE unit, since it is fixed rather than mobile, or alternatively, a low-cost GPS unit (shown as GPS Rx within diagram 720) may be included so that the RSE can be easily installed and relocated without complicated or time-consuming set-up, as well as so as to reduce the chances of operator error.

The IP connection between the RSE and a Central Offer Consolidation Location 810 may be, for example, a wireless connection (e.g. LTE, WiFi), or a hardwired connection (phone line, Ethernet etc.). Central Offer Consolidation Location can, for example, trigger the RSE to enable Satellite Receiver, upload offers through satellite, and periodically collect playback logs from the RSE (or vehicles) over an IP connection.

Continuing with reference to FIG. 7, at Step 2, labelled "2" in FIG. 7, the example V2V capable vehicle with a stored offer enters the "Trigger Region" 760 along the roadway. This fact can be determined by the in-vehicle Processor (whose details are shown at 730) comparing the offer target coordinates with the then extant vehicle GPS coordinates. The processor can thus insert the stored offer (or advertisement) into the audio stream and display it on a User Interface, or optionally trigger the display of the offer (advertisement) on a "Brought In Device"—which can be, for example, a smartphone or tablet that is linked, docked or paired to the vehicle and is acting as a secondary display primarily for use by passengers.

Finally, at Step 3 in FIG. 7, the V2V capable vehicle enters the communication range of RSE 2, which wakes up when it receives a BSM message from the vehicle. Additional offers may be then transmitted from RSE 2 to the vehicle, and also, in return for some benefit (e.g., reduced toll, additional discounts, free song or video download, etc.) the playback log can be transmitted to RSE 2.

FIG. 8 depicts six exemplary RSEs, as well as a Target Region and a Trigger Region, in an exemplary layout according to one exemplary embodiment of the present invention. The Target Region has a center at 855, and includes four RSEs within it. Thus, RSE 850 is 1 of 4 locations of Roadside Equipment within the Target Region, along with well RSE (2) 845, RSE (3) 860, and RSE (4) 865. The Edge of Target Region 853, in this example, is defined by a distance from center 855, but in other embodiments could be defined by, for example, a polygon with vertex coordinates, an ellipse, or streets in a navigation database, etc., as described above. Each of the four RSEs within the Target Region have a circular region drawn around them which indicates the range of V2I communications links from them. Road Network 863, shown as a shadowed light grey background element, for example, is shown passing through the Target Region, in four segments passing within one of the four RSE locations within the Target Region.

Additionally, Roadside Equipment locations RSE (5) 837 and RSE (6) 815, shown to the right of the Target Region, can receive messages from vehicles entering their communications range that may indicate one or more of the following: (i) IDs of any and all advertisements that were played; (ii) what audio source was interrupted to play the advertisements; (iii) when the advertisement was played, (iv) where the vehicle was at the time it was played; (v) if the vehicle stopped near one of the "offer locations" associated with the advertisement after the advertisement was played; and (vi) the location of the vehicle when the advertisement or offer was received, such as for example, near RSE 1, 2, 3, or 4. RSEs (5) 837 and (6) 815, are also shown with their respective circular communications ranges 840, and a similar circular region around RSE (6) (not index numbered).

Further, there is shown in red a Trigger Region, the small circle to the lower right of the Target Region, with center 823 and edge 810. A Trigger Region is the geographical area in which a received advertisement or offer is actually played to a user in a vehicle. The Edge of Trigger Region 810 (shown here as a circle entirely outside of the Target Region) may be, for example, (a) inside of, (b) outside of, or (c) partially within and partially outside of, the Target Region, in various exemplary embodiments. In one implementation, a Trigger Region may be coincident with the Target Region so that as soon as an advertisement or offer is received it can be immediately triggered. Trigger Regions, like Target Regions, may be defined in a variety of ways, and may also be dependent on a vehicle's speed and heading in addition to location—for example, for faster moving vehicles the trigger region may be larger, and for slower moving vehicles the trigger region may be smaller. RSE (5) is 837 outside of Trigger Region 823 near Offer Location B 825, and, as noted, has its center at 840, which itself is the range of V2I communications link from RSE 5. Similarly, RSE (6) 815 is provided near Offer Location C 820, also outside the Trigger Region. Offer Location A 835 is also shown.

FIG. 9 depicts an exemplary system implementing the various technologies and applications described above, regarding reception of advertisements in vehicles from roadside equipment. With reference to FIG. 9 there are shown various sources of live digital audio content 915, various sources of stored audio content 920, digital in-vehicle storage 910, a processor 950, a brought-in device 960, a primary vehicle user interface 965 associated with processor 950, vehicle to vehicle communications equipment 935, roadside equipment (RSE) 930 and GPS or other positioning/navigation device 970. These elements, and their respective interactions, will now be described in detail.

With reference to the upper portion of FIG. 9, the sources of live digital audio content 915 include streaming internet audio content, a digital tuner, and a satellite radio tuner providing two or more channels. Each of the sources of live digital audio content 915 may also be buffered, resulting in buffered content. This buffered content can include multiple individual songs or audio segments, as shown. Continuing with reference to 920, the sources of stored audio content, there can be a stored music database in MP3 or other digital format in flash or hard drive, or a CD, SACD or DVD player with one or more disks. The stored audio content can, for example, be part of a radio or a separate device such as a smartphone or digital music player, as shown. It is also noted that the sources of live digital audio content can include associated data for each individual song, such as, for example, song title, artist name, program ID or other ID, allowing them to be segmented and tagged in a buffer, as described above. All of these sources, whether buffered, live digital audio content, or stored audio content can be fed to processor 950 for play to a user. Continuing with reference to FIG. 9, there may be connected to processor 950 Digital in-vehicle storage 910. This storage is associated with the offers or advertisements and logs of same as described above. Thus, the digital in-vehicle storage can store offers, such as local advertisements with a geo-tag trigger, for provision to processor 950 for insertion into programming so as to be played to a user. Digital in-vehicle storage 910 may also include a playback log of time, location and audio source when an advertisement or an offer was played to a user. This information can be received back from Processor 950, as shown, and can then be stored in Digital in-vehicle storage 910. This information is very important, inasmuch as advertisers pay premiums for advertisements that can be proven to have been played to a user, which can drive significant revenues to an SDARS broadcaster implementing exemplary embodiments of the present invention, as described below.

It is noted that Digital in-vehicle storage 910 may be located within Processor 950 or, for example, may be a separate device. It may be non-volatile, or it may be cleared on each ignition cycle of the vehicle, for example. In a preferential implementation, it may be non-volatile, and each offer would have an explicit expiration date so as to prevent expired offers from being presented to a user when they are no longer valid. In exemplary embodiments of the present invention, Processor 950 may also be connected, for example, to a brought in device 960. As noted, this may be a tablet or a phone or a secondary screen in addition to a Primary Vehicle User Interface 965. In alternate exemplary embodiments of the present invention, there may thus be a display of images, text and/or video, as well as audio, on a secondary screen or "brought in device" such as a smartphone or tablet in order to reduce driver distraction.

Processor 950 may also be connected to V2V Communication Equipment 935, which itself is communicably connected in a two-way fashion to Roadside Equipment 930. RSE 930 can send offers to the V2V equipped vehicle, and it can also receive a playback log, which is a history of offer playback, from the vehicle, as noted above. This playback log can be stored in digital in-vehicle storage 910, for example, as described above. Finally, Processor 950 can be connected to a GPS or other positioning/navigation device 970, which can be used to determine the location of the vehicle at any time with reference to a Target Region or a Trigger Region as described above in connection with FIG. 8.

In exemplary embodiments of the present invention, assume a user is playing audio in-vehicle, from any of the sources shown in FIG. 9. When the processor determines that the vehicle is located within a Trigger Region, for at least one of the stored offers (they may each have different trigger regions, as noted), as shown in Digital in-vehicle storage 910, said stored offers being sent from Roadside Equipment 930, as noted above, the processor may perform at least one of the following actions: (i) pause the audio (allowing the content to be buffered if it is a live audio source) at the next break point; for example, at the end of the next song or new segments; (ii) play the stored offer; and (iii) restart the audio that was originally playing at the breakpoint.

Additionally, in exemplary embodiments of the present invention, the processor may optionally record one or more of the following pieces of information in a log (the playback log described above): (i) location when the stored offered was played to the user; (ii) time when offer was played; (iii) audio source playing at the time the offer was played; (iv) content identified for the offer; (v) location where the offer was initially loaded; and (vi) time when the offer was initially loaded. All of this information may be analyzed to better understand responses to advertisement, to plan or design future advertisements, and be used to compensate the SDARS or other media supplier to the vehicle for advertisements played to a user, with granular detail.

FIG. 10 shows various exemplary relationships between Target Regions and Trigger Regions, which may be used in various exemplary embodiments of the present invention. Target Regions are shown in red dotted lines, and Trigger Regions are shown in black dotted lines and are all labelled. As noted, a Target Region is a region in which the RSE will store offers and transmit them to vehicles entering within its communications range. Similarly, a Trigger Region is a region in which the V2V equipped vehicle will actually insert audio offers, such as commercials and advertisements, into the audio stream, and/or display video or graphic offers such, as for example, virtual coupons etc., as illustrated in FIG. 9 and as describe above. Finally, the Offer Location is the geographic coordinates of the store, restaurant, hotel, gas station, or other business where the offer may be redeemed, or for which the advertisement is applicable.

With reference to FIG. 10, beginning at the upper left portion of the figure, region 1010 shows an example where the Target Region and the Trigger Region are the same. Therefore, a vehicle entering the combined Target Region and Trigger Region will store an offer, and also automatically play the offer—at the next opportunity—to the user. This can be, for example, at the next song break, or audio clip break, for example, or according to other business rules determining when, and following what content, or what general type of content, advertisements are played or presented to a user. Example region 1020 shows a smaller Trigger Region, lying completely within the Target Region at the top of it, but not being the same size as it—rather a subset. Therefore, a vehicle entering anywhere within the Target Region will receive an offer from the RSE and store it. Only when the vehicle then enters the smaller Trigger Region at the tope will be commercial or advertisement be inserted into the audio or video stream being played to the user.

Continuing with reference to FIG. 10, the scenarios depicted for regions 1030 and 1050 present a third example. Target Region 1030 contains an offer location 1033. It is noted that offer location 1033 is outside of the Trigger Region 1040, but it is within the Target Region 1030. Target Region 1030 partially overlaps with Trigger Region 1040, as shown. Offer location 1035 is within both Target Region 1030 and Trigger Region 1040 (i.e. within the intersection of these two regions), and there is also an offer location 1045 which is outside of the Target Region 1030, but within the Trigger Region 1040. Finally, provided to the right of Trigger Region 1040, there is a fourth offer location 1047 which is outside both the Target Region 1030 and the Trigger Region 1040. Thus, an offer for any offer location 1033, 1035, 1045 or 1047 will be received and stored as the vehicle passes through Target Region 1030, and as it enters Trigger Region 1040, played or displayed by the V2V unit to the user. It can then be redeemed at any Offer Location.

A final scenario is shown at the bottom of FIG. 10 where there is a Trigger Region 1060 that lies entirely outside of a Target Region 1050. Thus, for example, the Target Region may be Massachusetts and the Trigger Region may be the vicinity of Orlando, Fla. The offer may be, for example, a special offer for Massachusetts residents travelling in Orlando, Fla. during some portion of the year, such as a normal vacation period. The offer may be picked up by their vehicle while they are still in Massachusetts, which is Target Region 1050, but will not be triggered until they reach their destination in Orlando, Fla. when they hear the advertisement in a Trigger Region 1060.

Finally, FIG. 11 illustrates an exemplary geo-tagged message database, with an exemplary message format, according to exemplary embodiments of the present invention. With reference to FIG. 11, beginning at the top of the figure, it is noted that each message has a geo-tag for distribution to RSEs. The geo-tag can have, for example, location and at least one of the following elements: a text portion, an image, and an audio clip. In addition, the message may have a category tag. Optionally, the offers may have an expiration date after which they would automatically be removed from the RSE and vehicle databases. FIG. 11 shows three example offers in the database at 1110, such as a 10% discount at Bob's Gift Shop, a 20% discount after 5:00 p.m. at a local diner, and a $5 discount offer of a car wash with a fill-up at all NH Exxon locations. The first example at 1110 may show the location in terms of latitude and longitude, street address or combination of both. The first offer for a shop, also provides a coupon code that the user must present at Bob's Gift Shop to obtain the discount. The second offer for food references a street address and a city in New Hampshire, and the discount is simply available without any code needing to be provided by a user. The third offer for fuel, could possibly be a reference to a Point of Interest database, as shown ("All NH Exxon locations").

The database of stored messages may be provided in the vehicle, as shown, and entries in the database may be processed by a geographic filter 1120, which is a function of location and distance, as shown. Here the user interface may filter the offers which are displayed on the basis of (i) location (preferentially displaying offers relating to nearby locations), and (ii) heading (preferentially displaying locations and the direction of travel and/or suppressing display of locations that will require significant backtracking). In exemplary embodiments of the present invention, after filtering, the user interface can also apply a Category Filter 1130, as shown at the bottom of FIG. 11. The category filter allows the user interface to filter offers which are displayed on the basis of category. This is especially useful when there may be large numbers of nearby businesses with advertisements or offers which are provided in the database. Offer categories 1150 which could be provided for a user to select from may include, for example, as shown on the bottom right of FIG. 11, Fuel, Shop, Hotel, Food, Bar and/or Parking.

Finally, in this example, taking all available offers from the stored message database in the vehicle—as shown at the top of FIG. 11—and filtering them by both Geographic Filter 1120 and Category Filter 1130, the advertisement 1140 that is displayed or played to the user is the second exemplary advertisement or offer, which is for a 20% discount after 5 PM at a Local Diner located at Pine Street in some city in New Hampshire, which belongs to the Food Offer category.

G. Significant Opportunities Provided Due to Granular Locality of V2V Delivered Advertising It is important to note the opportunities that V2V communications offers for media companies to obtain significant revenue streams for granular, micro-local advertising. As described above, by sending advertisements over an SDARS system to an RSE, or even to a "relay V2V vehicle", and then from these sources sending the advertisements over V2V to vehicles in defined Target Regions, many, many more advertisements can be used in a given area. The RSE is usually always on, and thus advertisements and offers may be sent over an SDARS to it continually, especially during late night hours when other messaging may not be so important.

Moreover, as noted above, advertisers pay significant premiums for proof of advertisements being played or shown to users. Currently, inasmuch as an SDARS system is a one-way communications system, there was no facility to gauge which listeners actually heard an advertisement. Thus, only lower revenue rates can be charged, based on ratings. However, with the exemplary methods described above, the V2V disseminated ads—or even just SDARS disseminated ones—may be easily tracked by the playback logs, which may easily be downloaded to an RSE by a V2V equipped vehicle. Such logs allow a media content provider, such as, for example, assignee hereof, Sirius XM Radio Inc., to charge 3×, 4×, or even more for the same ads when actual play to a user is confirmed in a playback log. Because the ads are for a small region, and very targeted to people who would actually use the goods or services being promoted, it is also much easier to calculate response rates, and improve targeting using data mining. This technology may thus significantly change the profitability of advertising on an SDARS service.

H. Interaction With Applicant's "Tune Mix" Functionality

Given that, as described above, an audio offer or advertisement can be inserted into a variety of audio sources, the following patent application, under common assignment herewith, namely "METHOD AND APPARATUS FOR MULTIPLEXING AUDIO PROGRAM CHANNELS FROM ONE OR MORE RECEIVED BROADCAST STREAMS TO PROVIDE A PLAYLIST STYLE LISTEN- ING EXPERIENCE TO USERS", U.S. patent application Ser. No. 13/838,616, which was published as United States Patent Application Publication No. 2013/0287212, is hereby incorporated herein by reference as if fully set forth, as is its two listed parent applications, U.S. patent application Ser. Nos. 13/531,440, and 12/735,211. U.S. Ser. No. 13/838,616 is known as "Tune Mix." The "offer/advertisement" as described above can be considered a special case of "content that is multiplexed with other sources of content", as described in further detail in the Tune Mix application.

II. Vehicle to Vehicle Satellite Broadcast with Location (Geotagging Messages)

Volvo Pilot Using Sensor Data to Advise/Warn Other Cars Approaching a Slippery Section of Road By way of background, FIG. 5 illustrates an exemplary V2V pilot program initiated by Volvo. In fact, many automakers and governments are developing vehicle-to-vehicle (V2V) communications, which lets cars instantly communicate safety information to traffic in their immediate vicinity. In Volvo's proposal, cars will communicate data from wheel-slip sensors in vehicles to not only alert other cars as to icy road conditions, but also to alert road maintenance authorities, as represented by the salt truck shown in FIG. 5.

Volvo announced that 50 cars would participate in a pilot program, run in conjunction with the Swedish Transport Administration and the Norwegian Public Roads Administration. The cars in the program are fitted with a data transceiver, which includes hardware to read sensor information from the vehicle. The cars may communicate over cell towers, sending their data and location to a data center. That same data center can, in turn, send alerts to cars in the immediate vicinity, warning them about slippery conditions. It is noted that this strategy varies from that currently being developed by Ford and other automakers, which uses Dedicated Short Range Communications ("DSRC") to send data directly to other cars in an immediate vicinity. Volvo notes that cars receiving the slip data will adjust the alert level they display to drivers based on their own speed. A car traveling at 10 mph entering a section of road with reported slippery conditions may thus give its driver a lower level alert than a car traveling at 60 mph.

It is contemplated that aggregate data will also be sent to road authorities. For sections of road with multiple reported incidents of slip, road maintenance department can send out a crew to de-ice and run snow plows.

Improved Novel Approaches and Enhancements

In exemplary embodiments of the present invention, various improvements can be implemented over currently operating (or conceived) systems that disseminate information from content databases that collect traffic and road condition related information from connected vehicles. In such conventional systems, road hazards such as, for example, icy road conditions, may be reported to a connected vehicle content database through wireless data communications from the reporting vehicle to the infrastructure, via, for example, a DSRC transceiver or a cellular transceiver.

The DSRC transceiver may be used for short range (<300 m) communications from Vehicle to Vehicle (V2V) or from Vehicle to Infrastructure (V2I). In what follows, the vehicle mounted transceiver system may be referred to as On-Board Electronics ("OBE") and the roadside transceiver system may be referred to as Road Side Equipment ("RSE"). Once the road hazard information has reached the content database, an Area Traffic Operations Center may send out a warning to vehicles near the icy conditions, so that these vehicles may proceed with caution. As a first level of targeted delivery, the Area Traffic Operations Center can, for example, route the warning to RSE nearby the icy conditions. The RSE can, in turn, warn vehicles in the immediate vicinity of the icy conditions. However, RSEs may not be deployed on all routes entering the icy area. This limits the number of vehicles which may be made aware of the conditions.

Thus, as a second level of targeted delivery, a wider area cellular delivery approach could be used. Connected vehicles would regularly report their locations to a vehicle location database using the cellular network, and when road hazards are detected, the Operations Center could access the vehicle location database to identify vehicles in the vicinity of the affected area and send targeted cellular messages to the vehicles which may be impacted. However, this second approach also has problems. This can be quite costly due to the repeated transmission of the same information on a one-to-one basis and the ongoing amount of location information that must be reported over the cellular network. This especially so as more and more vehicles on the roadways are reporting locations as market penetration of V2V increases.

Here, again, a hybrid SDARS-V2V system solves the above identified problems. Thus, in exemplary embodiments of the present invention, an improvement to these systems integrates a wide area satellite broadcast system to disseminate information to vehicles operating in a specified region. The vehicles receiving the satellite broadcast then, in turn, transmit the information to all non-SDARS equipped vehicle. FIG. 13 shows a block diagram of such an exemplary V2V wide area satellite broadcast system. The system incorporates a Global Positioning Satellite Constellation 1320, at least one Broadcast Satellite 1330, V2I Roadside Equipment 1310, a Traffic Operations Center 1355, a Content Database 1360, a Satellite Operations Center 1350, a Satellite Uplink 1340, and vehicles equipped with on-board electronics capable of: (i) receiving GPS signals, (ii) receiving satellite signals, and (iii) supporting V2V 2-way transmissions with other vehicles. As shown in FIG. 13, Vehicle #1 and Vehicle #2 may, for example, receive messages from Broadcast Satellite 1330, and also receive broadcast messages from each other through their respective on-board V2V DSRC transceivers, provided that the vehicles are in range of each other's transmissions. Road conditions detected by Vehicle #1 may be communicated to the V2I RSE which is itself connected to the Traffic Operations Center, as shown. The RSE can transmit these conditions to Vehicle #2, and other vehicles in range. Alternatively, if, for some reason, Vehicle #2, or V2I RSE 1310 is not in range of Vehicle #1, then Vehicle #1 can message one of them, which in turn, can message the other, in a relay type transmission. If there are sufficient vehicles present, the "crowd sourcing" of V2V communications is a useful fail safe. The Traffic Operations Center may, for example, contain the servers and processing power necessary to store the incoming data in the Content Database, to analyze the data in the database to determine the validity and severity of the conditions and to determine remedial actions. Such remedial actions may include, for example, dispatching salt trucks to an icy patch of road and sending warnings to vehicles in the area of the icy conditions. The warning messages are delivered to the Satellite Operations Center for uplink to the satellite so that the messages may then be broadcast over the satellite coverage area.

It is noted that in order to format satellite broadcast messages so that only vehicles in the vicinity of the hazard or condition of interest, for example, an icy patch, act on the message, a geotagged message format may be used. Such a message delivery system is illustrated in FIG. 14. An exemplary message format for use in such a system may include, for example, a header and a payload. The header fields may include location information such as, for example, longitude and latitude of the icy patch shown as Geotagged Message Central Coordinates 1460, along with a first radius value R1 which may indicate the distance from the icy patch to which the warning message applies, as shown by the gray region, Geotagged Message Area 1450, within the Satellite Coverage Area 1440 in FIG. 14. Vehicles, e.g. Vehicles #1, #2, #3 and #4, receiving the broadcast message would compute the distance of their present GPS location to the icy patch location (i.e., Geotagged Message Area 1450 having a distance R1 from the center of the hazard) and determine whether the distance is within the first radius, R1, specified in the message header. If the distance is equal to or within the radius, as is the case with Vehicle #1 in FIG. 14, the message payload can be acted upon. Otherwise, for Vehicles #2, #3 and #4, the message can be discarded. In some exemplary embodiments, the broadcast message header may include a second radius, R2, which can represent an extended area, outside of the first radius R1, for which vehicles may store the message for a defined period of time in case such a vehicle enters the first radius, at which time the message would be acted upon. As shown in FIG. 14, Vehicle #2, in Extended Geotagged Message Area 1470 will store the message, and act upon it if it enters Geotagged Message Area 1450 before the message timeout, which may be predetermined or contained in an additional header field. The broadcast message payload may, for example, include text, images, audio, video, navigation instructions and/or vehicle control information which may be useful for assisting with the external conditions.

In a second example, message header fields may include a location and shape information element, which uses more than one latitude and longitude pair, that together describe a closed shape (or a line) that indicates the outline of a hazard, for example, or an area of heavy rain. Alternatively, vehicles may use more than just the radial distance from the vehicle's current position to the hazard to determine (i) if the hazard is to be presented to the user, (ii) when the hazard is to be presented to the user, and (iii) how the hazard is presented to the user. For example, the vehicle may use the hazard's distance from the currently planned route, or even the hazard's distance from an alternate route, to the currently planned destination or waypoint.

In yet another exemplary embodiment, a geotagged message format may include (a) a time stamp element that indicates when the hazard was located at the specified position, and (b) a motion information element that can be used to estimate the future location of the hazard. Such a technique is in some ways analogous to "motion estimation vectors" as used in the MPEG standard. In one example, the motion information element can include at least one motion vector element that includes (i) a direction of motion and (ii) a speed. In this exemplary embodiment, when only one of the motion vector elements is included in the motion information element, that fact can imply that the size and shape of the hazard is fixed and that the motion information element is describing a simple translation of the hazard. However, when more than one motion vector elements is included in the motion information element, and they are coupled with the location and shape information element, each of the motion vector elements can be associated with each of the individual longitude and latitude pairs in the location and shape information element. The aggregated information can then be used to estimate a future shape, and a future location, of the hazard, such as, for example, an expanding and translating area of heavy rain, or a snowstorm that is both moving and changing the shape of the affected area.

In exemplary embodiments of the present invention, the motion information elements can be combined with a predicted path of the vehicle to determine if/when/how the hazard information should be presented to the vehicle occupants.

FIG. 15 presents an exemplary block diagram of exemplary vehicle on board electronics ("OBE"). As shown, the OBE is equipped with a V2V Services Processor 1550 which has interfaces with a V2V (DSRC) Transceiver 1512, a SAT receiver 1517, a GPS receiver 1522, an optional cellular modem 1527 (all on the left of the V2V Services Processor), and various vehicle systems (all on the right). Each receive or transceiver is connected, through RF Connectors 1505, to a respective antenna. These include DSRC Antenna 1510, Satellite Antenna 1515, GPS Antenna 1520, and Cellular Antenna 1525. As also shown V2V Services Processor 1550 is also connected to Audio CODEC 1560, Power Suppler 1580, and has Discrete Signal Lines 1572 and USB/Ethernet 1570 connections to vehicle systems.

Thus, communications with the vehicle systems may be through one or more interfaces, including but not limited to USB, MOST bus, CAN bus, Ethernet, UART or SPI. The V2V Services Processor 1550 may run a V2V application, which can collect vehicle data through the vehicle data interface, and can broadcast selected data through the DSRC transmitter 1512 on a periodic basis. These broadcasts can include vehicle speed, location, direction, braking and acceleration, which may be used, for example, by surrounding vehicles for collision warnings, and may also include road conditions including, for example, (i) icy or slippery conditions as indicated by stability control or antilock braking systems, (ii) wet conditions based on windshield wiper use, and (iii) pot holes based on accelerometer measurements or conditions based on other sensors. In exemplary embodiments of the present invention, such a V2V application can process information received from the DSRC transceiver, such as information on other moving vehicles, and can make determinations on whether conditions warrant sending warnings through the applications interface for delivery to the driver. The V2V application may also process information received from the SAT receiver 1517. As described above, the SAT messages may be filtered by a location received from the GPS receiver before being processed.

It is noted that the OBE system shown in FIG. 15 may be used with, and is fully applicable to, any and all of the applications, methods and techniques described in this document, and is not limited to use in embodiments for geotagging of messages as described in this Section.

In exemplary embodiments of the present invention, a wide area satellite broadcast system, such as, for example, the SDARS system operated by Applicant hereof, Sirius XM Satellite Radio Inc., may also be used to feed content to RSEs for regular repetitive transmissions to vehicles equipped with V2V transceivers. For example, some RSEs may be positioned in areas so as to repetitively rebroadcast over the V2V channel either static or slowly changing messages to vehicles passing by in a given direction, such as, for example, "Reduce speed, blind curve ahead". Such RSEs may, for example, be equipped with a satellite receiver, and may or may not have backhaul capability. The satellite broadcast can, for example, send the rebroadcast message (i.e., a message intended to be rebroadcast) content to the RSE using a RSE-specific geotagged message (e.g., the message header identifies that the message is intended for RSEs) or via a direct message targeting the RSE by including a Unique ID assigned to the RSE. The message may also include message retransmission parameters, such as how often, for how long, and during what times the RSE should retransmit the message contents, and/or other control information such as transmission instructions for other locally stored or previously received messages. In exemplary embodiments of the present invention, the RSE can receive the message from the satellite broadcast, and act on the message instructions. Some advantages of such combined satellite RSE approach are (i) that the RSE relieves the satellite of having to continuously rebroadcast the message to vehicles in the area, and (ii) the RSEs may be deployed in remote locations which may not be supported with backhaul services. If more granular messaging is desired, the satellite can broadcast more quickly changing messages to RSEs, such as along a busy highway, turnpike or interstate, advising of conestion or accidents, etc. In this way, the satellite-V2V hybrid can function as a dynamic road message service.

Utilization of a V2V System With One or More Onboard Vehicle Cameras

In some embodiments, a hazard condition, or the like, may be identified by capturing and processing images and video segments. Once such a hazard or related condition is detected, it may be communicated to other drivers over V2V communications, or relayed to appropriate authorities. Various scenarios are next described.

In exemplary embodiments of the present invention, onboard camera systems in vehicles can be utilized to capture individual images and video segments. These images and/or video segments can be processed in real time to:

1. Identify and continually monitor a nearby hazard, such as an erratically moving vehicle, for example. This monitoring can include capturing and storing an image or a video segment of the erratic driving, or even a resultant accident. In addition, V2V messaging can be used to inform other vehicles in the area to begin capturing images and/or video.
2. Identify and continually monitor a known target, perhaps based on tag number (e.g. license plate). A description, for example, a tag number, of a known target can be communicated to the camera-enabled vehicle via amber/silver alert, BOLO, law enforcement request, etc. Once the target vehicle is identified, the identification can be shared via V2V transmissions with surrounding vehicles, and the surrounding group of vehicles can continuously send update information until the identified vehicle is passed off to the proper authorities.
3. Identify expired tags and alert authorities. Many license tags include expiration dates on the tag. In exemplary embodiments of the present invention, camera-enabled vehicles can use image recognition on images of the tag to determine if the tag is expired. If it has, the camera-enabled vehicle can transmit the location and picture of the tag and associated vehicle to authorities.
4. Identify animals or other items in roadway. For example, detect an animal entering roadway from shoulder, debris in roadway, items falling from nearby vehicle, etc. and transmit to nearby vehicles and authorities (virtual deer crossing "sign")."). In exemplary embodiments of the present invention, vehicles with higher levels of visual sensing could pass information to vehicles of lower levels of visual sensing to assist in avoidance of potential hazards. For instance, vehicles with infrared visual capability could pass information to allow vehicles without this capability to be notified of an animal in the road where that animal would be otherwise undetected to those vehicles without the advanced infrared sensors/cameras. Information passed could be via image, virtual image or just locational alert.

5. Headlight failure. Identify when a nearby vehicle has headlights or headlight not lit and alert surrounding vehicles (including the vehicle with the failed headlight).
6. Brake light failure. This is the same as above (item 5) with the addition of detecting brake light failure by using the received BSM (which includes heading, speed and brake status) to determine such a failure. For example, if a BSM indicates that brakes are applied but the camera images indicate that the brake lights are not on it could be concluded a failure has occurred.
7. Identify nearby weather conditions such as fog, hail, snow, rain, tornado, etc. Additionally the intensity of such weather can be determined.

In exemplary embodiments of the present invention, captured images and/or video segments can be used to:

1. Forward images and/or video segments to the local authorities or other authorized organization (police, insurance companies, etc); and
2. Retain images and/or video segments in vehicles memory for later retrieval and analysis.

In exemplary embodiments of the present invention, and further to item 2 above, the image and data describing a given lost or stolen vehicle can, for example, be sent out nation-wide via satellite delivery, and then locally via a V2V system. Aggregate combinations of multiple images sent across a V2V system can, for example, implement a real time lost or stolen vehicle identification method.

In exemplary embodiments of the present invention, cameras can, for example, pass vehicle images, license tag images, and even occupant images, back to a secure site for aggregation of images (via pattern recognition) with state databases. In some embodiments, law enforcement agencies, or other authorities, may send messages over satellite radio containing the identity of a vehicle. A V2V-Satellite enabled vehicle can then receive the message and broadcast it over V2V to a crowd of nearby vehicles. The crowd can, for example, scan all vehicles in its vicinity, and, using pattern recognition software, identify any vehicle fitting the description of the vehicle in the message. The various images and video segments acquired by vehicles in the crowd, and tagged as responsive to the requested vehicle in the message may then be accessed by law enforcement agencies.

It is noted that this technology may require the law enforcement agency to obtain a warrant to authorize the crowd-sourced anonymous tracking of suspect vehicles. (Alternatively, since no governmental action is directly involved, users who allow this functionality may arguably do as they please). However, because this technique relies on a continuously changing set of anonymous vehicles, none of which is actually a law enforcement vehicle, it may reduce the probability of a criminal suspect realizing that he is under surveillance, and taking evasive measures to avoid being followed. Since criminals often accelerate to high speeds when they realize that they are being followed or chased by the police, by allowing the police to track suspect vehicles using cameras on a plurality of anonymous vehicles, public safety will be enhanced without allowing criminals or suspected criminals to evade law enforcement.

In exemplary embodiments of the present invention, hazard identification information can be used to cause vehicles to automatically take action, completely independently of the driver. For example, when the vehicle ahead is detected to be braking, and the vehicle behind has not braked, an algorithm can be implemented based on proximity and other available information (video, etc) to apply the brakes independently. This is but one example of using V2I and V2V messaging as inputs to "smart safety" algorithms, which when needed, cause vehicles to drive themselves.

Adaptable Device Behavior Based On Reception of V2V Transmissions

In exemplary embodiments of the present invention, V2V or V2I enabled devices can detect the nearby presence of a vehicle or vehicles by detecting their V2V transmissions, and modify their behavior as may be appropriate. Exemplary methods based on this technology can include:

1. A method of infrastructure power saving by only turning streetlamps on when an approaching vehicle is a few hundred meters away and then turning those streetlamps off when the vehicle has passed ("Smart Street Lights"), similar methods may be applied to any power-consuming infrastructure;
2. V2V Roadside Equipment can save power by not transmitting any information until a vehicle approaches;
3. Security and parking lot gates, for example exit gates, can detect certified and verified BSM transmissions that indicate that a car is at the gate, and then open the gate;
4. Restaurant and other drive-through systems can alert employees that a car is in, or approaching, a drive-through based on the detection of BSM transmissions;
5. House lights can turn on when a BSM is received that indicates a vehicle has come a certain distance up the home's driveway;
6. Security systems can alert security when V2V transmissions indicate that a vehicle is on the parking lot or on the property;
7. Billboards can customize their information depending on the characteristics of the vehicles in the vicinity. Similarly, billboards can turn off or reduce brightness when no vehicles are nearby ("Smart Billboards");
8. Parking lot systems can anticipate that a space is about to become available when V2V transmissions start emanating from an occupied parking spot. The system can then direct a vehicle looking for a parking spot towards that spot before the spot is actually empty ("Smart Parking Space Finder"); and
9. Adaptable advertising methods as described above in Section I. In addition to geo-filtering, one can, for example, also filter advertising by vehicle type. For example, if many trucks are being detected on a particular road; local businesses such as hotels/motels can choose to advertise specials to those vehicles, either directly or via a billboard.

In some embodiments of the aforementioned uses would be most useful in the case of roadside devices being battery powered with solar charging, such as for example in desolate areas where line power is not readily available, or in areas where there is a preference to not to use line power (installation cost savings, etc). Examples of vehicle characteristics that can be used to customize information are, for example, vehicle size, vehicle type, radio listening habits, etc. For example, if a billboard detects mostly truck-sized vehicles in the vicinity, it can customize its message for truckers (nearest truckstop, safe breaking distances, need for snow tires, speed limit changes, etc).

III. Improving User Based Insurance ("UBI") Data with Vehicle to Vehicle and Vehicle to Infrastructure Contextual Information In exemplary embodiments of the present invention, the predictive power of a driver profile logging system for insurance costs can be improved by including contextual information regarding the driver's environment during various logged events. This contextual information can be derived from vehicle-to-vehicle (V2V), and vehicle-to-infrastructure (V2I) systems.

It is noted that User Based Insurance ("UBI") seeks to predict the insurance costs of—and therefore offer competitive rates to—drivers, by monitoring their driving habits. Traditionally, these systems log data that is available through installed sensors and information available via the automobile's CAN bus (e.g. braking, speed, location, driving duration, trip distance, lateral acceleration, etc.). The information is thus specific to the car, but, even so, has no knowledge where the car actually was, or what conditions were encountered during any of these signals creation, let alone what other drivers' activities were that had to be reacted to. Thus, in exemplary embodiments of the present invention, information on a driver's performance can be made available through V2V and V2I communications to add context to the information that is being logged in his or her car The following are illustrative examples:

Driver Swerved:

A conventional UBI logging system might simply indicate that the driver caused high lateral acceleration. This would normally be considered to be a downgrade of driver performance. However, with additional context derived from V2V information, the insurance profile may be able to correctly categorize unique driver situations. For example, information about other vehicles in the area, along with their locations and velocity vectors, may indicate whether the high lateral acceleration was evidence of a good driver (e.g., she avoided an accident caused by another driver), or of a bad driver (e.g., he had plenty of time to avoid the accident, but wasn't paying attention).

User Braked Hard:

In another example, a driver may have had to engage the brake hard, and thus trigger the antilock braking system. Again, without specific context of what other vehicles were doing, this action would be reported as a negative action on the driver's part. However, when adding context to the harsh braking recorded in the log, it may indicate that the driver was actually quite alert, and appropriately avoided a potentially dangerous situation, and should have an improved insurance profile as a result.

Driver Speed:

In exemplary embodiments of the present invention, V2I communications may include speed limits, and, in some cases, recommended speeds. In exemplary embodiments of the present invention, this information can be stored and included in the logs so that the system can compare driver speed to the then prevailing speed limit, as well as the recommended speed.

In this regard, it is noted that there are some theories that the most dangerous driving speed is driving at a speed much different than the surrounding vehicles, regardless of the speed limit or recommended speed. Since V2V communications include the speeds of surrounding vehicles, in exemplary embodiments of the present invention the speed of surrounding vehicles may also be logged so that a relative speed comparison can be made, and variance from average surrounding vehicle speed calculated for various time periods.

Driver Behavior Around Warnings:

V2I communications can deliver road sign information electronically (e.g. curves in road, school zones, bad weather). In exemplary embodiments of the present invention this contextual information may be included in the log so that the driver's behavior in these conditions, and in reaction to them, can also be logged and analyzed.

Driver Situational Awareness/Road Behavior:

V2V communications can include a lot of situational data. In exemplary embodiments of the present invention, the situational data can be included in the UBI in-vehicle logs, and a driver's response to various situations can thus be evaluated. For example, in exemplary embodiments of the present invention the following exemplary queries may be answered, and risky behaviors identified through analysis of the logged data:

1. Does the driver let off the accelerator when another vehicle approaches a stop sign at a high rate of speed?
2. Does the driver move to the right-most lane when not passing?
3. How quickly does the driver brake when the car in front of him brakes (or when 2 or more cars in front of her short stop)?
4. When changing lanes, how much room does the driver leave between cars in front and behind and in both the originating lane and in the destination lane?

In another exemplary embodiment, the system can log a driver's response to driver assistance information that new V2V and V2I systems enable. It is noted that the first expected use of V2V and V2I is to have vehicles present the driver with information that improves driving safety. Therefore, using such messaging, in exemplary embodiments of the present invention, the what, when, and how information was presented to the driver may be logged. The system can then determine how well the driver heeded the warnings/information, what contextual information may be inferred or extracted from that messaging, or even if the information is being used in an unsafe way. Some examples can include:

1. Did the driver turn in front of another car before the system said it was clear?
2. How quickly did the driver slow down when the system warned of a potential hazard ahead?
3. Did the driver jump into the intersection because the system told him/her that the light would turn green in 1 second?
4. Did the driver accelerate because he/she was told the light ahead would turn red in 3 seconds?

In exemplary embodiments of the present invention, statistics derived from these logs can also be used to improve the effectiveness of the vehicle's alert and information system, as well as to test out various warning/driver alert formats and content for maximum effect.

It is noted that drivers who are determined to have safe and predicable driving skills would allow the system to lower warning levels for a given area around that safe driver or group of safe drivers. For example, an intersection which has numerous safe drivers approaching may not need any system warning/guidelines applied. Speed limits on freeways or specific lanes at times when many safe drivers are operating could even be exceeded, and no warning need be sent. Safe drivers operating within their normal driving areas, driving times, and driving conditions would potentially be given additional advanced skill operating limits—such as, for example, following distance, maximum speed, and lane change clearance, to name a few. Additionally, in exemplary embodiments of the present invention, a system can identify if all vehicles on or around a skilled driver are also skilled, and then dynamically adjust system warning parameters accordingly. On the other hand, if a driver of lower skill is operating outside of their safety level, or a vehicle is being operated outside of its safety limits, then following distance, passing speeds and ranges may be indicated to other surrounding skilled drivers to avoid potential risks. It is noted that this is done today in a small and static manner by the use of student driver signs on vehicles, but no context or intelligence is used or brought to bear.

In exemplary embodiments of the present invention, a system would know if, for example, a safe driver is operating outside of their normal operating area, or is utilizing the navigation system due to unfamiliarity to a new area, or is changing their normal driving profile (ratio between acceleration, glide and deceleration). If so, their safety profile may be temporarily downgraded, until such time that they resume normal profile driving, or are determined to be back in a normal driving area. Thus, a dynamic safety profile can be maintained for any specific driver, and also used by an intelligent in-vehicle system to adaptively manage her activity in such state as regarding surrounding drivers and road conditions.

In exemplary embodiments of the present invention, such systems would allow all vehicles to have an accurate and detailed set of data, and predictions based on that data, which would inform other vehicles within the V2V network to allow adjustments to the normal operational parameters for the vehicle to vehicle (V2V) and vehicle-to-infrastructure (V2I) systems.

Unsafe Driver Ahead/Alongside:

In exemplary embodiments of the present invention, context information from UBI data of any particular vehicle (or driver of that vehicle) can be added as additional safety information within a V2V system. A vehicle which has a poor score on a UBI system could alert neighboring cars to follow at a greater distance to maximize safety. In one implementation of this invention, "avoid unsafe vehicles" warnings could be made available to other vehicles—say at intersections or other critical driving situations, such as while passing. Additionally, suggested driving routes could actually be modified to avoid other vehicles with poor performance scores. In another possible implementation, vehicle performance scores may be kept private in actual driving situations and only utilized within the system as probe points to determine how dangerous any particular driving situation may currently be, or is statistically at specified times, as well as to compute trends.

Trade-in Report/Rental-Car Discounts

In exemplary embodiments of the present invention, vehicle performance scores may be linked to the vehicle regardless of the driver, to allow a trade in report as to how the vehicle was operated prior to the trade in. Although accident reports are generally kept on vehicles and tied to VIN (vehicle identification) number, no such information as to how harshly or lightly driven the vehicle was. This service would be a "harsh operation" report that could also be tied to the VIN.

In exemplary embodiments of the present invention, similar data can be tracked for car rental companies. A safe driver discount may then be applied upon return of the vehicle, which means less wear and tear on the rental fleet, and such incentives would drive safer drivers to the rental company offering them, which would lower overall risks and thus insurance rates, to the rental car company itself.

It is noted that the contextual data obtained from V2V and V2I communications, and the data from the log of driver activity, can, for example, simply be sent to a server, such as maintained by an underwriter of the UBI, for processing using said insurer's algorithms and predictive models. Or, alternatively, processing may be done in the vehicle, in part or completely, and conclusions and results, sent to the server. In a standard exemplary embodiment, either no processing, or relatively simple pre-processing may be done in the vehicle, and the data sent to a UBI underwriter's server, or to a server doing data processing and mining for the UBI underwriter. In more elaborate exemplary embodiments, more processing maybe done locally, in the vehicle, to save bandwidth, and data transmission costs, inasmuch as it is expected such uploading to UBI servers will often be over cellular networks or the like.

In some embodiments the V2V obtained contextual information may be used to obtain evidence concerning automobile accidents, or other events, both that involve the current vehicle, and that do not. Thus, an automobile accident may be more easily analyzed using various V2V data acquired at the time prior to, during and after the accident, and this does not depend upon the vehicles involved being V2V equipped or not. The "crowd source" aspect of the V2V enabled vehicles in the vicinity of the accident may be aggregated to create a record of the event. In this sense such an accident or other road hazard may be captured as a "hazard event", captured by various visual and acoustic sensors in various V2V enabled vehicles, as described below in Section VII.

Finally, a given automobile's capabilities maybe leveraged, and the various settings as to safety messages, or how contextual data is used to interpret standard UBI data from the vehicle, may be adjusted based on the vehicle's capabilities.

IV. Active and Passive Channel Voting and Preference Processing

In exemplary embodiments of the present invention, a vehicle radio or receiver (the terms are used as synonyms herein) may be provided with the ability to passively vote on channels (e.g., by measuring listening time), or have a user/listener actively rate songs and channels through a UI, and share those ratings. Further the collective votes of a crowd or set of listeners can be used to guide user selection of channels and songs based on their relative popularity with people having similar musical tastes. This technology is next described.

In exemplary embodiments of the present invention, a radio with at least a method of receiving and playing a plurality of uniquely identifiable stations or channels (such as, for example, one or more satellite radio signals or channels broadcast in an SDARS) and a processor which can keep track of the channels which the user selects, and how long they are listed to, can, for example, be used to implement (i) methods for transmitting the listening history, or a summarized listening history, to similarly equipped radios, (ii) the ability to receive and store the listening history and/or ratings from other radios, and (iii) summing or averaging the listening history of all (or some relevant defined fraction of) other radios and presenting the resulting weighted list to a radio operator.

In exemplary embodiments of the present invention, such a radio can also be used to allow a listener to actively rate or "like" individual songs, or the channel or channels on which those songs are playing. In some embodiments, one or more algorithms can weigh the song and channel ratings received from other users based on how closely the ratings or likes of one user match those from the other user.

In some embodiments, drivers with V2V enabled satellite radios may come within range of other vehicles having their own V2V enabled satellite radios. For example, the driver in, say, a first vehicle, Vehicle 1, may spend a lot of time listening to Channel A, but may also spend time listening to channels B, C and D, while the driver in the other vehicle, Vehicle 2, may spend a lot of time listening to Channels C, D, and F. Based on their common interest in channels C and D, the first driver may be presented with a menu option suggesting that "people who like Channels C and D also like Channel F" while the driver in the other vehicle can be presented a similar menu option, suggesting channels A and B. The more similarly equipped vehicles that exchange data, the more likely the user is to discover additional or heretofore unexplored channels that he or she may enjoy, inasmuch as "crowd sourcing" gets better as the "crowd" gets larger. If the driver dislikes songs on one or more of the suggested channels—or dislikes the whole channel, then, for example, the weighting given to other channels on the list can be reduced in any averaging or summation algorithm used to combine the channel lists from multiple vehicles. Other more detailed preference aggregation, correlation and processing may also be implemented.

In some exemplary embodiments, a system need not seek out other listeners with similar tastes for the purpose of exchanging channel lists. In fact, the exchange of lists can be wholly anonymous, and in general no one will be able to connect a particular list of channels to a particular vehicle. Instead, it can simply broadcast an internally processed list of favorite channels with ranking scores, and correspondingly receive similar channel lists from other V2V equipped vehicles as they come within range. Received lists can be compared with the vehicle's internal list to determine "similar" channels, and can also be averaged with other stored lists, as they are received, to produce an aggregate rating for all encountered users.

A simple implementation can be, for example, to compute a score for each channel by keeping a running total of the percentage of time spent listening to that channel by each user. Each satellite radio equipped vehicle, for example, can transmit the list of its top 20 channels to every other vehicle that comes within its range. The list could simply be ranked, or could also include the score as well as a list of channels. The radio's processor (or, for example, a V2V module processor, such as is shown in FIG. 15, or both) can compare the top 20 lists received from other vehicles with the full channel list stored internally, and score each received list on the degree of overlap. If the set of channels overlaps by at least some fixed or user-settable threshold value, then channels which are different can be added to a list of "suggested channels". The list of suggested channels can be compared against the full list of channels to eliminate channels that the user already listens to (although perhaps at some lower percentage of time). After encountering only one other listener, the predictive power of the suggested channel list would be very weak; however, after encountering dozens, or hundreds, of other listeners, and compounding the channel lists received at each encounter, it is possible to determine that X % of listeners that like a certain group of channels in common with a given user also like one or more other channels that are not on the current listener's highly ranked channel list. In addition, the user, through the radio interface, can choose "the most popular channel" to discover what most people that drive in his vicinity are listening to (without respect to what the listener's individual tastes may be). This is analogous to checking out the latest trending topic on Twitter or the most searched for term on Google trends, or using any crowd sourced, dynamically updated application, such as Waze, for example. By using anonymous crowd-sourcing techniques to determine the "average preferences" of multiple drivers, it is possible to either (i) discover channels that are similar to the channels a user already likes, ("show me channels that people with tastes similar to mine like, that I haven't listened to") or (ii) discover channels which are popular, irrespective of the tastes of the listener ("show me the most popular 5 channels among all other drivers that have come within my V2V communication radius")

In exemplary embodiments of the present invention, a satellite radio company or advertiser that wants to understand regional listening habits in order to know how to set advertising rates, may acquire aggregate ratings information anonymously by placing roadside equipment in a particular location to accumulate the channel ratings data from all V2V equipped vehicles that pass through that location.

It is noted that this technique may easily be applied to AM and FM stations by replacing the satellite radio channel designation with geographic coordinates and frequency, and it can similarly be applied to Internet radio with appropriate designations. By mapping the location and the RF frequency it is possible to determine the exact AM or FM stations that the user listens to. This may be done instead of, or in addition to, collecting satellite radio statistics. Thus, someone travelling to a town or city for the first time, or returning after a lapse of time, could quickly learn what local channels are the most popular by accumulating the listening statistics of other vehicles.

In exemplary embodiments of the present invention, AM, FM, Internet radio, and Satellite Radio listening statistics can thus be acquired by a ratings organization without the errors of self-reporting bias, since the radio would be anonymously transmitting the actual listening statistics.

To illustrate an example of the above described functionality, FIGS. 16 and 17 illustrate channel list-sharing according to an exemplary embodiment of the present invention. FIG. 16 illustrates an exemplary process for providing an Ordered List of Channels, acquiring User Channel Preferences, as well as Other Users' Channel Preferences, for the channels on the list, generating a ranked list, optionally filtering the list, and sharing User Channel Preferences over a V2V communication path. The process shown in FIG. 16 is recursive, and interactive, as both the user of that vehicle as well as various other users in other similarly equipped vehicles, each provide preferences to the system and receive back channel lists from the system, in a dynamically updated manner.

With reference to FIG. 16, there is shown a User Interface 1610, which can display to a user a weighted popularity list of channels, according to an exemplary embodiment. This list is processed as shown in an exemplary Satellite Radio Module 1625. The module takes as inputs both (i) the User Channel Preferences 1620 and (ii) Other User's Channel Preferences 1623, the latter received, as shown, over a V2V Communication Path 1635, from Other Radio Modules With V2V 1640. It is noted that if a User actively likes a song, that data changes preferences, and it may also modify the weighting algorithm applied to Other User's Channel Preferences 1623. In turn, over the same V2V Communication Path 1630, the current User Channel Preferences 1620 are shared, after passing through a Filter List 1630 module in the Satellite Radio Module, as shown. The Filter List 1630 module can, of course, share the entire ranked list of all channels, but in a preferred embodiment certain filtering criteria may be applied so as to reduce the size of transmitted messages. These filtering criteria can be, for example, (i) top N channels, (ii) only channels with at least X % listening time, (iii) only channels with a combined listening time percentage and rating score each exceeding defined thresholds, or various other criteria as may be useful. As shown, both User Channel Preferences 1620 and Other User's Channel Preferences 1623 are passed through a Weighting Algorithm 1615, which sorts channels by rank, prior to being displayed to the User via the User Interface. An exemplary ordered list of channels is shown at 1650. It is noted that channel identification would typically be frequency and band for terrestrial AM/FM or channel number and "band" for Satellite Radio (e.g. Sirius or XM). In a preferred implementation a numerical code would be used to indicate the bank (eg. 1=AM, 2=FM, 3=XM, 4=SIRI and so forth). Additionally, as regards channel ranking, various ranking criteria are possible in addition to time spent listening to channel, such as: explicit user ranking or rating, % songs liked on a channel, or various combinations of multiple factors.

FIG. 17 presents a specific example of the system and process of FIG. 16, showing a system sharing the top 5 channels whereby any received list containing 4 of the 5 channels in common with the internally stored list generates a suggestion, if the $5^{th}$ channel does not appear on the internal list (i.e., the user never listened to it). FIG. 17 further illustrates how, in some embodiments, the percentage of listening times for all received lists may be averaged to determine the most popular channels, which can be presented, for example, in a menu. In some embodiments of the present invention, advertisers or ratings agencies can purchase the collected listening statistics for vehicles in exchange for paying for or subsidizing the tolls for vehicles passing through toll booths equipped with V2I communication and electronic toll payment capability. For example, in exchange, say, for a $0.50 discount on a bridge toll, a user may upload his anonymous listening history, as well as summary of collected channel lists from other vehicles. It might also be possible to provide personal information for larger discounts, or the discount could be proportional to the number of vehicles whose channel histories have been accumulated, with higher discounts given to vehicles that have gathered more data.

In exemplary embodiments of the present invention, statistics can be accumulated from such multiple received channel lists to detect patterns in received channel lists, and refine the suggested channel list based on those detected patterns. For example, if 90% of the lists that include channels X, Y, and Z in their top 10 channels also include channel A in their top 20 channels, and the current listener includes channel X, Y, and Z in his top 10 but does not include Channel A, then Channel A could become a suggested channel to the current listener. Numerous variant examples can be implemented, including data mining of particular channel lists for product and service affinities, and sale of this data to advertisers. The affinity may be measured by test advertisement response rates, for example, specific to certain sets of channels in an area.

Continuing with specific reference to FIG. 17, there is shown a Transmitted List 1710 which lists five channels, identifies what band or source they apply to, and the percentage of time spent listening to each of them by a user. It is here noted that the band indication possibilities for this example include XM, SIRI, AM and FM, as described above. Transmitted List 1710 is compiled, as shown in FIG. 17, by a combination of Received Lists from other drivers or users, shown at 1720, as well as an Internal Channel List for the user's vehicle, as shown at 1730. With reference to the exemplary Received Lists at 1720, there are shown four received lists from other vehicles. Each of these will have a similar format to Transmitted List 1710, and therefore each of Received Lists A, B, C and D has five channels listed in the same format as Transmitted List 1710. Although these examples use five channels, in general any number N channels may be used. As shown in Receiving List A, with reference to channel 7, channels which are different on a list that is otherwise similar to the user's Internal Channel List 1730 become suggestions to the user, i.e. they were never tried by the user. With reference to Received List A, it is noted that channels 20, 6, 16 and 19 are used by the user and are in fact on the user's Transmitted List 1710. However, channel 7 from Received List A is not on Transmitted List 1710, and not even on Internal Channel List 1730 in which case channel 7 will become a suggestion that can be presented to the user. It is also noted that Received Lists B, C and D each have channel 7 on them, as well as other channels, such as 11 and 9 which may also become suggestions. However, the fact that all four Received Lists have channel 7 will increase the waiting given to channel 7 as a suggestion to the user.

Turning now to the Internal Channel List 1730 of FIG. 17, it is noted that various ranking criteria are possible in addition to percentage of time spent listening to the channel. These can include an explicit user ranking or rating, the percentage of songs liked on a given channel, or a combination of multiple factors. It is also noted that various filtering criteria for reducing the size of the transmitted messages (e.g., top N channels, only channels with at least X percentage listening time, etc.) may be used. Thus, it is seen in the Internal Channel List 1730 what the top N channels are for an example of N=5 and all the channels with M % or more listening time, such as, for example, M=1, are shown in the Internal Channel List which therefore contains nine channels.

Finally, at 1740 a Popular Channel List is shown which can be determined, for example, by averaging the percentage listening time received from all V2V enabled vehicles. This list includes both the internal listening time percentage, as shown in the third column of 1740, as well as the percentage listening time for each of the Received Lists A, B, C and D, as shown in the fourth, fifth, sixth and seventh columns of 1740, and finally the overall list of popular channels by average percentage listening time, shown in the final and eighth column of the Popular Channel List shown at 1740. As can be seen by comparing Internal Channel Lists 1730 and Popular Channel List 1740, because the Popular Channel List averages the percentage listening time received from all V2V enable vehicles, including the present vehicle, there are no entries for the Received Lists for more than five channels, because those Received Lists have the format of Transmitted List 1710 but are transmitted from all neighboring vehicles. Therefore, the minor channels, or least popular channels from Internal List 1730, although included in the Popular Channel List 1740 have no entries for any vehicle except the present vehicle, and therefore their popularity is further diminished as a result.

Similarly, because XM channel 22, although having a 5% listening time in Internal Channel List 1730, because it only appeared on two other Received Lists, namely Received List B and D, each also with a 5% listening percentage, when taking the average of XM channel 22 over all five lists used in the calculation, namely the Internal Channel List 1730 and the four Received Lists 1720, XM channel 22 ends up with only a 3% average percentage listening time in Popular Channel List 1740, and is therefore not on Transmitted List 1710. It is further noted that channel 19 is on Transmitted List 1710 even though it has the same percentage score in Internal Channel List 1730, and also the identical score as channel 22 for average percentage listening time shown in Popular Channel List 1740. Therefore, the reason channel 19 is included in Transmitted List 1710, but channel 22 is not, is due to those other ranking criteria used to generate Internal Channel List 1730, as described above.

Anonymity Protection in V2V Broadcasts

The various song, channel and programming preferences sharing methods described above involve a large number of ongoing V2V communications messaging. As noted above, the exchange of lists can be wholly anonymous, and in general no one will be able to connect a particular list of channels to a particular vehicle. In order to support and maintain such anonymity, so that users are confident that their privacy is insured, various techniques may be implemented, as next described.

In exemplary embodiments of the present invention, the anonymity of V2V broadcast data can be improved by changing identifiable characteristics of the transmission, and synchronizing these changes with the signature key changes currently defined in V2V protocols. It is here recalled that the US is nearing regulation that would mandate V2V communications in vehicles to improve safety. Besides the song, channel and programming preferences described above, V2V communications generally allow vehicles to communicate their location, speed, direction of travel, etc. to other nearby vehicles. As discussed in the article "Assuring Privacy and Security in Vehicle-to-Vehicle Safety Communications" (see, for example, http://conferences.asucollegeoflaw.com/emergingtechnologies/files/2013/04/Dorothy-Glancy.pdf), in order for the public to ultimately accept a mandatory V2V communication system, both privacy and security must be maintained in the system.

Security is required so that the received data can be trusted (e.g. so that rogue/false information cannot cause issues); privacy is required to increase public acceptance of such a mandate. Currently, security is implemented by having each vehicle sign their transmission with an assigned certificate; to preserve anonymity, however, the signing certificate can be changed periodically, such as, for example, every 5 minutes. One method that an interloper might use to reduce the anonymity of transmissions might be to measure unintentional differences in the transmission. Examples might include transmit frequency error, symbol clock error, and the timing error of signing certificate changes. If an interloper measures several such unintentional transmission differences, it could aid in identifying a given transmission with a particular vehicle. For example, if an interloper wanted to monitor when a specific vehicle entered and exited the owner's neighborhood, they could determine the target vehicle's transmit frequency and symbol clock frequency by visually identifying the vehicle while also monitoring the vehicle's DSRC transmissions with a specialized DSRC receiver capable of measuring these parameters with high accuracy. The interloper could then place a DSRC receiver within several hundred meters of the neighborhood exit. Unlike a camera, this receiver can be completely out of sight, as well as a significant distance from the neighborhood entrance. Whenever the receiver detects a vehicle entering or exiting the neighborhood with the same or similar transmit frequency and clock frequency (i.e. its V2V "transmission signature"), the interloper can conclude with a high degree of certainty that the vehicle is the target vehicle. The accuracy of such a conclusion increases with the accuracy of the measurement, the addition of other transmit parameters (e.g. Transmitter Spectral Flatness and Relative Constellation Error), and compensation algorithms for known sources of variation in these parameters (e.g. transmit frequency can be affected by ambient temperature as well as DSRC device age).

Thus, in exemplary embodiments of the present invention, such an anonymity attack may be thwarted by intentionally and randomly changing these unintentional transmission differences (e.g. transmission frequency error) whenever the signing certificate is changed. For example, the 802.11 specification allows a transmitter of a 10 MHz channel to have a ±20 ppm error. The designer of an 802.11 transmitter must account for all sources of error and determine how much error the design is allowed due to make tolerance (error variation from one transmitter to another as it comes out of the factory). Thus, a designer may have determined that the design is allowed a ±10 ppm make tolerance. In exemplary embodiments of the present invention, however, the designer might allow for a ±5 ppm make tolerance and have a control circuit that can tune the transmit frequency by ±5 ppm. The DSRC transmitter can than change the input to this circuit to a random value whenever it changes the signing certificate used to sign its transmissions, thus masking its "V2V transmission signature".

V. SDARS Receiver Space and Time Diversity by Means of V2V Networked SDARS Vehicles SDARS Space Diversity In exemplary embodiments of the present invention, an SDARS equipped vehicle that is playing (or buffering) a channel with lost or errored audio packets may request and recover those packets, in advance, from neighboring SDARS vehicles via a V2V network. This provides a very reliable "crowd sourced" backup for recovery of lost or missing audio data. Because each vehicle experiences fades or obstructions differently, based on speed and location, in a relatively small crowd of vehicles nearly all of the broadcast data should be correctly received by the collective as a whole.

It is noted that some wireless receiver devices employ antenna diversity methods to improve signal reception, and thus enable one or more of the following: (i) increase in range of coverage, (ii) lower transmission power, and (iii) cost, improvement in bit error rate and corresponding QoS. Space diversity is one particular antenna diversity method which employs multiple antennas that are separated in space. The basic concept is, that due to blocking and/or multipath signal environments, a signal that is faded as received by one antenna will still be at an acceptably high signal strength as received by one or more other antennas. Various processing methods can be used to combine the signals of the antennas, or choose the best antenna to optimize signal reception.

Today, in-vehicle SDARS receivers employ only a single antenna to minimize the overall cost of the receiver while providing an acceptable level of coverage and QoS. There are some environments however, where due to some combination of signal blocking objects, stationary receiver state (vehicle being stationary), angle of satellite signal delivery, and sparseness of terrestrial repeaters, signal reception is sufficiently weak so as to result in continuous or sporadic loss of audio packets. This manifests as audio dropouts as experienced by the end user. While an SDARS equipped vehicle may experience such an environment as described above at a particular time, one or more of the neighboring SDARS vehicles may not, due to the different positions in space of the antenna of each vehicle (e.g., the signal is blocked to one or more vehicles but not to all vehicles in the vicinity).

Thus, in exemplary embodiments of the present invention, one can take advantage of the space diversity of neighboring SDARS vehicles to cooperatively improve the effective SDARS signal reception and QoS of all vehicles within neighboring groups of vehicles. As noted, V2V is a technology that enables communication both between neighboring vehicles as well as between vehicles and neighboring infrastructure (e.g. traffic lights). In exemplary embodiments of the present invention, the transmission of particular SDARS audio packets by V2V from one SDARS-V2V vehicle to another neighboring SDARS-V2V vehicle that reported the audio packets as lost (e.g. due to undetected packets or unrecoverable packets due to detected bit errors) can be accomplished. The receiving SDARS-V2V vehicle can request the audio packets sufficiently ahead of the time the audio packet is to be decoded and played to the user as part of an overall stream of packets that could represent a radio channel or particular track of a radio channel. Each requested and received "replacement" audio packet can be substituted for the missing audio packet. An overall stream of audio packets then consists of (i) some packets successfully received through the same vehicle's SDARS antenna and receiver, and (ii) other audio packets received by way of V2V from the SDARS antenna and receiver of other neighboring vehicles. The end result is the play of error free and dropout free audio to the end user by including the audio packets requested and received from neighboring SDARS-V2V vehicles.

Crowd-Sourced Space Diversity

It is noted that for SXM low-band channels (the XM band channels), audio packets can be identified and requested using Master Frame Count (MFC) values. For the XM band, channel payloads are organized into 432 mec duration Master Frames. Each Master Frame is error correction coded and contains some possibly fractional number of audio packets. Instead of requesting an audio packet, an entire Master Frame (or audio frame) can thus be requested using MFC values (e.g. request all audio packet data of a particular MFC). In cases of very high or complete audio packet loss rate, in exemplary embodiments of the present invention an SDARS-V2V vehicle may request and receive the entire stream of packets of a channel from another neighboring SDARS-V2V vehicle, rather than request each audio packet individually. Inasmuch as V2V supports broadcasting, the same broadcasted audio packet data can be received and used by multiple SDARS-V2V vehicles suffering from packet loss, and playing or recording the same audio data (same channel).

Thus, in exemplary embodiments of the present invention, an SDARS-V2V vehicle suffering significant signal loss can request, from other SDARS-V2V vehicles, other SDARS service information aside from audio packet data, including, for example, channel metadata describing the currently playing content on one or more channels. Such an SDARS-V2V vehicle can thus effectively receive basic SDARS audio service during periods of complete signal loss from the network, from neighboring SDARS-V2V vehicles.

In one embodiment, an SDARS-V2V vehicle in an insufficient SDARS signal condition can act as a networked SDARS client to request and receive basic SDARS service from another neighboring SDARS-V2V vehicle, the latter acting as a networked SDARS server. The receiving SDARS-V2V client can request channel lineup and content metadata, and also request tuning to (extracting audio packets of) a channel. The vehicle acting as the SDARS-V2V server can then stream the audio packets of the requested "tuned" channel back to the SDARS-V2V vehicle acting as the client. As such, the space diversity gains (the gain of having more robust SDARS signal coverage by taking advantage of the multiple SDARS antennas and receivers of other vehicles separated in space) are realized using mostly "regular" networked SDARS service functionality and protocols. As the SDARS-V2V vehicle acting as the server moves out of range, or itself loses SDARS signal, the servicing of the client can be handed off to another SDARS-V2V vehicle that is still in range and thus has sufficient signal.

An SDARS-V2V vehicle that is initially playing audio packets at the "live" point (i.e. playing packets as they are received), or very close to live (not further back in IR buffer), upon experiencing a loss of audio packets condition, may not be able to request and receive audio packets from another SDARS-V2V vehicle in time before underflowing the decode and play of audio to the user. In such a scenario, a gap in audio play will occur on each separate audio packet request. Thus, for example the requester may intentionally introduce a slightly longer delay (e.g. less than 1 second) before beginning playback to move the play point further back from live, thus allowing sufficient time between subsequent detection of lost packets and ensuing request, to the reception of the recovery packets, to thus avoid audio underflow.

In exemplary embodiments of the present invention, an SDARS receiver may also buffer audio packets from multiple channels as part of other receiver features (known as TuneMix™, TuneStart™, SmartFavorites™, etc. in the SXM service). This audio data may be played back to the user at some later time. In such embodiments, the SDARS-V2V vehicle may also request the lost audio packets (and/or lost metadata) from these audio buffers. The requests can be made at the time that the packet loss occurred, or it can be postponed until it is more probable that the audio buffer for that channel(s) is to be played to the user in the SMX service. Alternatively, if requested much further ahead of time, the request can be made in a "low priority" mode. This allows other requests that are closer in time to the point at which the requested audio packet is scheduled to be played, to be done at a higher priority, and thus have a higher probability of being delivered on time to avoid underflow. Requests that go unfulfilled (e.g., no other SDARS-V2V vehicles available or none had the audio packet available) may be requested again at some later point when different SDARS-V2V vehicles are detected as neighbors.

In addition to SDARS-V2V vehicles, SDARS equipped V2V infrastructure (SDARS-V2V Infrastructure) can also provide lost audio packets, streams and metadata (e.g. via an SDARS-V2V device at traffic lights).

In exemplary embodiments of the present invention the V2V network employed may be a public V2V network, or some other private V2V network (e.g. a private V2V network dedicated to infotainment applications), for example.

In the process of providing audio packets as described above, the providing SDARS-V2V vehicles need not interrupt their own SDARS service (i.e., it does interrupt playback of SDARS due to resource constraints for example). For example, the providing SDARS-V2V vehicles can use extra available resources (channel audio extraction related resources and memory buffer resources) to preemptively buffer and maintain audio packets in case those audio packets may be requested by another SDARS-V2V vehicle at some point in the future. In an optimal capability SDARS-V2V space diversity system, all SDARS vehicles are also V2V capable and participate in the SDARS-V2V space diversity system described above. Additionally, all participating SDARS-V2V vehicles can have resources sufficient to extract and buffer audio packets from all SDARS channels. As such, there is a high probability that an audio packet or stream requested by any SDARS-V2V vehicle will be available from some neighboring SDARS-V2V vehicle.

Alternatively, for SDARS-V2V vehicles not capable of extracting and buffering all channels preemptively, each SDARS-V2V vehicle may, for example, extract the number of channels it is capable of, based on its resource constraints. The specific extra channels that are extracted and buffered can be chosen at random, for example, or according to some semi-random round robin systems, designed to limit duplication by vehicles in a defined region. As each SDARS-V2V vehicle makes a random (or semi-random) choice of which extra channels to extract and buffer, the overall chances of an audio packet of a channel requested by an SDARS-V2V vehicle being available on at least one of several neighboring V2V vehicles is improved.

In exemplary embodiments of the present invention, one self-supporting characteristic of this system can be described by the following: (i) some subset of stationary vehicles may be more likely to experience blocking and missed packets at any one time (e.g. fast moving vehicles), (ii) vehicles are often stationary due to traffic congestion, and (iii) traffic congestion means higher probability of nearby vehicles with V2V and SDARS that are capable of providing space diversity.

In another exemplary embodiment, lost audio packets can also be requested from, and be provided by a, central server by means of an Internet connection (e.g., an SDARS vehicle with LTE). This option would be available for SDARS vehicles having such Internet connectivity available (e.g., having an available LTE modem in the vehicle by tethering or integration, and LTE network connectivity available). In such cases, the SDARS-V2V method of lost packet recovery may still be preferred due to Internet data costs, longer audio packet delivery latencies, etc. However, a tiered method of requesting lost audio packets from both V2V and Internet networks could be employed. The V2V network delivery can be attempted first (i.e. check if lost audio packet is available from a neighboring SDARS-V2V vehicle first), then, if unsuccessful, attempt delivery from an Internet connected server, for example.

Details on SDARS-V2V Inter-Vehicle Communication:

Implementing the methods described above, the following describes an exemplary basic lost audio packet communication scheme over a DSRC type V2V network according to exemplary embodiments of the present invention. In this example, all communication can be done outside the context of the Basic Service Set (OCB) using WAVE Short Messaging Protocol (WSMP) messages that can be broadcast on the CCH (Control Channel). All SDARS-V2V units can maintain knowledge of the geolocation of all surrounding V2V vehicles based on received BSMs (Basic Safety Messages) that are broadcasted at regular intervals by each V2V vehicle, and that contain the vehicle's location information. Three types of SDARS-V2V WSMP messages can, for example, be defined:

1. Audio Frame Request (AFR)
   This can be sent by SDARS-V2V units to request a lost Audio Frame from any neighboring SDARS-V2V unit. (An Audio Frame is the audio data—some fractional number of audio packets—contained in a particular SXM Master Frame that was lost);

2. Audio Frame Provision (AFP):
Contains data an Audio Frame. Sent by a neighboring SDARS-V2V unit(s) in response to a neighbor's AFR message that requested the lost audio frame; and 3. Audio Packet Acknowledge (AFACK):
An acknowledge message sent by the original audio frame requestor to indicate an Audio Frame Provision was successfully received.

The three WSMP messages described above can contain, for example, a Provider Service Identifier (PSID) value assigned to a SDARS-V2V Space Diversity application.

Upon the loss of an audio packet, an SDARS-V2V unit can, for example, broadcast an AFR message, the data payload containing, for example, the following:

SID (Service Identifier): identifies the channel from which the packet was lost;

MFC (Master Frame Count): identifies the SDARS audio frame that was lost;

TR (Time Remaining): the time remaining, in master frame periods (432 msec) before the lost audio frame is scheduled to be decoded;

Geo Location (GL): The location of the SDARS-V2V unit that is sending this message;

Response Radius (RR): A radius value in meters that sets an outer circular boundary around the SDARS-V2V unit sending this message. Only SDARS-V2V units closer than RR units to the sender should attempt to fulfill the Audio Frame Request; and Radio ID: a radio identifier that uniquely identifies the SDARS-V2V unit that is sending this message.

In exemplary embodiments of the present invention, one or more neighboring SDARS-V2V units that successfully receive a broadcast AFR message as described above can, for example, first check if they are closer than RR meters to the requestor GL location, and have in their storage the requested audio frame that was lost (identified by MFC and SID). Each unit that has the requested audio frame can schedule a time in which to send an AFP message to the requester, containing the requested audio frame. The scheduled time to transmit can, for example, be proportional to the distance that the unit is from the requesting SDARS-V2V unit, for example calculated as follows:

$$0.75 * TR * d/RR$$

Where d is the distance of the unit from the requester.

For a 32 kbps audio channel, the AFP messages audio payload length in bytes is, for example, 1728 bytes (0.432*32000/8). Each AFP message can, for example, also include the MEG and SID of the Audio Frame.

As neighboring SDARS-V2V units broadcast the AFP message according to their calculated schedule, the requesting SDARS-V2V unit will eventually receive one of these AFP messages. The requesting unit can then broadcast an AFACK message to indicate to remaining neighboring SDARS-V2V units to cancel any scheduled AFP messages for this corresponding request. The AFACK message payload can contain the MFC, SID and Radio ID values of the originating AFR message to enable proper association of AFR and AFACK message instances (in case other requests for other lost audio frames are occurring concurrently from the same, or from different, requesting SDARS-V2V units).

In exemplary embodiments of the present invention, such a method of scheduling the AFP message, and acknowledging AFP reception using AFACK messages, is designed to reduce the "flooding" problem whereby all neighboring units try to all respond to a request all at once.

It is noted that Vehicular Ad Hoc Networks (VANETs) are another mechanism of providing intercommunication of neighboring SDARS-V2V units; the article referenced below outlines many VANET protocols. VANETs can enable more elaborate, and more cooperative, schemes for SDARS-V2V space diversity. Some VANET schemes organize vehicles into clusters, with each cluster having a cluster head that coordinates the addition and removal of other cluster nodes in addition to performing other cluster management tasks. Vehicles having similar speed and direction are good metrics for joining the vehicle to the same cluster, with the goal being to have relatively stable clusters where cluster nodes remain with the cluster for relatively long periods of time. As applied to SDARS-V2V space diversity, such stable clusters can allow for coordination amongst SDARS-V2V units in determining which units extract and buffer which SDARS channels with the goal of covering all channels of the SDARS service; or if not all channels are covered, an attempt to cover the channels most frequently tuned to by SDARS-V2V units of the cluster. Such VANET networks offer the capability of point-to-point type messaging between SDARS-V2V units. For example, a unit with lost audio packets (or frames) may request those frames from a particular SDARS-V2V unit that it knows has been buffering the same channel from with the audio packet was lost. A reference for the above discussion include: Adil Mudasir Malla, and Ravi Kant Sahu, *A Review on Vehicle to Vehicle Communication Protocols in VANETs*, International Journal of Advanced Research in Computer Science and Software Engineering, available online at http://www.ijarcsse.com/docs/papers/Volume_3/2_February2013/V312-0253.pdf SDARS Time Diversity:

In addition to providing performance gains realized from space diversity, as described above, in exemplary embodiments of the present invention a method of combining SDARS and V2V communication systems can also provide gains from time diversity (gains relative to an SDARS-only system). This is next described.

Information (data) of interest to a first SDARS-V2V vehicle may be broadcasted via SDARS at a particular point in time. The first SDARS-V2V vehicle may fail to receive that information if, at that particular time, the vehicle's SDARS signal reception was blocked, or the SDARS receiver was turned off (e.g. the vehicle was parked/turned-off). However, the same information may have been successfully received and stored by one or more other SDARS-V2V vehicles (whose SDARS receiver was turned-on and whose SDARS signal reception was not blocked). The failed-info-reception first SDARS-V2V vehicle may broadcast V2V requests at some interval, requesting V2V transmission of the missing information from other neighboring SDARS-V2V vehicles that were successful in receiving the information of interest. At a later point in time, when both the first failed-info-reception SDARS-V2V vehicle and one of the other success-info-reception SDARS-V2V vehicles are within V2V communication range, and both vehicles are driving (thus both V2V transceivers are turned on), the success-info-reception SDARS-V2V vehicle can transmit the info of interest to the first failed-info-reception SDARS-V2V vehicle, the information being transmitted over the V2V communication system. Inasmuch as it is the V2V transmission of the information at a different point in time that allows the realization of the performance gain (that enables the successful reception of the missing information), the performance gain is thus attributable to time diversity.

The "information of interest" described above can represent any type of stand-alone or self-contained item such as, for example, a multimedia (e.g. audio or video) file, a configuration file, an application database file, a firmware/software update file, etc. Often, however, such files are large relative to the SDARS bandwidth that is allocated for their transfer, and are not amenable to a simple contiguous transmission of their data contents. An SDARS vehicle typically will not succeed in receiving the compete contents of such a long contiguous transmission of a data file, and partial reception of the file is typically not acceptable. The SDARS receiver is typically unsuccessful in this reception primarily because SDARS vehicles are not contiguously driving/turned-on for the required duration of the data file transmission. For example, a typical drive time may only be 30 minutes while the required contiguous transmission duration of the file may be 6 hours. A secondary reason why such transfers are typically unsuccessful is the relatively high probability in incurring (even only a few) bit errors over the required long duration of the data file transmission, due, for example, to intermittent periods of low SDARS signal reception.

An alternative to counter the above problem is thus enable reception of large data files over relatively low SDARS allocated bandwidth is to segment the data of the large file into smaller block sizes, transmit these individual blocks of the file over the SDARS system, and furthermore to repeat the transmission of the individual blocks of the file in this cyclic manner over an extended period of time. SDARS vehicles that miss reception of some blocks of the file over some initial time period will, with additional drive time, eventually receive all blocks of the file, with a higher probability of success that is relative to the length of the extended period of drive time. Once the SDARS vehicle receives all blocks of the file, it can reconstruct and use the file. The SDARS broadcast of the file in this manner is called carousel delivery.

In exemplary embodiments of the present invention, the time diversity transmission method of an SDARS-V2V vehicle system described above can also be applied to improve the performance of such an SDARS carousel delivery method. In such a system, the "information of interest" as described above regarding time diversity can now correspond to each individual block of the carousel delivery file. SDARS-V2V vehicles may broadcast the list of their missing blocks (using relatively small integers that uniquely identify blocks) over V2V, and request V2V transmission of the identified blocks from other neighboring SDARS-V2V vehicles that may have received one or more of these blocks. Similarly, going the other way, the same requesting SDARS-V2V vehicle may transmit any of the blocks that it was successful in receiving to other requesting SDARS-V2V vehicles. As different SDARS-V2V vehicles have different drive time patterns and durations (different vehicles drive at different, but sometimes overlapping, periods of the day), the various different SDARS-V2V vehicles will naturally receive differing blocks of the file, enabling the advantageous retransmission of the differing blocks of the file to each other as described. Moreover, there is also a natural V2V information dispersion effect in that over time each SDARS-V2V vehicle may retransmit blocks that were received not only via SDARS broadcast, but also via V2V broadcast from other SDARS-V2V vehicles that fulfilled previous requests for missing blocks. The SDARS carousel delivery model is thus improved in that SDARS-V2V vehicles will receive all blocks of the file over a shorter period of time due to the sharing of blocks over the V2V network as described. In areas of slow moving high density traffic, where many SDARS-V2V vehicles are in V2V range for long periods of time, for example, entrance to a tunnel, bridge, highway, etc. during rush hours, this effect is particularly useful.

In addition to SDARS-V2V vehicles, SDARS-RSE (SDARS I2V road side equipment) can also participate to significantly improve the time diversity gain of this system. This is because SDARS-RSE equipment is typically always turned-on, thus always receiving SDARS carousel file delivery broadcasts, and also always available to transmit and fulfill block requests over the V2V/I2V network. The SDARS-RSE equipment can thus more rapidly accumulate SDARS received and V2V received file blocks, versus typical SDARS-V2V vehicles. Otherwise, the operation and role of the SDARS-RSE in this time diversity system is the same as that of the SDARS-V2V vehicle described above.

It is noted that in and of itself, the performance of the SDARS carousel delivery model, as described above, suffers from a significant problem, known as the carousel delivery problem. Namely, that as the SDARS receiver receives and accumulates the various blocks of the file, it becomes increasingly difficult (less probable) for a given SDARS receiver to receive the remaining blocks of the file that are needed for it to complete the file. Each block occupies a unique position of the file, and at the limit, to receive the last remaining block of the file that it is missing, the SDARS receiver must be turned on (the vehicle driving) at precisely the same time that the SDARS system is broadcasting that block of the file. While each SDARS receiver will eventually receive all blocks of the file, some will be "lucky" and complete reception of all blocks early, while others will be less lucky and complete reception of all blocks after a longer period of on time (i.e., vehicle drive time).

One method to overcome, or improve upon, the carousel delivery problem is the application of erasure correction coding to the blocks. Thus, instead of a cyclically repeating transmission (broadcast) of uncoded blocks of the file as is done with the carousel delivery model, the blocks are first erasure correction coded (ECC) using a coding scheme that allows a generation of a number of uniquely coded blocks (M) much greater than the number of uncoded blocks (N) that make up the file. For example, for N=1000 uncoded blocks in a file, use M=1000*1000 unique erasure coded blocks. One such ECC is the Random Linear Code described in the Elias reference cited below. Also, it is noted, Reed Solomon codes are another class of such codes when the size of the code's finite field is made very large. In such a scheme, the SDARS system can then broadcast the unique ECC blocks of the file over the lifetime of the file transmission. If M is large enough, the SDARS system will avoid the need to cyclically repeat the ECC blocks of the file. The SDARS receiver can receive any linearly independent set of N ECC blocks and then decode these ECC blocks to reconstruct the original file. As such, the carousel delivery problem is thus eliminated or significantly minimized. In such a technique, the Reed Solomon code is optimal in that any set of N unique ECC blocks are guaranteed to be linearly independent. Other codes, such as the Random Linear Code, are not optimal in this respect and require reception of some extra number of ECC blocks (e), such that N+e total received blocks are required to provide N linearly independent blocks, with probability of p, where p rapidly approaches 1.0 with increasing e. Thus, for example, 10 extra blocks are required to enable file decoding with probability $\sim(1-(1/2^{10}))=0.9990$. As with uncoded blocks, ECC blocks can also be identified using relatively small integers that can be included in the header of a broadcast ECC block, which provide information necessary to the receiver in the process of decoding the received blocks.

Thus, in exemplary embodiments of the present invention, the time diversity SDARS-V2V vehicle (and RSE) system described above can also be applied to reduce the file delivery time for the SDARS block-ECC file delivery method. The time diversity system may be applied in a similar manner to that was described for the carousel delivery model. However, instead of retransmitting uncoded blocks over a V2V network, SDARS-V2V vehicles (and SDARS-RSE installations) can retransmit ECC blocks. SDARS-V2V vehicles can V2V transmit the list of ECC blocks that they may have already received (because the list of ECC blocks that it has not received (~M) is much larger and thus not efficient to transmit). Neighboring SDARS-V2V receivers that receive the request can check their own list of ECG blocks received for the same file, and the neighboring SDARS-V2V vehicle (or SDARS-RSE) can then transmit any of its ECC blocks that are outside the set of ECC blocks listed in the request by the requesting vehicle, thus sending ECC blocks that the requesting SDARS-V2V vehicle does not yet have). In exemplary embodiments of the present invention, the number of ECC blocks that are V2V retransmitted upon a request can, for example, be limited to:

N−upper_bound[N,"number of ECC blocks listed in request"]+e, where e is some small number of extra ECC blocks.

In exemplary embodiments of the present invention, the V2V transmitting of ECC blocks as described above can more efficiently be enacted as the V2V broadcasting of ECC blocks, such that any other neighboring SDARS-V2V vehicles may also receive and possibly use the ECC block transmission that was initiated for a specific requestor. Thus, as seen above as well as in other applications described in this application, the V2V network may be used as a second broadcast communications channel, to supplement, or mirror, content already or even simultaneously sent over the SDARS channel.

In exemplary embodiments of the present invention, an SDARS-V2V vehicle may incrementally decode ECC blocks as it receives them. In this process, received ECC blocks are linearly combined in the incremental process of solving the system of equations formed by the received ECC blocks and each block's corresponding generator equation. As such, original ECC blocks are transformed and no longer available in original form. However, the "seed" of the original ECC block, and its corresponding generator equation, still exist in this transformation, and the integer identifier of the original "seed" ECC block can still be maintained for the transformed block; then, this same transformed ECC block, along with its transformed generator equation can be V2V transmitted by the SDARS-V2V vehicle in fulfilling any request for that same identified "seed" ECC block. It is noted that this transmission is somewhat less efficient, in that a transformed generator equation is included in the transmission, instead of only the more compact integer identifier of the original generator equation.

Additionally, in exemplary embodiments of the present invention, an SDARS-V2V vehicle (or SDARS-RSE) that has already ECC decoded and reconstructed a file may instead transmit (uncoded) blocks over V2V, identified as such, in fulfilling ECC block requests from other SDARS-V2V vehicles. If sufficient V2V bandwidth exists, and the vehicles are in V2V network communication range for a sufficient time, then the fulfilling SDARS-V2V vehicle may, for example, transmit all blocks of the file. In this case the requesting SDARS-V2V vehicle can skip all ECC decoding and simply reconstruct the file directly from all of the received uncoded blocks. If bandwidth and time conditions are insufficient for transmission of uncoded blocks of the file, then the fulfilling SDARS-V2V can instead transmit a subset of these uncoded blocks to requesting SDARS-V2V vehicles. In some embodiments, an ECC decoding policy can be pre-established or dynamically communicated that defines an "incremental ECC decoding direction"; such as, for example, the ECC decoding direction is from the beginning block of the file, towards the ending block of the file. The fulfilling SDARS-V2V vehicle (or RSE) can then order the transmission of uncoded blocks of the file in the direction opposite that of the ECC decoding direction. Providing the uncoded blocks (or "already decoded" blocks) in opposite order manner can thus significantly reduce the ECC decoding work required of the requesting SDARS-V2V vehicle in reconstructing the file. In announcing the list of blocks it already has, the requesting SDARS-V2V vehicle must list the block identifiers for both (i) the ECC blocks and (ii) any uncoded blocks (already decoded blocks) that have be received.

To reduce the overhead and bandwidth associated with a requesting SDARS-V2V vehicle transmitting its list of already received blocks (ECC and uncoded blocks), certain classes of SDARS-V2V vehicles and RSEs that have already decoded and reconstructed a file may act in a manner similar to a regular SDARS system in encoding and broadcasting ECC blocks over the V2V network. Such SDARS-V2V vehicles and RSE would select generator equations from the large set of M possible generator equations based on pseudorandom selection, where the pseudorandom seed is ideally different for all SDARS-V2V vehicles and RSEs (and the SDARS broadcast itself) performing ECC encoding and broadcasting of ECC coded files (e.g. seed based on a unique MAC address). As such, the ECC blocks generated and broadcast will be sufficiently independent between all broadcasters, for large M. SDARS-V2V vehicle and RSE broadcasters would limit the rate of ECC block transmission based on bandwidth availability and usage policies. For example, a SDARS-V2V vehicle or RSE ECC could transmit a request message, which includes a requested number of required ECC blocks, to enable any neighboring SDARS-V2V vehicles or RSEs to begin ECC block broadcasting.

Reference for erasure correction code: Peter Elias, *Coding for Two Noisy Channels*, Information Theory, Third London Symposium, 1955.

Determining Traffic Congestion Information in a V2V System

In some embodiments, an in-vehicle V2V communications system can be used to inferentially determine traffic congestion. It is noted that conventionally there exist a few methods of determining traffic congestion in a given area. The primary ones now in use include video recognition devices and under-pavement probes. There are also a number of systems (Google's Waze application, for example), that use an individual's mobile phones as probes. In a V2V system, the BSM messages transmitted by each equipped vehicle add information regarding heading and speed, however, no indication of actual congestion in a given area is available within the messages themselves.

Thus, in exemplary embodiments of the present invention, by ignoring the contents of V2V messages and simply tallying up the number of messages, along with the message transmit frequency, in a given defined area (for example a 300 m radius or so), combined with navigation system map information (number of lanes, over/underpasses, etc.) an in-vehicle V2V module can obtain a proportional indication of traffic congestion. More complex algorithms which do not ignore the contents of the messages, and actually parse each BSM while keeping a running tally of those in range sorted by heading, can give an even more granular set of information regarding congestion in (i) a particular direction of travel, or even (ii) to the extent of a particular section of roadway (for example, congestion in the lanes that move vehicles from eastbound on road X to northbound on road Y). This information can be used to augment existing probe data available for a more accurate and real-time view of local congestion. The knowledge that BSMs are sent at a frequency of 10 times per second, or at some lower frequency when indicated by bandwidth constraints, can also be incorporated into such a congestion algorithm.

It is also noted that various synergies between V2V obtained data and a highly granular traffic data collection, analysis and reporting service, such as, for example, the Traffic Plus™ service now being developed by Sirius XM Satellite Radio Inc., can be created and leveraged in exemplary embodiments of the present invention. The Traffic Plus™ service is described in detail in PCT/US2014/029221, entitled "High Resolution Encoding and Transmission of Traffic Information", which was filed on Mar. 14, 2014, and is hereby incorporated herein in its entirety by this reference.

Using this congestion information that was determined by using the V2V messages together with, for example, other information contained in the Traffic Plus™ traffic service, more detailed, and especially more real-time information can be provided to the user of these services via the navigation system installed in the vehicle. For example, when Traffic Plus™ indicates that an accident occurred on the roadway near a given location, and in the direction you are heading, combining the added congestion information calculated from V2V as described above can enable the navigation unit to determine how far ahead the traffic will begin to pileup and slow down. It can also use that information to determine if it needs to re-route the vehicle whenever possible.

In addition, whatever congestion information has been calculated can be sent to the Traffic Plus™ servers (as additional probe data) in a real-time fashion to improve the real-time nature of the Traffic Plus™ offering.

Thus, V2V congestion metrics and detailed Traffic Plus™ data can be combined in various synergistic ways, in various exemplary embodiments of the present invention. Traffic Plus™ includes detailed predictive models for estimating traffic congestion, speed and changes thereto based on time of day. These models can be used to predict the effect of an anomalolus hazard, as may be discovered by a vehicle, and communicated over V2V, as described above. Using such V2V warnings as an input to Traffic Plus™ models can provide dynamic predictions regarding their effect.

In turn, V2V data, as aggregated and mixed, can bright to light causes of traffic anomalies and thus provide causation information and context to traffic events send by Traffic Plus™, but not contextualized.

Tuning to an Emergency Channel Using V2V Communications

In exemplary embodiments of the present invention, a satellite broadcast message can be created to tune to a specific audio source, such as, for example, FM, AM, an Internet radio channel or stream, and/or a satellite radio channel, within a particular geographic region, and vehicles can be enabled to pass this message to other V2V equipped vehicles that may not have access to the satellite radio path.

Thus, given a radio with at least (1) satellite radio reception capability, and (2) a processor which can detect a message sent over the satellite path, the message specifying (3) an audio source, and (4) a geographic region for which that source is deemed relevant, in exemplary embodiments of the present invention methods of transmitting the relevant information using V2V techniques to radios which may lack satellite reception capability can be performed.

In one embodiment, for example, drivers with V2V enabled satellite radios will come within range of other vehicles having V2V enabled radios which may or may not have satellite radio capability. Because of extremely hazardous conditions, a chemical spill, a sniper, bridge collapsing during earthquake, police activity, or some other equally egregious situation, life and death information may be carried on a special satellite radio channel and also re-transmitted on a local FM or AM station for the benefit of V2V radios that lack satellite radio connectivity. The V2V-enabled satellite radios can thus serve as a conduit for an emergency message sent over the satellite link, instructing all V2V radios in a particular area to tune to a particular AM or FM station. In exemplary embodiments of the present invention, V2V-enabled satellite radios may also have the option of tuning to a special satellite-radio channel.

FIG. 18 illustrates an exemplary emergency channel concept according to exemplary embodiments of the present invention. With reference thereto, a satellite radio transmitter 1810 may broadcast an emergency message informing all satellite radios to tune to a particular channel for more information. The message may define a geographic region of interest (i.e., the message may be geotagged). The message can be received by a V2V Enabled Satellite Radio Module 1830, as shown, via Satellite RF Antenna 1815, and the module may processes the geotag and pass the message over a V2V transmitter, V2V Tx, to all local V2V enabled radios 1835, only if the message is relevant to the current location of the current vehicle. As noted, V2V-enabled satellite radios can thus serve as a conduit for an emergency message sent over the satellite link, the message instructing all V2V radios in a particular area to tune to a particular AM or FM station. The emergency message sent by satellite radio transmitter 1810 can also be received by a terrestrial re-transmitter 1820, for example, as shown in the upper right of FIG. 18, which may retransmit the message over AM/FM frequencies to all vehicles, as shown, to AM/FM antennae 1840 and 1850, including those that are (e.g., 1830), and those vehicles that are not (e.g., 1835), satellite radio equipped. By this means satellite radio emergency messages maybe disseminated to a "crowd" of non-satellite radio enabled vehicles over a V2V channel, within a defined distance of the satellite radio enabled vehicle.

Crowd Sourcing In Lieu of Data Channel Download

In exemplary embodiments of the present invention, various types of information may be sent over V2V channels in lieu of waiting for download from an SDARS service over a data or service channel.

As is known, various types of content are downloaded, or may be downloaded to individual SDARS receivers. This may include, for example, specialized content that is not sent over the broadcast service for later on-demand listening, or for example, libraries of audio content, or updates to such libraries, such as are described in the EBT and EBT2 systems, in U.S. patent application Ser. No. 14/021,833, filed Sep. 9, 2013 and Ser. No. 14/226,788; filed Mar. 26, 2014, the disclosure of each of which is incorporated herein by this reference.

Additionally, provisioning of LTE modems may also be performed over an SDARS service channel, as described in U.S. Provisional Patent Application No. 61/947,955, entitled "Satellite Provisioning of Cell Service", filed on Mar. 4, 2014, and its related PCT application, PCT/US2015/018792, filed on Mar. 4, 2015, also entitled "Satellite Provisioning of Cell Service", which is also incorporated herein by this reference. In that application, it was noted that the provisioning could also be performed over a Wi-Fi link. It is thus here noted that in addition to the various communications pathways described therein, a V2V link could also be used. Such a V2V link could be used, in general, for any and all data that, for whatever reason, would be more efficiently sent as opposed to waiting for the SDARS service. This could be due to temporary problems with a terrestrial repeater, electromagnetic conditions, geographically unfavorable terrain, etc.

Thus, in exemplary embodiments of the present invention, crowd sourcing over V2V may be used as another available cache of data to a given SDARS-V2V equipped vehicle, for any data or messaging that is normally transmitted, received or used in connection with an SDARS receiver. In exemplary embodiments of the present invention, intelligence may be provided in an SDARS in-vehicle receiver to inventory all available data to it, and access it from whatever source may be optimal, given location and duration of this data in a V2V "crowd", via an upcoming service channel message, via a Wi-Fi connection, or the like.

V2V Roadside Equipment Satellite Data Delivery

It is noted that Roadside Equipment ("RSE") can often be located in areas without adequate cellular or wired network coverage. There are thus many cases in which wide-area communication with the roadside equipment is necessary and/or desirable. This is a related functionality to crowd sourcing, only somewhat the inverse of the previous situations, where V2V communications were used to supplement missing satellite received data. Here the RSE is the entity lacking data, which it receives over a satellite link.

Accordingly, in exemplary embodiments of the present invention, an SDARS satellite communications link can be used as a one-way system to communicate certain data to the Roadside Equipment. This can be accomplished by using data channels, perhaps encoded with RFD (Rapid File Delivery, an exemplary technology used by assignee hereof for disseminating data to in-vehicle SDARS receivers efficiently), on the SDARS satellite link. Examples of such communications can include, for example, (i) Initial provisioning information for the Roadside Equipment; (ii) Firmware Updates for the Roadside Equipment controllers; (iii) Emergency distribution of information during system failure; (iv) Recovery information after Roadside Equipment failures; and (v) Distribution of "default states" for Roadside Equipment, perhaps distributed in a regional manner, to name a few.

Additionally, for standalone operation, solar-power collectors and batteries may be used to power the SDARS receiver and, if necessary, the Roadside Equipment as well.

VI. Virtualized Audible Alerts Using Vehicle to Vehicle and/or Vehicle to Infrastructure Communications In exemplary embodiments of the present invention, V2V and/or V2I communications may provide data from a first vehicle to other nearby vehicles that translate the initiation of traditional audio alerts such as an emergency vehicle siren, a train horn, or a car horn produced by the first vehicle, into equivalent "virtual" audio alerts rendered by the internal sound system within the other receiving vehicles. A data packet can be generated by a vehicle sounding an alert, and conveyed to nearby vehicles through direct V2V or indirectly through V2I equipment, and upon receiving said data packet the receiving vehicles can render an alert sound, mixing in the alert sound with the in-vehicle infotainment sound system, or overriding the current audio output of the sound system, so that the driver of a receiving vehicle becomes intuitively aware of the alert generated by the driver of the first vehicle without requiring observation of a displayed alert or hearing an externally generated alert sound, such as an ambulance siren, car horn, or train horn. Furthermore, a receiving vehicle audio system can suggest the relative direction of the first vehicle by altering the balance of the generated alert sound volume, and/or time delays between left, right, forward and rear speakers, so the alert sound appears to the driver as if it is emanating from the first vehicle sourcing the alert, resulting in better audio clues as to the direction of the first vehicle than is sometimes possible when hearing the actual physical alert sound, the direction of which can be difficult to identify as the sound bounces off buildings and structures. Furthermore, for example, the volume of the generated alert sound can be adjusted to match the physical distance of the first vehicle from the receiving vehicle, so that the driver becomes intuitively aware of its closer approach. With additional processing and awareness of the first vehicle path relative to a receiving vehicle, the alert sound can be either produced or not produced in that nearby vehicle depending on the likelihood that the given nearby vehicle will be affected by the path of the first vehicle producing the alert; thus, only nearby vehicles for which the alert is relevant will produce the alert avoiding an unnecessary distraction to drivers of vehicles unaffected by the alert. Thus, a highly intelligent V2V based virtual alert system can be implemented.

The following are illustrative examples:

Virtualized Emergency Vehicle Siren

Here an alert sound data message may be used to notify the user of an approaching emergency vehicle by mixing a virtual siren sound into the vehicle's audio system, so that the driver becomes intuitively aware of the approaching emergency vehicle, including general direction and proximity through the previously described sound volume and balancing methods. With additional processing and awareness of the planned emergency vehicle route, the V2V system, in conjunction with in-vehicle software, can determine whether the virtual siren should be sounded in a given car, based on the likelihood that the car will be impacted by the emergency vehicle path. For example, on a road that prevents access between opposing lanes such as an expressway or boulevard, cars heading in the same direction and ahead of the emergency vehicle would hear the virtual siren, whereas cars heading in the opposite direction would not hear the virtual siren even though they would for a short time be in close proximity with virtual siren. This method provides the benefit of warning the impacted driver of the emergency vehicle, before they might otherwise hear a physical siren and in spite of the driver playing other audio sources in the car that might mask the sound of the physical siren. It also prevents drivers not affected by the emergency vehicle (such as those in the opposite directed lanes, from being distracted and causing "lookey Lou" pileups or slowdowns. This applies to all of the examples below, as well. In a future of pervasive adoption of such a technique, an emergency vehicle might rely on virtual sirens instead of physical sirens when operating in areas where loud sounds are discouraged and/or when handling situations not critical enough for a physical siren.

Virtualized Train Horn

Here an alert sound data message may be used to notify the car driver of an approaching train by mixing a virtual train horn sound into the vehicle's audio system, so that the driver becomes intuitively aware of the approaching train including general direction and proximity through the previously described sound volume and balancing methods. In this example, the train can be equipped with V2V equipment so that it is capable of sending a data message into the V2V system representing the sounding of a train horn. With additional processing and awareness of the vehicle path and train path relative to the train tracks and roadway rail crossings over the train tracks, the V2V and V2I system, in conjunction with in-vehicle software can determine whether the virtual horn should be sounded in a given car, based on the likelihood that the car will approach a roadway/train track intersection at the time the train passes. For example, on a stretch of road parallel to the tracks with no railway crossing, cars would not hear the virtual train horn. In contrast, cars approaching a railway crossing as the train approaches would hear the virtual train horn. This method also provides the benefit of warning the impacted driver of the approaching train, before they might otherwise hear a physical train horn and in spite of the driver playing other audio sources in the car that might mask the sound of the physical horn. As one illustrative implementation, V2I stations are strategically placed along a train track and near roadway track crossings, so that alerts can be conveyed from the train to vehicles near the roadway crossing even if there are limited V2V equipped vehicles presently in the area for conveying the messages from train to vehicle to vehicle. The method can also be used to provide a train horn sound in vehicles that are in the area of a Train Horn Quiet Zone (see, for example, http://www.fra.dot.gov/Page/P0104). With additional processing, the time before the arrival at a railway crossing at which the virtual horn is sounded in cars near that crossing can be extended if the V2V system determines that the crossing is congested with higher risk that some vehicle might get blocked from movement off the crossing.

Virtualized Car Horn

The alert sound data message may be sent from a first vehicle to other vehicles to indicate the driver of the first vehicle has sounded a horn. This data may be used by the other vehicles to product the sound of a horn in the vehicle's audio system, so that the drivers of the other vehicles become aware of the horn sound including general direction and proximity through the previously described sound volume and balancing methods. Furthermore, the vehicle audio system in the other vehicles can suggest the relative direction of the first vehicle producing the horn sound by altering the balance of the mixed horn volume between left, right, forward and rear speakers, so the emulated horn sounds to the driver as if it is coming from its physical direction from the first car. Furthermore, the volume of the mixed horn sound can be adjusted to match the physical distance of the first car to the receiving car, so the driver becomes intuitively aware of its closer approach. In some situations, a physical horn sound could be replaced with an exclusively virtual horn sound, so that only car occupants determined to be impacted by the situation that triggered the first car to sound the horn hear a horn sound. With additional processing and awareness of the relative vehicle positions, paths and traffic situation, the virtual horn sound would only be sounded by those receiving vehicles where such a sound has value to those vehicle drivers. For example, a driver in a line of cars behind a car that fails to start driving for a long time after a red light turns green might honk their horn to get the stalled driver's attention. In such case, the V2V system and vehicle software might limit reproduction of this horn sound to only the first tardy vehicle in the line of cars waiting at the light. Other vehicles would not hear the virtual sound, thus avoiding the annoyance of hearing someone honk their horn at a different driver. Similarly, the virtual horn sounded by a driver who sees a vehicle pulling into its path would be heard by the vehicle creating the path incursion, but not by all other vehicles in the vicinity. Use of virtual horns exclusive of physical horn sounds would allow for drivers to legally sound their horn in quiet zones such as around hospitals.

The present invention has been described in detail, including various preferred exemplary embodiments thereof. However, it will be appreciated that those skilled in the art, upon consideration of the present disclosure, may make modifications and/or improvements on this invention that fall within the scope and spirit of the invention.

VII. Sensors to Detect Hazards or Events Using Vehicle to Vehicle Communications Hazard Location System Using V2V Communications In exemplary embodiments of the present invention, V2V enabled vehicles with embedded sensors may be used to share sensory information which can then processed to determine the location of "events of interest" which can then be avoided by drivers with V2V technology and targeted for appropriate action by emergency responders such as police, fire departments, etc.

In one specific example of such a distributed sensor network for threat detection, the use of a V2V-enabled vehicles that include acoustic sensors (i.e. microphones) can be used to create a low-cost acoustic sensor network for the purposes of locating the source of gunfire and using that information to enhance public safety. This example is next described; it is understood that the same, or similar technique, with appropriate sensors, may be extended to any type of hazard, threat or of incident interest.

Example—Crowd Sourced Gunshot and Explosion Detection Over V2V

Drivers and pedestrians entering certain urban and suburban locations run the risk of being hit by sniper fire or random gunfire. In fact, military technology has been developed to locate the source of enemy gunfire using acoustic techniques. In many locations within the United States (such as, for example, Chicago, Ill.; San Francisco, Los Angeles, and Oakland, Calif.; Milwaukee, Wis.; Minneapolis, Minn.; Omaha, Nebr. Kansas City, Kans.; Washington D.C., Birmingham, Ala.; New Bedford, Boston, and Springfield, Mass. Mass.; and finally Wilmington, N.C.), a network of fixed microphones at known locations has been set up to aid law enforcement in locating the source of gunfire. Similar systems have also been deployed in the United Kingdom and Brazil.

These systems are highly effective in rapidly locating the source of gunfire, using well known triangulation techniques along with the known speed of sound, to calculate the distance from the source of gunfire to multiple microphone locations. However, they are subject to a number of drawbacks, such as:

1. The gunshot location systems are expensive to install and maintain. As effective as they are, they require on-going maintenance to remain effective, and local governments are under pressure to cut their budgets or reallocate resources to other priorities:

a. According to ATI Personnel in a 1996 interview, leasing a system to perform acoustic gunfire location costs approximately $5,000 per month for each square mile covered[1]

[1] https://www.ncjrs.gov/pdffilesl/nij/179274.pdf b. As another example of the typical costs: a system deployed in Wilmington, N.C. cost $300,000 to deploy and $120,000 to renew the subscription.[2]

[2] http://www.starnewsonline.com/article/20120221/ARTICLES/120229925 c. Oakland, Calif. has a system which costs $264,000/year[3]

[3] http://www.sfgate.com/crime/article/Oakland-cops-aim-to-scrap-gunfire-detecting-5316060.php 2. The systems provide limited, fixed geographic coverage.

a. Government agencies or law enforcement departments must decide ahead of time where to install the sensors, and must prioritize certain regions over other regions.

b. Political considerations often come into play in determining which regions to cover and which to ignore.

3. The systems do not cover suburban or rural areas at all—even on highly trafficked major highways.

In smaller cities or rural locations it is not cost effective to mount and permanently process the outputs of microphones to detect infrequent gunfire, and yet the incidence of such events (snipers, deranged individuals shooting assault weapons in schools or other public locations) is sadly all too common. Even in large cities, the cost of fixed systems prohibit their expansion to cover more than a few square miles of the worst neighborhoods and in some cases, even this modest coverage is currently at risk from budget cuts.

These defects may be remedied using the techniques of various embodiments of the present invention. Thus, in exemplary embodiments of the present invention, at least three vehicles may be used, each vehicle having (1) V2V communications capability, (2) on-board digital storage and processing capability, (3) at least one microphone, (4) a position and timing reference source such as GPS, or GPS augmented with various dead-reckoning systems, and (5) a database of acoustic signatures. The processor in each vehicle can monitor the output of the microphone or microphones, and compare the output with a database of acoustic signatures to determine if it matches a gunshot or explosion with sufficient confidence to report the event. When an acoustic signature of interest is identified, the processor can produce (6) a message with the following information: (a) a time stamp of when the sound was detected by the vehicle; (b) the location of the vehicle corresponding to the time of the time stamp; and (c) an optional index or identifier to characterize the acoustic signature. The processor can then send the message over V2V communication paths to any vehicles (7) within communication range. At the same time, the processor receives and stores similar messages (8) from the other vehicles (7). After receiving at least 2 messages, and continuing with additional messages, the processor can compute the distances from the source of the (9) "acoustic event" of interest (e.g. a gunshot) to each of the vehicles, and determine the source location by computing the intersection of at least three spheres with appropriate radii with centers at the geographic coordinates where the sounds were detected[4]. The vehicle then displays the location of the source of the gunfire or explosion on the user interface (10) and cautions the driver to avoid that location. As the vehicle continues along its route, it retransmits the set of all received messages (11) to vehicles and (12) roadside equipment, which may or may not have been able to hear the initial gunshot, but are now able to determine its location and avoid that area. Depending on the speed and heading of the vehicle, it may continue to transmit this information (as well as any subsequent messages it receives, which may enable more precise location of the origin) for several miles beyond the immediate vicinity, and many minutes after the actual detected event, so that vehicles approaching the area can be warned of possible gunshots in the area and be routed around the dangerous region.

[4] The intersection of two spheres with known radii produces a circle in the general case. The addition of a third sphere restricts the possible locations to a pair of points. It will usually be possible to rule out one of the remaining points using knowledge of local topography (for example when one of the two possible locations is below ground), however adding a $4^{th}$, $5^{th}$, and additional points can improve the location accuracy without any knowledge of terrain.

Novel Benefits

The above-described techniques improve upon the existing technology of using a fixed network of microphones at known location, using a central processor, to compute the source of gunfire, by using a flexible network of microphones which report their locations to each other (the V2V network) and use distributed processing to determine the source of gunfire or explosions based on the time stamp and location information in the messages received from a multitude of vehicle-based microphones.

By incorporating one or more microphones into V2V-enabled vehicles, and by using on-board processing capability to monitor the output of those microphones for sounds of gunfire as a background task, it is possible to detect the locations of gunfire or explosions as long as a sufficient number of V2V vehicles are within range of the gunshot (i.e., close enough to hear the distinctive acoustic signature of the gunshot).

Even a low penetration rate of V2V capable vehicles would provide some benefit in this application, by directing law enforcement resources to the approximate location and simultaneously routing V2V equipped vehicles away from the source of the gunfire.

It is noted that the use of standard microphones added to existing V2V or V2I (roadside equipment) eliminates the installation costs of specialized monitoring equipment or allows for amortizing those costs with the costs of other equipment deployed for different safety reasons, rather than requiring the costs to be justified exclusively by the gunshot location benefits.

Further, in urban locations which already include gunfire location technology, the addition of the V2V array of microphones could improve the accuracy of the fixed network by adding additional datapoints, and can also extend the geographic coverage of the fixed network, which is typically confined to a small downtown region, or perhaps one or two high-crime regions of the city.

Extensions, Improvements, and Alternate Implementations

In an extension of this technology, the gunfire location could be compared with a point of interest database to eliminate locations such as public or private shooting ranges which might be the source of "legitimate" or "expected" gunfire. In this way, vehicles that drive past a shooting range would not constantly be alerted to gunfire coming from the location of a known shooting range . . . but if gunfire came from a block away from the shooting range, they could be alerted to that fact.

In a further extension of this technique, vehicles equipped with cameras can, for example, automatically capture and save an image in the direction of detected gunfire, and can anonymously pass on that image to law enforcement as an aid to locating the shooter or shooters. In the case of a shooter in a vehicle on the highway, if all of the other vehicles in the vicinity automatically captured images after detecting the shot, the probability of capturing an image of the suspect vehicle would be greatly enhanced.

Embodiments of this invention apply to all types of vehicle-mounted sensors where the readings from the sensors from multiple vehicles are combined and processed to determine the location of an "event of interest". The event of interest is not limited to gunshots and explosions as described in the previous example, but can easily be extended to chemical spills, fires (e.g. using smoke detection), earthquakes (e.g. using accelerometers), radiation leaks, or other geographically distributed threats having a determinable source, origin, or locus or risk gradient in which there is a benefit to having vehicles avoid a region and also perhaps a benefit for appropriate emergency responders to rapidly detect the location of the region and move toward it to take appropriate action (e.g. apprehend a criminal, rescue people, mitigate the damage, or prevent the spread of the affected area).

While this invention is primarily intended as a distributed processing system where each mobile processor independently computes the location of the source of gunfire or explosions by combining timing and location data from multiple detectors, and alerts the driver of the threat location, an alternative approach would be to transmit the raw data from each vehicle to a central location for processing. The central location could then process data collected over a much wider area, and/or period of time, to determine a more precise threat location (including more precise computations of threat motion for example when the source of the gunfire is a moving vehicle and multiple shots at slightly different locations could indicate the speed and direction of the target vehicle).

As also noted above, in exemplary embodiments of the present invention, vehicles with higher levels of visual or acoustic sensing could pass information to vehicles of lower levels of visual sensing to assist in avoidance of potential hazards. For instance, vehicles with infrared visual capability could pass information to allow vehicles without this capability to be notified of an animal in the road where that animal would be otherwise undetected to those vehicles without the advanced infrared sensors/cameras. Or, for example, vehicles with sensors having a wider dynamic range of sound frequencies that may be acquired can pass information regarding high frequency acoustic hazard signatures to other vehicles not so enabled. Such hazards may include an incoming drone, missile, or other projectile, or the low frequency sounds that often precede seismic events. Information passed could be via sound clip, enhanced or processed sound, text message, image, virtual image, processed or enhanced image, composite image, or just locational alert, for example.

Exemplary Integrated SAT Radio and V2V Antenna System

In exemplary embodiments of the present invention, a satellite radio and V2V antenna system may be integrated. Such an integrated system may be used with any of the above described systems, applications, methods, or techniques. An example of such an integrated SAT Radio and V2V antenna system is shown in FIG. 19A. As shown, the antenna system includes multiple passive antenna elements to support frequency bands used by the antenna system, here C, C1, S, V and G. C and C1 illustrate Cell Antennas 1905, and the S, V and G antennas being the Other Antennas 1907, receiving frequencies outside the cellular communications bands. The Other Antennas 1907 are respectively fed into the receivers. For example, antenna element S is tuned to receive satellite radio transmissions in the 2.3 GHz frequency band and may thus be connected to the SAT receiver 1910. The SAT receiver processes the RF signals received from the antenna and outputs baseband digital signals to the Baseband Processor 1925. Similarly, antenna element V is tuned to the 5.9 GHz frequency band to transmit and receive V2V signals and is connected to the V2V Transceiver 1915. The V2V transceiver contains both a receiver portion to process the V2V signals received from the V antenna element and a transmitter portion coupled to the same antenna element for transmitting V2V signals. The V2V Transceiver is also connected to the Baseband Processor 1925, which receives baseband digital signals from the receiver portion of V2V Transceiver and sends baseband digital signals to the transmitter portion. Continuing with reference to FIG. 18A, antenna element G is tuned to the 1.6 GHz band to receive GPS and/or GLONASS positioning signals and is connected to the GPS Receiver 1920. GPS Receiver 1920 processes the RF signals received from the G antenna element, and outputs baseband digital signals to the Baseband Processor 1925. Optionally, cell antennas C and C1 can be tuned to cellular frequency bands to support cellular communications. The C and C1 antenna elements may be coupled to a remote cellular modem through coaxial transmission lines Coax.

With continued reference to FIG. 19A, the Baseband Processor may perform additional operations on the data received from SAT, V2V and GPS paths, such as, for example, parsing the data streams, managing conditional access policies, preprocessing services, and formatting and multiplexing the resultant service data into a composite serial bitstream which can then, for example, be transmitted over the bidirectional serial Interface 1930 to the Head Unit, shown in FIG. 19B. The Serial Interface supports multiplexed digital transmissions from the Antenna System 1950 to the Head Unit 1951 and from the Head Unit 1951 to the Antenna System 1950. In exemplary embodiments of the present invention, Baseband Processor 1925 can support a V2V security policy which may require information received by the SAT Receiver 1910.

In exemplary embodiments of the present invention, administering a security policy in the tightly integrated Antenna System 1950 can reduce observability of sensitive security data by unauthorized third parties. This provides a level of protection against misuse of the V2V system.

As noted, an exemplary Head Unit 1951, designed to receive signals from Antenna System 1950, is shown in FIG. 19B. Head Unit 1951 can incorporate a MCU 1965 for communicating with internal and external vehicle systems and which provides an interface for communicating with the driver/user. Head Unit 1951 also includes a multiplexed transmit and receive Serial Interface 1963 to the Antenna System, connected to said Antenna System 1950 via Twisted Pair 1933, as shown. The serial antenna interface also provides power to the Antenna System which may be provided by separate power (5 VDC) and ground (GND) wires as shown in FIGS. 19A and 19B, or may be provided over the Twisted Pair 1933 serial communication wires themselves to reduce the total wires in the interface. The MCU is connected to a User Interface 1975 which enables control of the SAT receiver (Channel Change, Volume, etc.) and certain outgoing messages on the V2V channel, as well as the display of information received from Antenna System 1950, such as, for example, SAT receiver audio information, V2V situational awareness information (warnings, road information, etc.) or navigation information. MCU 1965 is connected to an audio interface, Codec DAC 1980, which includes speakers 1990 for SAT audio or V2V related audio (speech information or tones) and may include a microphone 1995 for cell communications or other audio applications. MCU 1965 is also connected to Vehicle Bus 1970 for collecting vehicle information such as braking status, steering wheel angle and other information which may be needed by the V2V system or other systems, as described more fully above in connection with Section III, "Improving User Based Insurance ("UBI") Data With Vehicle To Vehicle And Vehicle To Infrastructure Contextual Information." This interface may also be used to communicate information from Antenna System 1950 to other vehicle systems such as, for example, providing imminent collision data to an ADAS system.

CONCLUSION

The present invention in its numerous and varied embodiments, has been described in detail, including various preferred exemplary embodiments thereof. However, it will be appreciated that those skilled in the art, upon consideration of the present disclosure, may make modifications and/or improvements on this invention that fall within the scope and spirit of the invention.

It is understood that an exemplary system implementing any of the exemplary embodiments described hereinabove may use any satellite radio system as may be known, such as those provided by Applicant hereof, and/or any V2V communications module or system as is, or may be, known. The satellite radio and V2V modules may be fully, or partially integrated, or maybe physically separated, and only communicably connected. Various permutations are possible, and all understood to be within the scope of the present invention.

A latitude of modification, change, and substitution is thus intended in the foregoing disclosure and in some instances, some features of the invention will be employed without a corresponding use of the other features. Accordingly, it is appropriate that the appended claims be construed broadly and in a manner consistent with the spirit and scope of the invention as disclosed.

What is claimed:

1. A method for identifying a hazardous road condition, the method comprising:
   receiving, by a computing system and via a vehicle-to-vehicle (V2V) or vehicle-to-infrastructure (V2I) network, a plurality of road condition messages, each of the road condition messages including location data associated with the hazardous road condition, and wherein each of the road condition messages are generated by at least one vehicle that has detected the hazardous road condition;
   wherein the plurality of road condition messages further include shape information;
   analyzing, by the computing system, the plurality of road condition messages to determine a severity of the hazardous road condition and to determine a remedial action;
   generating, by the computing system, a warning message including a geotag based on the location data and the severity of the hazardous road condition;
   transmitting, by the computing system and via a satellite broadcast, the warning message including the geotag and the severity of the hazardous road condition to a plurality of receivers that are configured to display the warning message; and
   transmitting, by the computing system and via a satellite broadcast, the shape information to determine a distance between a currently planned route and the hazardous road condition.

2. The method of claim 1, wherein the hazardous road condition is associated with at least one of an icy road, heavy rain, snow, an animal present in the vicinity of a road, debris, and an erratically moving vehicle, and wherein the V2I network includes a Satellite Digital Audio Radio Service (SDARS) network.

3. The method of claim 1, wherein the plurality of road condition messages include data based on at least one of vehicle accelerometer measurements, antilock braking systems, and windshield wiper use.

4. The method of claim 1, wherein the plurality of receivers are associated with on-board vehicle systems of vehicles that are located within a vicinity of the hazardous road condition.

5. The method of claim 1, wherein the warning message includes information associated with an indication to reduce vehicle speed.

6. The method of claim 1, further comprising:
   receiving, by the computing system and via the V2V network or V2I network, at least one of a plurality of images and video segments in addition to the plurality of road condition messages; and
   detecting, by the computing system, a road hazard associated with an animal or debris based at least on one of the plurality of images and the video segments.

7. The method of claim 6, further comprising:
   transmitting information indicative of the road hazard to on-board vehicle systems of vehicles that are located within a vicinity of road hazard.

8. A method for avoiding a hazardous road condition, the method comprising:
   receiving, by an on-board vehicle system and via a vehicle-to-vehicle (V2V) or vehicle-to-infrastructure (V2I) network, a plurality of road condition messages, each of the road condition messages including location data associated with the hazardous road condition and a severity of the hazardous road condition, and wherein each of the road condition messages are generated by at least another vehicle that has detected the hazardous road condition;
   wherein the plurality of road condition messages further include shape information;
   determining, by the on-board vehicle system, a modified driving route based on analyzing location data associated with the hazardous road condition;
   presenting, by the on-board vehicle system, a warning message indicative of the hazardous road condition and the modified driving route; and
   using, by the on-board vehicle system, the shape information to determine a distance between a currently planned route and the hazardous road condition.

9. The method of claim 8, wherein the hazardous road condition is associated with at least one of an icy road, heavy rain, snow, an animal present in the vicinity of a road, debris, and an erratically moving vehicle.

10. The method of claim 8, wherein the plurality of road condition messages include data based on at least one of vehicle accelerometer measurements, antilock braking systems, and windshield wiper use.

11. The method of claim 8, wherein the warning message includes information associated with an indication to reduce vehicle speed.

12. The method of claim 8, wherein the V2I network includes a Satellite Digital Audio Radio Service (SDARS) network, and wherein the plurality of road condition messages comprise geotagged messages.

\* \* \* \* \*